US012035770B2

(12) United States Patent
Pezzimenti et al.

(10) Patent No.: US 12,035,770 B2
(45) Date of Patent: Jul. 16, 2024

(54) VENTED GARMENT

(71) Applicant: NIKE, Inc., Beaverton, OR (US)

(72) Inventors: Luke A. Pezzimenti, Portland, OR (US); Iustinia Koshkaroff, Portland, OR (US); Kevin C. Sze, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 317 days.

(21) Appl. No.: 15/597,540

(22) Filed: May 17, 2017

(65) Prior Publication Data

US 2017/0245560 A1  Aug. 31, 2017

Related U.S. Application Data

(63) Continuation-in-part of application No. 15/255,603, filed on Sep. 2, 2016, now Pat. No. 11,606,992, which
(Continued)

(51) Int. Cl.
*A41D 27/28* (2006.01)
*A41D 3/00* (2006.01)
(Continued)

(52) U.S. Cl.
CPC .............. *A41D 27/28* (2013.01); *A41D 3/00* (2013.01); *A41D 3/02* (2013.01); *A41D 27/245* (2013.01);
(Continued)

(58) Field of Classification Search
CPC . A41D 27/28; A41D 1/02; A41D 1/04; A41D 1/08; A41D 3/02; A41D 3/00;
(Continued)

(56) References Cited

U.S. PATENT DOCUMENTS

| | | | |
|---|---|---|---|
| 317,711 A | 5/1885 | Brinkmann | |
| 385,306 A | 6/1888 | Helwitz | |

(Continued)

FOREIGN PATENT DOCUMENTS

| | | | |
|---|---|---|---|
| CN | 2337793 Y1 | 9/1999 | |
| CN | 1798536 A | 7/2006 | |

(Continued)

OTHER PUBLICATIONS

Non-Final Office Action dated May 1, 2019 in U.S. Appl. No. 15/286,913, 13 pages.

(Continued)

*Primary Examiner* — Khaled Annis
*Assistant Examiner* — Dakota Marin
(74) *Attorney, Agent, or Firm* — Shook, Hardy & Bacon L.L.P.

(57) ABSTRACT

The technology described herein relates to breathable, vented, and insulating garments. More particularly, the technology described herein relates to articles with a plurality of interconnected chambers that are configured to retain a thermally insulating fill material such as down or synthetic fibers. The plurality of interconnected chambers are formed between at least two layers of material and between a plurality of seams. The plurality of seams are configured to join the at least two layers of material together. In one aspect, each seam of the plurality of seams is angularly oriented with respect to an adjacent or neighboring seam of the plurality of seams. One or more openings or perforations may be formed on one or more seams of the plurality of seams forming the plurality of interconnected chambers. The one or more openings may achieve evaporation of moisture and/or air transfer from an interior environment of the garment to an exterior environment.

20 Claims, 44 Drawing Sheets

Related U.S. Application Data is a continuation-in-part of application No. 14/877,199, filed on Oct. 7, 2015, now Pat. No. 10,111,480, and a continuation-in-part of application No. 15/140,214, filed on Apr. 27, 2016, now Pat. No. 10,362,820, which is a continuation of application No. 13/449,783, filed on Apr. 18, 2012, now Pat. No. 9,392,825.

(51) Int. Cl.

| | | |
|---|---|---|
| A41D 3/02 | (2006.01) | |
| A41D 27/24 | (2006.01) | |
| A41D 31/102 | (2019.01) | |
| A41D 31/12 | (2019.01) | |
| B29C 65/00 | (2006.01) | |
| B29C 65/02 | (2006.01) | |
| B29C 65/50 | (2006.01) | |
| B29C 65/72 | (2006.01) | |
| B29D 99/00 | (2010.01) | |
| B29C 65/08 | (2006.01) | |
| B29C 65/62 | (2006.01) | |
| B29C 65/74 | (2006.01) | |
| B29L 31/48 | (2006.01) | |

(52) U.S. Cl.
CPC ......... *A41D 31/102* (2019.02); *A41D 31/125* (2019.02); *B29C 65/02* (2013.01); *B29C 65/5057* (2013.01); *B29C 65/72* (2013.01); *B29C 66/0326* (2013.01); *B29C 66/1122* (2013.01); *B29C 66/433* (2013.01); *B29C 66/729* (2013.01); *B29D 99/0064* (2013.01); *A41D 2300/52* (2013.01); *A41D 2400/10* (2013.01); *A41D 2600/10* (2013.01); *B29C 65/08* (2013.01); *B29C 65/62* (2013.01); *B29C 65/7437* (2013.01); *B29C 66/0346* (2013.01); *B29C 66/436* (2013.01); *B29C 66/8322* (2013.01); *B29C 2793/0045* (2013.01); *B29L 2031/485* (2013.01)

(58) Field of Classification Search
CPC ................ A41D 31/125; A41D 31/102; A41D 2400/10; A41D 2300/52; A41D 2600/10; A41B 1/08; A41B 9/00; A41B 11/00; A41B 17/00; B29C 66/729; B29C 66/433; B29C 66/5057; B29C 66/0326; B29C 66/1122; B29C 66/8322; B29C 66/0346; B29C 66/436; B29C 65/5057; B29C 65/02; B29C 65/72; B29C 65/7437; B29C 65/08; B29C 65/62; B29C 99/0064; B29C 2793/0045; B29L 2031/485
USPC .............................................................. 2/85
See application file for complete search history.

(56) References Cited

U.S. PATENT DOCUMENTS

| | | | |
|---|---|---|---|
| 1,252,187 A | | 1/1918 | Shane et al. |
| 1,252,188 A | | 1/1918 | Shane et al. |
| 1,612,010 A | | 12/1926 | Gray et al. |
| 1,788,713 A | | 1/1931 | John et al. |
| 1,788,731 A | | 1/1931 | Mishel et al. |
| 2,084,173 A | * | 6/1937 | Wexler .................. A41D 27/28 2/87 |
| 2,121,836 A | | 6/1938 | Steinberger et al. |
| 2,353,984 A | | 7/1944 | Barone et al. |
| 2,372,632 A | | 3/1945 | Webb et al. |
| 2,385,124 A | * | 9/1945 | Barone ................. A41D 27/28 112/426 |
| 2,464,380 A | | 3/1949 | Daiber et al. |
| 2,466,911 A | | 4/1949 | Raymond et al. |
| 2,540,547 A | | 2/1951 | Rodert |
| 2,781,820 A | | 2/1957 | Stanley |
| 2,851,390 A | * | 9/1958 | Chavannes .......... D06M 17/00 428/137 |
| 3,115,564 A | | 12/1963 | Stacy et al. |
| 3,405,674 A | | 10/1968 | Coates et al. |
| 3,482,567 A | | 12/1969 | Franklin |
| 3,562,041 A | | 2/1971 | Robertson et al. |
| 3,667,112 A | | 6/1972 | Grolet et al. |
| 3,706,102 A | | 12/1972 | Grenier |
| 3,761,962 A | * | 10/1973 | Myers ..................... A41D 27/28 2/79 |
| 3,771,170 A | * | 11/1973 | Leon .................. A41D 13/0155 2/97 |
| 3,782,194 A | | 1/1974 | Jankowski et al. |
| 3,801,987 A | | 4/1974 | Thompson |
| 3,819,465 A | | 6/1974 | Parsons et al. |
| 3,852,144 A | | 12/1974 | Parry et al. |
| 3,876,493 A | | 4/1975 | Gilmore |
| 3,900,159 A | | 8/1975 | Gendron |
| 4,039,709 A | | 8/1977 | Newman |
| 4,048,675 A | | 9/1977 | Griffin |
| 4,115,610 A | | 9/1978 | Wortman |
| 4,181,993 A | | 1/1980 | McDaniel |
| 4,185,327 A | * | 1/1980 | Markve .............. A41D 13/0156 2/458 |
| 4,251,312 A | | 2/1981 | Ziegler, Jr. et al. |
| 4,311,542 A | | 1/1982 | Mueller et al. |
| 4,370,754 A | | 2/1983 | Donzis |
| 4,396,039 A | | 8/1983 | Klenk et al. |
| 4,471,759 A | | 9/1984 | Anderson et al. |
| 4,496,407 A | | 1/1985 | Lowery, Sr. et al. |
| 4,502,153 A | | 3/1985 | Lapedes et al. |
| 4,547,906 A | | 10/1985 | Nishida et al. |
| 4,560,427 A | | 12/1985 | Flood et al. |
| 4,583,247 A | | 4/1986 | Fingerhut et al. |
| 4,603,069 A | | 7/1986 | Haq et al. |
| 4,604,152 A | | 8/1986 | Liukko et al. |
| 4,608,715 A | | 9/1986 | Miller et al. |
| 4,610,750 A | | 9/1986 | Mango et al. |
| 4,625,336 A | | 12/1986 | Derderian |
| 4,693,771 A | | 9/1987 | Payet et al. |
| 4,713,131 A | | 12/1987 | Obeda et al. |
| 4,716,598 A | | 1/1988 | Bertram |
| 4,737,212 A | | 4/1988 | Emrich et al. |
| 4,756,937 A | | 7/1988 | Mentzer |
| 4,788,972 A | * | 12/1988 | DeBusk .................... A61F 5/01 2/DIG. 1 |
| 4,791,685 A | * | 12/1988 | Maibauer .............. A41D 27/28 2/227 |
| 4,938,817 A | | 7/1990 | Langley et al. |
| 4,962,554 A | | 10/1990 | Tesch |
| 4,971,041 A | | 11/1990 | Millikan et al. |
| 4,971,071 A | | 11/1990 | Johnson |
| 5,001,783 A | | 3/1991 | Grilliot et al. |
| 5,003,902 A | | 4/1991 | Benstock et al. |
| 5,021,280 A | | 6/1991 | Farnworth et al. |
| 5,048,126 A | | 9/1991 | McLaughlin et al. |
| 5,067,178 A | | 11/1991 | Katchka et al. |
| 5,131,097 A | | 7/1992 | Grilliot et al. |
| 5,150,476 A | | 9/1992 | Statham et al. |
| 5,165,115 A | | 11/1992 | Stanislaw et al. |
| 5,168,576 A | | 12/1992 | Krent et al. |
| 5,201,075 A | | 4/1993 | Svetich |
| 5,255,392 A | | 10/1993 | Stanislaw et al. |
| 5,267,519 A | | 12/1993 | Uglene et al. |
| 5,267,591 A | | 12/1993 | Wakabayashi et al. |
| 5,408,700 A | | 4/1995 | Reuben et al. |
| 5,445,863 A | | 8/1995 | Slagle et al. |
| 5,446,927 A | | 9/1995 | Weldon |
| 5,483,713 A | | 1/1996 | Kikuchi et al. |
| 5,526,534 A | | 6/1996 | Lazar |
| 5,545,128 A | | 8/1996 | Hayes et al. |
| 5,665,196 A | | 9/1997 | Combe et al. |
| 5,692,245 A | | 12/1997 | Reuben |
| 5,704,064 A | | 1/1998 | Van |
| 5,713,079 A | * | 2/1998 | Simon ..................... A41D 3/00 2/243.1 |
| 5,787,502 A | | 8/1998 | Middleton |

(56) References Cited

U.S. PATENT DOCUMENTS

| | | | |
|---|---|---|---|
| 5,799,600 A * | 9/1998 | Reuben | A47G 9/0207 112/420 |
| 5,885,679 A | 3/1999 | Yasue et al. | |
| 5,924,134 A | 7/1999 | Taylor et al. | |
| 5,935,878 A | 8/1999 | Glasser et al. | |
| 5,983,409 A | 11/1999 | Aldridge et al. | |
| 6,009,560 A | 1/2000 | McKenney et al. | |
| 6,018,819 A | 2/2000 | King et al. | |
| 6,035,442 A | 3/2000 | Marando | |
| 6,038,700 A | 3/2000 | Aldridge et al. | |
| 6,049,908 A | 4/2000 | Bullock et al. | |
| 6,076,195 A | 6/2000 | Klein | |
| 6,076,196 A | 6/2000 | Masumoto | |
| 6,112,328 A | 9/2000 | Spector | |
| 6,182,297 B1 | 2/2001 | Duren et al. | |
| 6,263,511 B1 | 7/2001 | Polegato | |
| 6,279,161 B1 | 8/2001 | Johnston | |
| 6,332,221 B1 | 12/2001 | Gracey | |
| 6,339,843 B1 | 1/2002 | Grilliot et al. | |
| 6,405,375 B1 | 6/2002 | Sardi | |
| 6,427,242 B1 | 8/2002 | Bush et al. | |
| 6,547,327 B1 | 4/2003 | Yates | |
| 6,557,479 B2 * | 5/2003 | Alberts | D05B 33/00 112/475.09 |
| 6,579,403 B2 | 6/2003 | Tolbert et al. | |
| 6,632,501 B2 | 10/2003 | Brownstein et al. | |
| 6,649,251 B1 | 11/2003 | Druecke et al. | |
| 6,743,498 B2 | 6/2004 | Fourmeux | |
| 6,805,181 B2 | 10/2004 | Blundell et al. | |
| 6,808,791 B2 | 10/2004 | Curro et al. | |
| 6,817,037 B1 | 11/2004 | King | |
| 6,928,665 B1 | 8/2005 | Yates | |
| 7,005,021 B2 | 2/2006 | Kramer | |
| 7,017,191 B2 | 3/2006 | Golde | |
| 7,037,569 B2 | 5/2006 | Curro et al. | |
| 7,051,373 B1 | 5/2006 | Krall | |
| 7,094,714 B2 | 8/2006 | Lap et al. | |
| 7,111,328 B2 | 9/2006 | Bay | |
| 7,140,048 B2 * | 11/2006 | Wallerstein | A41D 13/001 2/272 |
| 7,147,911 B2 | 12/2006 | Baychar | |
| 7,378,141 B2 | 5/2008 | Polegato | |
| 7,437,774 B2 | 10/2008 | Baron et al. | |
| 7,578,005 B2 | 8/2009 | Vereen | |
| 7,757,311 B2 | 7/2010 | Garneau | |
| 7,827,624 B1 | 11/2010 | Cole | |
| 7,926,124 B2 | 4/2011 | Hunter et al. | |
| 8,028,386 B2 | 10/2011 | Rock et al. | |
| 8,057,878 B2 | 11/2011 | Lo et al. | |
| 8,070,905 B2 | 12/2011 | Brennan | |
| 8,127,701 B2 | 3/2012 | Harward | |
| 8,133,824 B2 | 3/2012 | Harber | |
| 8,377,536 B2 | 2/2013 | Cienski | |
| 8,399,085 B2 | 3/2013 | Moore, III et al. | |
| 8,458,819 B1 | 6/2013 | Hoole | |
| 8,518,511 B2 | 8/2013 | Harward | |
| D693,095 S | 11/2013 | Grant | |
| 8,578,516 B2 | 11/2013 | Li | |
| 8,756,714 B2 | 6/2014 | Reimer | |
| D713,620 S | 9/2014 | Pezzimenti et al. | |
| D713,621 S | 9/2014 | Pezzimenti et al. | |
| D714,022 S | 9/2014 | Mong et al. | |
| 8,828,167 B2 | 9/2014 | Hannon | |
| 8,840,745 B2 | 9/2014 | Green | |
| 9,023,161 B2 | 5/2015 | Ma et al. | |
| 9,138,060 B2 | 9/2015 | Vainberg et al. | |
| 9,247,830 B2 | 2/2016 | Waters et al. | |
| 9,392,825 B2 | 7/2016 | Pezzimenti et al. | |
| 9,609,901 B2 | 4/2017 | Nordstrom et al. | |
| 9,881,093 B2 | 1/2018 | Butler | |
| 10,111,480 B2 | 10/2018 | Pezzimenti | |
| 10,362,820 B2 | 7/2019 | Pezzimenti et al. | |
| 10,694,797 B2 | 6/2020 | Pezzimenti et al. | |
| 10,842,211 B2 | 11/2020 | Inoue et al. | |
| 11,019,865 B2 * | 6/2021 | Pezzimenti | A41D 27/02 |
| 2002/0016122 A1 | 2/2002 | Curro et al. | |
| 2002/0022426 A1 | 2/2002 | Curro et al. | |
| 2002/0034912 A1 | 3/2002 | Curro et al. | |
| 2002/0034913 A1 | 3/2002 | Curro et al. | |
| 2002/0114918 A1 | 8/2002 | Mossbeck et al. | |
| 2002/0142132 A1 | 10/2002 | Fourmeux | |
| 2002/0183671 A1 | 12/2002 | Henderson et al. | |
| 2003/0033656 A1 | 2/2003 | Jaeger | |
| 2003/0126673 A1 * | 7/2003 | Yardley | B29C 66/1122 2/272 |
| 2003/0138586 A1 * | 7/2003 | Fowler | B29C 65/5085 428/102 |
| 2003/0208831 A1 | 11/2003 | Lazar et al. | |
| 2004/0083538 A1 | 5/2004 | Thomas | |
| 2004/0111782 A1 | 6/2004 | Lenormand et al. | |
| 2004/0197534 A1 | 10/2004 | Miller et al. | |
| 2005/0124256 A1 | 6/2005 | Mason et al. | |
| 2005/0159056 A1 | 7/2005 | Lap et al. | |
| 2005/0249917 A1 * | 11/2005 | Trentacosta | A41D 31/102 428/137 |
| 2006/0059601 A1 | 3/2006 | Opitz et al. | |
| 2006/0135016 A1 | 6/2006 | Iwasaki | |
| 2006/0165939 A1 | 7/2006 | Hottner | |
| 2006/0185053 A1 | 8/2006 | Wittmann et al. | |
| 2006/0240234 A1 | 10/2006 | O'Neill et al. | |
| 2007/0026186 A1 | 2/2007 | Chapuis | |
| 2007/0083985 A1 | 4/2007 | Nathan et al. | |
| 2007/0186832 A1 | 8/2007 | Kishi et al. | |
| 2007/0245448 A1 | 10/2007 | Bury | |
| 2007/0294800 A1 * | 12/2007 | Huang | A41H 43/00 2/97 |
| 2008/0005823 A1 | 1/2008 | Hung | |
| 2008/0127395 A1 | 6/2008 | Blauer et al. | |
| 2008/0289078 A1 | 11/2008 | Mather | |
| 2008/0295216 A1 | 12/2008 | Nordstrom et al. | |
| 2009/0089911 A1 * | 4/2009 | Smith | A41D 31/102 2/243.1 |
| 2009/0155543 A1 | 6/2009 | Fowler | |
| 2009/0233042 A1 | 9/2009 | Sadato et al. | |
| 2009/0314696 A1 * | 12/2009 | Trentacosta | A41D 31/102 210/97 |
| 2010/0030170 A1 | 2/2010 | Keller et al. | |
| 2010/0122394 A1 | 5/2010 | Lambertz | |
| 2010/0138977 A1 | 6/2010 | Lin | |
| 2010/0143669 A1 | 6/2010 | Abrams | |
| 2010/0281595 A1 | 11/2010 | Gernes | |
| 2010/0287680 A1 | 11/2010 | Johnson et al. | |
| 2010/0291825 A1 | 11/2010 | Johnson et al. | |
| 2011/0072558 A1 | 3/2011 | Berns | |
| 2011/0119811 A1 | 5/2011 | Rock et al. | |
| 2011/0125125 A1 | 5/2011 | Schneider et al. | |
| 2011/0296580 A1 | 12/2011 | Demarest et al. | |
| 2011/0302686 A1 | 12/2011 | Chapuis | |
| 2012/0005828 A1 | 1/2012 | McCullar et al. | |
| 2012/0005829 A1 | 1/2012 | Waters et al. | |
| 2012/0005831 A1 | 1/2012 | Waters et al. | |
| 2012/0017346 A1 | 1/2012 | Reimer | |
| 2012/0114883 A1 * | 5/2012 | Kapur | A41D 31/102 428/34.1 |
| 2012/0222189 A1 | 9/2012 | Sokolowski et al. | |
| 2012/0260396 A1 | 10/2012 | Mordecai | |
| 2012/0328824 A1 | 12/2012 | Cartabbia | |
| 2013/0014317 A1 | 1/2013 | Ly | |
| 2013/0031703 A1 | 2/2013 | Curtis | |
| 2013/0038104 A1 | 2/2013 | Burns et al. | |
| 2013/0061366 A1 | 3/2013 | Pezzimenti | |
| 2013/0177731 A1 | 7/2013 | Moriarty | |
| 2013/0255103 A1 | 10/2013 | Dua et al. | |
| 2013/0276201 A1 * | 10/2013 | Pezzimenti | A41D 27/245 2/69 |
| 2013/0277349 A1 | 10/2013 | Pezzimenti | |
| 2014/0304896 A1 * | 10/2014 | Nordstrom | A41D 27/00 2/243.1 |
| 2014/0349057 A1 | 11/2014 | Blackford et al. | |
| 2015/0044943 A1 | 2/2015 | Marshall et al. | |
| 2016/0183613 A1 | 6/2016 | Martin | |
| 2016/0213077 A1 | 7/2016 | Sung | |
| 2016/0235147 A1 | 8/2016 | Pezzimenti et al. | |

(56) References Cited

U.S. PATENT DOCUMENTS

| | | | |
|---|---|---|---|
| 2016/0278459 A1* | 9/2016 | Hilty | A41D 27/28 |
| 2016/0366962 A1 | 12/2016 | Ilcheva et al. | |
| 2016/0366963 A1 | 12/2016 | Koshkaroff et al. | |
| 2017/0028669 A1 | 2/2017 | Regester et al. | |
| 2017/0065005 A1 | 3/2017 | Nordstrom | |
| 2017/0099898 A1 | 4/2017 | Pezzimenti | |
| 2017/0099899 A1 | 4/2017 | Pezzimenti et al. | |
| 2017/0105467 A1 | 4/2017 | Pezzimenti et al. | |
| 2018/0098584 A1 | 4/2018 | Pezzimenti et al. | |
| 2018/0098586 A1 | 4/2018 | Pezzimenti et al. | |
| 2018/0098588 A1* | 4/2018 | Pezzimenti | A41D 27/28 |
| 2019/0289939 A1 | 9/2019 | Pezzimenti et al. | |
| 2019/0351094 A1 | 11/2019 | Maher et al. | |
| 2020/0000640 A1 | 1/2020 | Mondal et al. | |
| 2020/0337399 A1 | 10/2020 | Pezzimenti et al. | |
| 2021/0204626 A1 | 7/2021 | Pezzimenti et al. | |
| 2022/0322772 A1 | 10/2022 | Pezzimenti | |

FOREIGN PATENT DOCUMENTS

| | | | |
|---|---|---|---|
| CN | 1864574 | A | 11/2006 |
| CN | 2927724 | Y | 8/2007 |
| CN | 101209129 | A | 7/2008 |
| CN | 101731767 | A | 6/2010 |
| CN | 201782000 | U | 4/2011 |
| CN | 201929015 | U | 8/2011 |
| CN | 201999883 | U | 10/2011 |
| CN | 202122098 | U | 1/2012 |
| CN | 202233137 | U | 5/2012 |
| CN | 202293468 | U | 7/2012 |
| CN | 202368006 | U | 8/2012 |
| CN | 202375039 | U | 8/2012 |
| CN | 103358606 | A | 10/2013 |
| CN | 103750584 | A | 4/2014 |
| CN | 203969250 | U | 12/2014 |
| CN | 203986201 | U | 12/2014 |
| CN | 204132498 | U | 2/2015 |
| CN | 204340295 | U | 5/2015 |
| CN | 105283089 | A | 1/2016 |
| CN | 205072100 | U | 3/2016 |
| CN | 206182403 | U | 5/2017 |
| EP | 1325976 | A1 | 7/2003 |
| EP | 2617306 | A1 | 7/2013 |
| EP | 3358975 | B1 | 9/2020 |
| GB | 2256359 | A | 12/1992 |
| JP | 60-152630 | U | 10/1985 |
| JP | 2001-92901 | A | 4/2001 |
| JP | 2001192901 | A | 7/2001 |
| JP | 2004-211905 | A | 7/2004 |
| JP | 2005226173 | A | 8/2005 |
| JP | 2013-129940 | A | 7/2013 |
| JP | 3185237 | U | 7/2013 |
| KR | 20090113413 | A | 11/2009 |
| KR | 200454066 | Y1 | 6/2011 |
| KR | 20-0455836 | U | 9/2011 |
| KR | 200455836 | Y1 | 9/2011 |
| WO | 03057975 | A1 | 7/2003 |
| WO | 2004082413 | A1 | 9/2004 |
| WO | 2013070086 | A1 | 5/2013 |
| WO | 2014062067 | A1 | 4/2014 |
| WO | 2014087161 | A1 | 6/2014 |
| WO | 2017/062539 | A1 | 4/2017 |
| WO | 2018/046756 | A1 | 3/2018 |

OTHER PUBLICATIONS

Office Action received for European Patent Application No. 18729254. 5, mailed on Nov. 3, 2021, 5 pages.
Notice of Allowance received for U.S. Appl. No. 15/391,187, mailed on Aug. 28, 2020, 5 pages.
Patent Board Decision received for U.S. Appl. No. 15/391,187, mailed on Jul. 24, 2020, 7 pages.
Non-Final Office action received for U.S. Appl. No. 16/439,426, mailed on Jun. 8, 2021, 20 pages.
Office Action received for European Patent Application No. 17787086. 2, mailed on May 19, 2020, 5 pages.
Office Action received for European Patent Application No. 17787734. 7, mailed on May 19, 2020, 4 pages.
Office Action received for European Patent Application No. 17787759. 4, mailed on May 19, 2020, 4 pages.
Extended European Search Report received for European Patent Application No. 21163471.2, mailed on Apr. 13, 2021, 8 pages.
Notice of Allowance received for Canadian Patent Application No. 3034404, mailed on Mar. 26, 2021, 1 page.
Office Action received for Canadian Patent Application No. 3056451, mailed on Jul. 28, 2021, 3 pages.
Communication under Rule 71(3) dated Jul. 15, 2019 in European Patent Application No. 16784652.6, 6 pages.
Final Office Action received for U.S. Appl. No. 15/255,603, mailed on Oct. 28, 2021, 9 pages.
Final Office Action received for U.S. Appl. No. 15/286,929, mailed on Oct. 21, 2021, 15 pages.
Non-Final Office Action dated Jun. 30, 2017 in U.S. Appl. No. 14/877,199, 8 pages.
Office Action received for Canadian Patent Application No. 3034298, mailed on Oct. 7, 2020, 4 pages.
Office Action received for Canadian Patent Application No. 3034404, mailed on Oct. 7, 2020, 5 pages.
Office Action received for Canadian Patent Application No. 3034446, mailed on Oct. 9, 2020, 3 pages.
Office Action received for Canadian Patent Application No. 3036225, mailed on Oct. 16, 2020, 4 pages.
Office Action received for European Patent Application No. 17787734. 7, mailed on Oct. 16, 2020, 5 pages.
Office Action received for European Patent Application No. 17787759. 4, mailed on Oct. 27, 2020, 7 pages.
Final Office Action received for U.S. Appl. No. 15/254,749, mailed on Jan. 13, 2022, 7 pages.
Non-Final Office Action received for U.S. Appl. No. 15/255,603, mailed on Jan. 12, 2022, 15 pages.
Intention to Grant received for European Patent Application No. 17787734.7, mailed on Sep. 24, 2021, 5 pages.
Non-Final Office Action dated Sep. 6, 2019 in U.S. Appl. No. 15/255,601, 16 pages.
Final Office Action dated Oct. 30, 2018 in U.S. Appl. No. 15/140,214, 14 pages.
Non-Final Office Action dated Nov. 16, 2018 in U.S. Appl. No. 15/286,913, 13 pages.
Non-Final Office Action dated Nov. 20, 2018 in U.S. Appl. No. 15/255,601, 16 pages.
Intention to Grant received for European Patent Application No. 16784652.6, mailed on Apr. 17, 2020, 6 pages.
Office Action received for Canadian Patent Application No. 3034298, mailed on Apr. 22, 2020, 5 pages.
Office Action received for Canadian Patent Application No. 3034404, mailed on Apr. 15, 2020, 6 pages.
Office Action received for Canadian Patent Application No. 3036223, mailed on Apr. 27, 2020, 6 pages.
Office Action received for Canadian Patent Application No. 3036225, mailed on Apr. 27, 2020, 6 pages.
International Search Report and Written Opinion dated Dec. 22, 2016 in International Patent Application No. PCT/US2016/055626, 11 pages.
Communication pursuant to Article 94(3) dated Feb. 13, 2019 in European Patent Application No. 16784652.6, 6 pages.
Non-Final Office Action dated Feb. 21, 2019 in U.S. Appl. No. 15/254,749, 5 pages.
Non-Final Office Action dated Feb. 21, 2019 in U.S. Appl. No. 15/255,603, 5 pages.
Final Office Action dated Mar. 6, 2019 in U.S. Appl. No. 15/255,601, 16 pages.
Notice of Allowance dated Mar. 13, 2019 in U.S. Appl. No. 15/140,214, 7 pages.
International Preliminary Report on Patentability mailed Mar. 14, 2019 in International Patent Application No. PCT/US2017/049833, 8 pages.

(56) References Cited

OTHER PUBLICATIONS

Non-Final Office Action dated Mar. 19, 2019 in U.S. Appl. No. 15/286,929, 11 pages.
Angel, "Trend: Quilted Textures," youlookfab.com, Jul. 15, 2013. Last accessed Jan. 23, 2015 at: http://youlookfab.com/2013/07/15/trend-quilted-textures/.
"Pizzoli Knit & Quilted Jacket," Boss Hugo Boss, Nordstrom, Item #73989. Last accessed Jan. 23, 2015 at: http://shop.nordstrom.com/s/boss-hugo-boss-pizzoli-knit-quilted-jacket/3782194.
"78678 North End Sport Pursuit 3-Layer Hybrid Soft Shell Jacket with Laser Perforation," Seasons Outfitters, seasonsoutfitters.com; Last accessed Jan. 23, 2015 at: http://www.seasonsoutfitters.com/index.php/outerwear-32/waterproof/78678-pursuitladies-3-layer-light-bonded-hybrid-soft-shell-jacket-with-laser-perforation.html.
"88680: Ventilate—Men's Seam-Sealed Insulated Jacket," Alphabroder, ashcity.com Last accessed Jan. 23, 2015 at: http://www.ashcity.com/en-ca/products/outerwear/insulated-seam-sealed/88680-ventilate-mens-nbsp-3bseam-sealed-insulated-jacket.html.
"Barbour Mens Chukka Quilted Jacket Military Brown Navy," Barbour, coveredbridgecyclery.com Last accessed Jan. 23, 2015 at: http://www.coveredbridgecyclery.com/barbour-mens-chukka-quilted-jacket-militarybrown-navy-1423.html.
"Greenland Baffled Jacket," Marmot® for Life, marmot.com, #5067. Last accessed Jan. 23, 2015 at: http://marmot.com/products/details/greenland-baffled-jacket.
"Laser Perforated Jacket," Akris punto, Nordstrom, Item # 251033. Last accessed Jan. 23, 2015 at: http://shop.nordstrom.com/s/akris-punto-laser-perforated-jacket/3667112.
"Mavic Helium Jacket (Men's)," MEC, mec.ca Last accessed Jan. 23, 2015 at: http://www.mec.ca/product/5038-526/mavic-helium-jacket-mens/.
"Nike Aeroloft," Nike. Last accessed Jan. 23, 2015 at: http://www.nike.com/us/en_us/c/running/aeroloft.
"Quilted Front Down Sweater Jacket," Moncler, Nordstrom, Item #803724. Last accessed Jan. 23, 2015 at: http://shop.nordstrom.com/s/moncler-quilted-front-down-sweater-jacket/3900159.
"Salomon Men's S-Lab Hybrid Jacket," Running Warehouse, runningwarehouse.com Last accessed Jan. 23, 2015 at: http://www.runningwarehouse.com/Salomon_Mens_S-Lab_Hybrid_Jacket/descpage-SMSLHJ.html.
"W's C9 Loft Jacket," Houdini, houdinisportswear.com Last accessed Jan. 23, 2015 at: http://www.houdinisportswear.com/en/women/womens-c9-loft-jacket.
"Woman's Aconcagua Jacket," The North Face, thenorthface.com. Last accessed Jan. 23, 2015 at: http://www.thenorthface.com/catalog/sc-gear/womens-jackets-vests/women-8217-saconcagua-jacket.html.
"Women's Better than Naked Cool Jacket," The North Face®, thenorthface.com Last accessed Jan. 23, 2015 at: http://www.thenorthface.cornicatalog/sc-gear/women-39-s-better-than-nakedcool-jacket.html.
"Women's Old Navy Active Front-Quilted Jackets," Old Navy, oldnavy.gap.com Last accessed Jan. 23, 2015 at: http://oldnavy.gap.com/browse/product.do?vid=1&pid=172238002.
"Rab Microlight Alpine Down Jacket," backcountry.com, Item # RAB0244. Last accessed Jan. 23, 2015 at: http://www.backcountry.com/rab-microlight-alpine-down-jacketwomens?CMP_SKU=RAB0244&MER=0406&skid=RAB0244-ORC-USXLUS16.
Bendzovski, Daniel, "Trend-sandwich: Exploring new ways of joining inspiration, such as different kinds of trends, through processes of morphing and melding different trendy garments and materials, for new methods, garment types, materials and expressions," Univ. of Borås, 2015. http://www.diva-portal.org/smash/get/diva2:825758/FULLTEXT01.pdf.
Final Office Action dated Jun. 1, 2017 in U.S. Appl. No. 15/391,187, 11 pages.
Intention to Grant received for European Patent Application No. 17787086.2, mailed on Nov. 13, 2020, 6 pages.
Office Action received for Canadian Patent Application No. 3036223, mailed on Nov. 30, 2020, 5 pages.
Office Action received for Canadian Patent Application No. 3056451, mailed on Nov. 6, 2020, 3 pages.
Office Action received for Canadian Patent Application No. 3034446, mailed on Jan. 30, 2020, 3 pages.
Non-Final Office Action received for U.S. Appl. No. 15/724,702, mailed on Sep. 30, 2020, 12 pages.
Final Office Action received for U.S. Appl. No. 15/724,702, mailed on Jun. 17, 2020, 12 pages.
Non-Final Office Action received for U.S. Appl. No. 15/254,749, mailed on Jun. 26, 2020, 8 pages.
Notice of Allowance received for U.S. Appl. No. 15/286,913, mailed on Jun. 10, 2020, 12 pages.
Notice of Allowance received for Canadian Patent Application No. 3034446, mailed on May 18, 2021, 1 page.
Notice of Allowance received for Canadian Patent Application No. 3036223, mailed on May 10, 2021, 1 page.
International Preliminary Report on Patentability dated Apr. 19, 2018 in International Patent Application No. PCT/US2016/055626, 8 pages.
Non-Final Office Action dated Jun. 5, 2018 in U.S. Appl. No. 15/286,929, 12 pages.
Non-Final Office Action dated Jun. 14, 2018 in U.S. Appl. No. 15/140,214, 13 pages.
Non-Final Office Action dated Jun. 21, 2018 in U.S. Appl. No. 15/391,187, 13 pages.
Non-Final Office Action dated Jul. 3, 2018 in U.S. Appl. No. 15/255,603, 8 pages.
Office Action dated Jul. 18, 2018 in European Patent Application No. 16179320.3, 4 pages.
Non-Final Office Action dated Jul. 31, 2018 in U.S. Appl. No. 15/254,749, 8 pages.
International Search Report and Written Opinion dated Sep. 3, 2018 in International Patent Application No. PCT/US2018/033094, 13 pages.
Notice of Allowance received for U.S. Appl. No. 16/439,426, mailed on Sep. 15, 2021, 7 pages.
Intention to Grant received for European Patent Application No. 19197002.9, mailed on Jul. 6, 2020, 7 pages.
International Preliminary Report on Patentability mailed Apr. 18, 2019 in International Patent Application No. PCT/US2017/055308, 8 pages.
International Preliminary Report on Patentability mailed Apr. 18, 2019 in International Patent Application No. PCT/US2017/055094. 8 pages.
International Preliminary Report on Patentability mailed Apr. 18, 2019 in International Patent Application No. PCT/US2017/055095, 7 pages.
Extended European Search Report received for European Patent Application No. 19197002.9, mailed on Oct. 16, 2019, 7 pages.
Non-Final Office Action received for U.S. Appl. No. 15/724,702, mailed on Jan. 30, 2020, 11 pages.
Office Action received for Sri Lankan Patent Application No. 20396, mailed on Dec. 23, 2019, 1 page.
Final Office Action received for U.S. Appl. No. 15/286,929, mailed on Jan. 8, 2021, 13 pages.
Non-Final Office Action received for U.S. Appl. No. 15/255,603, mailed on Jan. 26, 2021, 7 pages.
Notice of Allowance received for U.S. Appl. No. 15/724,702, mailed on Feb. 1, 2021, 7 pages.
International Search Report and Written Opinion dated Dec. 18, 2017 in International Patent Application No. PCT/US2017/049833, 14 pages.
International Search Report and Written Opinion dated Dec. 18, 2017 in International Patent Application No. PCT/US2017/049840, 13 pages.
International Search Report and Written Opinion dated Dec. 20, 2017 in International Patent Application No. PCT/US2017/055094, 14 pages.
International Search Report and Written Opinion dated Dec. 20, 2017 in International Patent Application No. PCT/US2017/055095, 13 pages.

(56) References Cited

OTHER PUBLICATIONS

International Search Report and Written Opinion dated Dec. 20, 2017 in International Patent Application No. PCT/US2017/055308, 14 pages.
Non-Final Office Action dated Oct. 6, 2017 in U.S. Appl. No. 15/391,187, 12 pages.
Final Office Action dated Feb. 22, 2018 in U.S. Appl. No. 15/391,187, 13 pages.
Notice of Allowance dated Mar. 5, 2018 in U.S. Appl. No. 14/877,199, 5 pages.
Non-Final Office Action received for U.S. Appl. No. 15/286,929, mailed on Apr. 15, 2021, 13 pages.
Notice of Allowance received for Canadian Patent Application No. 3034298, mailed on Feb. 23, 2021, 1 page.
Notice of Allowance received for Canadian Patent Application No. 3036225, mailed on Mar. 26, 2021, 1 page.
Office Action received for European Patent Application No. 17765040.5, mailed on Mar. 12, 2021, 7 pages.
Office Action received for European Patent Application No. 17765042.1, mailed on Mar. 23, 2021, 5 pages.
Office Action received for European Patent Application No. 17787734.7, mailed on Mar. 15, 2021, 5 pages.
Office Action received for European Patent Application No. 17787759.4, mailed on Mar. 19, 2021, 4 pages.
Non Final Office Action received for U.S. Appl. No. 15/255,603, mailed on Mar. 6, 2020, 7 pages.
Intention to Grant received for European Patent Application No. 17787759.4, mailed on Jun. 11, 2021, 5 pages.
Office Action received for Canadian Patent Application No. 3001345, mailed on May 28, 2021, 4 pages.
Intention to Grant received for European Patent Application No. 16179320.3, mailed on Jan. 15, 2020, 8 pages.
International Preliminary Report on Patentability received for PCT Patent Application No. PCT/US2018/033094, mailed on Nov. 28, 2019, 7 pages.
Non-Final Office Action received for U.S. Appl. No. 15/254,749, mailed on Dec. 13, 2019, 7 pages.
Non-Final Office Action received for U.S. Appl. No. 15/286,913, mailed on Dec. 9, 2019, 13 pages.
Notice of Allowance received for U.S. Appl. No. 15/255,601, mailed on Jan. 13, 2020, 7 pages.
Final Office Action received for U.S. Appl. No. 15/988,138, mailed on Feb. 28, 2022, 12 pages.
Office Action received for Canadian Patent Application No. 3,056,451, mailed on Mar. 2, 2022, 3 pages.
Office Action received for European Patent Application No. 21163471.2, mailed on Mar. 18, 2022, 6 pages.
Office Action received for Sri Lankan Patent Application No. 20396, mailed on Feb. 15, 2022, 1 page.
Final Office Action received for U.S. Appl. No. 15/255,603, mailed on May 18, 2022, 14 pages.
Non-Final Office Action received for U.S. Appl. No. 16/924,781, mailed on Apr. 28, 2022, 26 pages.
Notice of Allowance received for Canadian Patent Application No. 3001345, mailed on May 3, 2022, 1 page.
Notice of Allowance received for U.S. Appl. No. 15/254,749, mailed on Mar. 30, 2022, 9 pages.
Notice of Allowance received for U.S. Appl. No. 15/255,603, mailed on Sep. 30, 2022, 10 pages.
Notice of Allowance received for Canadian Patent Application No. 3,056,451, mailed on Nov. 8, 2022, 1 page.
Office Action received for Canadian Patent Application No. 3,125,031, mailed on Oct. 28, 2022, 4 pages.
Non-Final Office Action received for U.S. Appl. No. 17/208,548, mailed on Dec. 14, 2022, 10 pages.
Office Action received for European Patent Application No. 17765040.5, mailed on Jan. 24, 2023, 5 pages.
Office Action received for European Patent Application No. 17765042.1, mailed on Jan. 26, 2023, 5 pages.
Office Action received for European Patent Application No. 21163471.2, mailed on Jan. 24, 2023, 4 pages.
Final Office Action received for U.S. Appl. No. 16/924,781, mailed on Nov. 1, 2022, 22 pages.
Notice of Allowance received for U.S. Appl. No. 16/924,781, mailed on Mar. 23, 2023, 11 pages.
Notice of Allowance received for U.S. Appl. No. 17/208,548, mailed on Mar. 29, 2023, 10 pages.
Notice of Allowance received for Canadian Patent Application No. 3,125,031, mailed on Jun. 12, 2023, 1 page.
Intention to Grant received for European Patent Application No. 18729254.5, mailed on Sep. 19, 2023, 7 pages.
Non-Final Office Action received for U.S. Appl. No. 17/843,684, mailed on Sep. 27, 2023, 11 pages.
Non-Final Office Action received for U.S. Appl. No. 18/083,930, mailed on Sep. 29, 2023, 13 pages.
"Rab Microlight Alpine Down Jacket," backcountry.com, Item # RAB0244. Lasted accessed Jan. 23, 2015 at: http://www.backcounty.com/rab-microlight-alpine-down-jacketwomens?CMP_SKU=RAB0244&MER=0406&skid=RAB024-ORC-USXLUS16.
Final Office Action dated May 1, 2019 in U.S. Appl. No. 15/286,913, 13 pages.
Final Office Action dated Oct. 9, 2018 in U.S. Appl. No. 15/286,929, 13 pages.
Intention to Grant received for European Application No. 16179320.3, mailed on Apr. 2, 2020, 8 pages.
Intention to grant received for European Application No. 21163471.2, mailed on Nov. 27, 2023, 6 pages.
Non-Final Office Action received for U.S. Appl. No. 15/988,138, mailed on Jun. 25, 2020, 10 pages.
Notice of Allowance received for U.S. Appl. No. 17/843,684, mailed on Jan. 30, 2024, 10 pages.
Notice of Allowance received for U.S. Appl. No. 18/083,930, mailed on Feb. 5, 2024, 9 pages.

\* cited by examiner

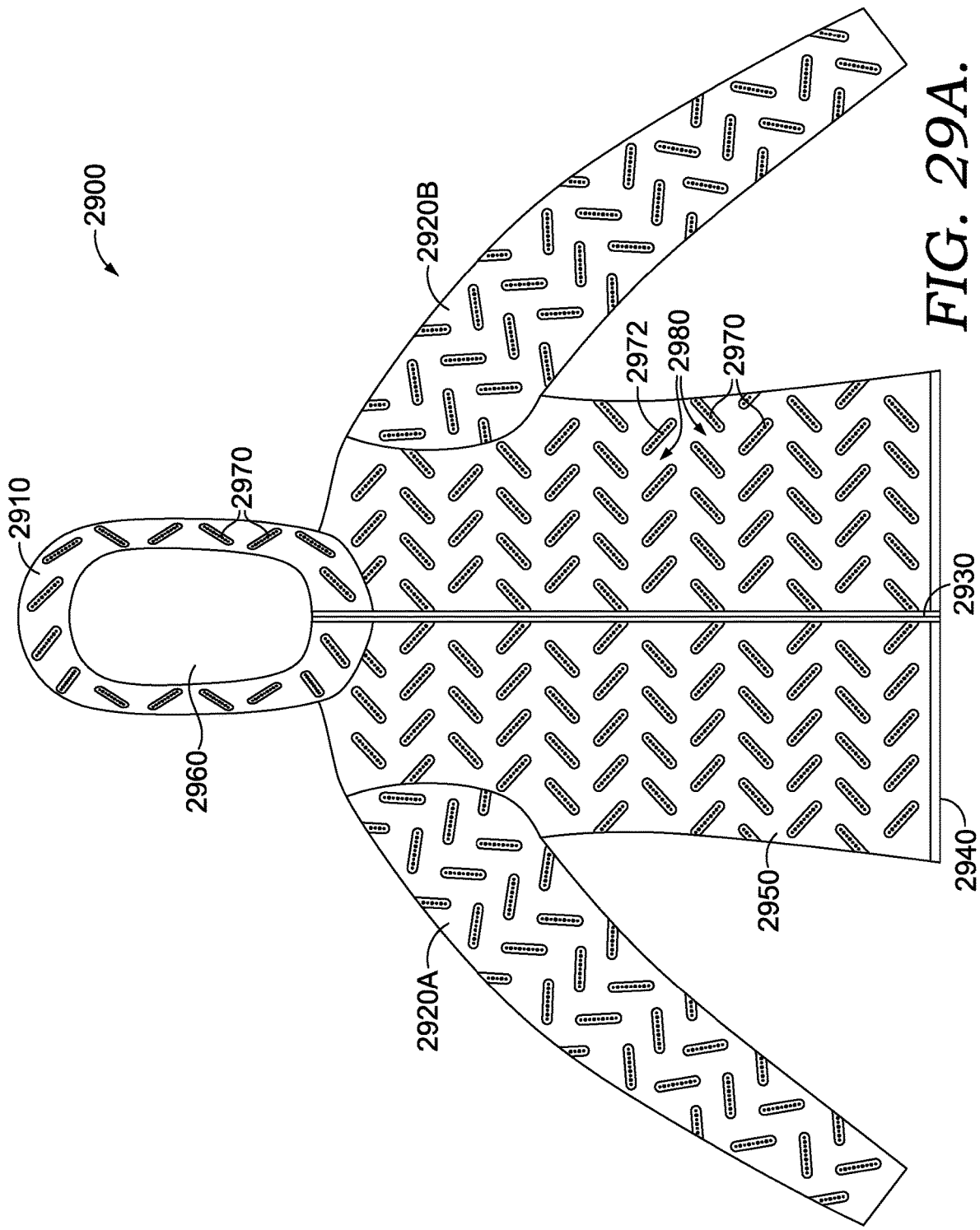

VENTED GARMENT

CROSS-REFERENCE TO RELATED APPLICATIONS

This application having been assigned U.S. patent application Ser. No. 15/597,540, filed May 17, 2017, and entitled "Vented Garment," is a continuation-in-part application of U.S. application Ser. No. 15/255,603, filed Sep. 2, 2016, and entitled "Vented Garment," which issued as U.S. Pat. No. 11,606,992 on Mar. 21, 2023, U.S. application Ser. No. 15/255,603 is a continuation-in-part application of U.S. application Ser. No. 14/877,199, filed Oct. 7, 2015, and entitled "Vented Garment," which issued as U.S. Pat. No. 10,111,480 on Oct. 30, 2018. U.S. application Ser. No. 15/255,603 is also a continuation-in-part application of U.S. application Ser. No. 15/140,214, filed Apr. 27, 2016, and entitled "Cold Weather Vented Garment," which issued as U.S. Pat. No. 10,362,820 on Jul. 30, 2019 U.S. application Ser. No. 15/140,214 is a continuation application of U.S. application Ser. No. 13/449,783, filed Apr. 18, 2012, and entitled "Cold Weather Vented Garment," which issued as U.S. Pat. No. 9,392,825 on Jul. 19, 2016. The entireties of the aforementioned applications are incorporated by reference herein.

STATEMENT REGARDING FEDERALLY SPONSORED RESEARCH OR DEVELOPMENT

Not applicable.

TECHNICAL FIELD

Aspects of the technology described herein relate to a garment with vents that allow moisture vapor to exit the garment while still retaining heat from a wearer's body. More particularly, the technology described herein relates to breathable, insulating, cold-weather garments that keep the wearer warm and dry when the environmental temperature falls below a comfortable temperature for the wearer.

BACKGROUND

With the desire to stay active year round, there is a need for breathable, insulating garments for use during physical activity in the cooler months of the year. Conventional cold-weather garments may not allow for moisture vapor from perspiration and/or sufficient body heat to escape from the inside of the garment. This is especially the case when the cold-weather garment includes insulation, because the insulation may significantly reduce the moisture-vapor transmission rate through the garment. The trapping of moisture from perspiration may be particularly problematic for garments constructed from water-resistant fabrics. For instance, garments with fill material such as down or fibers are generally constructed of textiles that are resistant to the fill material penetrating the textile, either partially or entirely. Such fill-proof textiles may be created using treatments such as a durable water repellant (DWR) or by weaving or knitting a textile of sufficient weight to retain the fill material. Although these approaches often render the textile water-resistant, they may trap moisture vapor inside of the garment, which may then lead to discomfort for the wearer and may make the garment less effective as a cold-weather insulating garment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein generally relates to a vented garment that is insulating and breathable, which may facilitate the release of moisture vapor and heat from inside the garment. The vented garment in accordance with the technology described herein may be advantageous, for example, for a wearer undergoing physical exertion, such as aerobic activities (e.g., running, biking, hiking, snowboarding, skiing, etc.), physical labor, or other perspiration-inducing activities. When a person exercises, one possible physiological response is to cool down the body by releasing moisture in the form of perspiration. Perspiration still occurs in cold weather and might increase when a person wears heat-insulating garments. Therefore, an aspect of the technology described herein provides an insulating garment that may protect a wearer from external environmental conditions, while still allowing for moisture from perspiration to escape to the exterior environment. In addition, the technology may regulate an interior temperature of the garment by facilitating a transfer of heat through the garment.

In a First Realization in Accordance with Aspects Herein:

The technology described herein allows moisture and/or heat to escape from the garment through a plurality of openings formed on one or more seams defined by seam boundaries comprising at least a first edge and a second edge. The seams, for instance, are configured to join exterior and interior garment layers, each garment layer comprising an interior and an opposite exterior surface. Each opening in the plurality of openings are configured to extend through at least one seam in the one or more seams, through the exterior and the interior garment layers, thereby allowing for ventilation between an interior and an exterior of the garment. The one or more seams may be formed by actively adhering the interior surfaces of the interior and exterior garment layers together with, for example, a suitable adhesive at predetermined portions of the interior and exterior garment layers. Alternatively, the one or more seams may be formed by stitching the interior and the exterior garment layers together to form seam boundaries for each seam. And in yet another aspect, the one or more seams may be formed by both adhering the interior surfaces of the interior and exterior garment layers and by adding stitching to the seam boundaries, thereby reinforcing each seam in the one or more seams. When the one or more seams joining the interior and exterior garment layers are formed, the one or more seams may define a discrete chamber between, for example, a pair of seams, in one aspect, where each chamber may be filled with thermally insulating materials such as synthetic fill material and/or down, for thermal insulation. In another aspect, as will become more apparent with respect to the description of the figures, a plurality of seams may be collectively configured to form or define a plurality of interconnected chambers. As used throughout this disclosure, the term "interconnected chambers" may be defined as two or more chambers that are connected to each other forming a continuous open path between the chambers (i.e., no seam or other structure interrupting or separating the two or more chambers from one another).

In a Second Realization in Accordance with Aspects Herein:

The technology described herein is further directed to insulated garments that comprise localized insulation, wherein the localized insulation comprises one or more vented-insulation panels that allow moisture and/or heat to escape from the garment through a plurality of openings formed on one or more seams formed on the vented-insulation panels. Each of the vented-insulation panels comprise exterior and interior layers, each of the exterior and interior layers comprise interior and opposite exterior surfaces. The vented-insulation panels comprise a plurality of openings formed on one or more seams joining, for instance, the exterior and interior layers of the vented-insulation panels. Each opening in the plurality of openings extends through the exterior and the interior layers of the vented-insulation panels in a similar manner as described above with respect with the first realization in accordance with aspects herein. The vented-insulation panels may be specifically localized to garment areas that correspond with areas of a wearer's body that are prone to faster heat loss by the production of perspiration and/or heat. Such areas of a wearer's body may comprise, for example, the chest region, thighs, armpits, upper back, and the like. Therefore, garments using the vented-insulation panels may have the vented-insulation panels localized to maximize the retention of heat while still allowing for moisture venting. The vented-insulation panels may also be located based on the comfort of the wearer when, for example, exercising.

In a Third Realization in Accordance with Aspects Herein:

The technology described herein allows moisture and/or heat to escape from a garment comprising, for example, at least a first continuous garment layer with one or more vented-insulation sections on the first continuous garment layer at predetermined locations configured to align with areas of a wearer's body that are prone to produce more perspiration, or in the alternative, areas of the wearer's body that are prone to release more heat, thereby providing thermal insulation to these areas, without the added bulk of a conventional, full coverage thermally insulating garment. The vented-insulation sections comprising a plurality of openings formed on one or more seams joining, for instance, exterior and interior layers of the vented-insulation sections, each opening in the plurality of openings extending through the exterior and the interior layers of the vented-insulation sections. Therefore, garments using the vented-insulation sections may maximize the retention of heat and comfort for a wearer, while still allowing for moisture venting.

In a Fourth Realization in Accordance with Aspects Herein:

The technology described herein allows moisture and/or heat to escape from the garment through a passage formed between, for instance, exterior and interior garment panels. In exemplary aspects, the interior garment panel may comprise an interior opening to the passage, and the exterior garment panel, which may be an insulated garment panel, may comprise an exterior opening from the passage. Each passage may have multiple interior openings and exterior openings. And each garment may have multiple passages. The technology described herein offsets the interior openings from the exterior openings to provide an indirect passage for moisture vapor and/or air to exit the garment. In other words, the offset openings cause the moisture vapor to traverse the passage when exiting the garment instead of passing directly through the interior opening to the exterior opening. Moreover, the offset openings also cause heat produced by the body to traverse the passage prior to exiting the garment thereby preventing rapid heat loss. Thus, an object of the technology described herein is to facilitate moisture transport out of the garment while maintaining an appropriate amount of heat loss.

Additional objects, advantages, and novel features will be set forth in part in the description which follows, and in part will become apparent to those skilled in the art upon examination of the following, or may be learned by practice of the technology described herein.

BRIEF DESCRIPTION OF THE SEVERAL VIEWS OF THE DRAWING

The technology described herein is described in detail below with reference to the attached drawing figures, wherein:

FIGS. 29A and 29B depict front and back views of an additional exemplary garment in accordance with aspects herein;

DETAILED DESCRIPTION

Figure 1A:
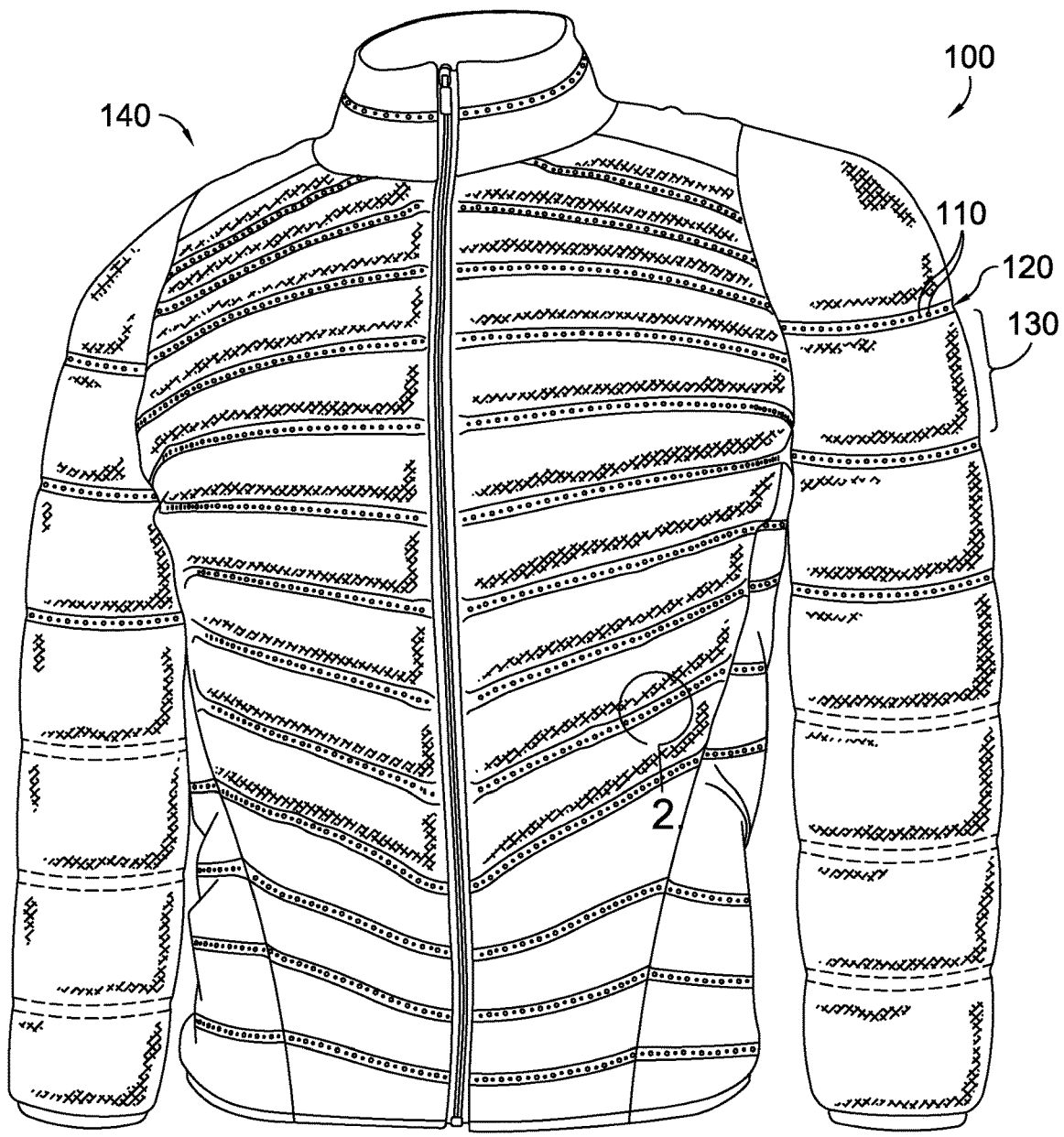
FIGS. 1A and 1B are a front and back view of an exemplary vented garment in accordance with the technology described herein.

The aspects described throughout this specification are intended in all respects to be illustrative rather than restrictive. Upon reading the present disclosure, alternative aspects will become apparent to ordinary skilled artisans that practice in areas relevant to the described aspects without departing from the scope of this disclosure. In addition, aspects of this technology are adapted to achieve certain features and possible advantages set forth throughout this disclosure, together with other advantages which are inherent. It will be understood that certain features and subcombinations are of utility and may be employed without reference to other features and subcombinations. This is contemplated by and is within the scope of the claims.

This technology is generally directed to a garment structure that facilitates the passive transfer of moisture and/or body heat from an internal portion of the garment to an external portion of the garment. For example, a garment may have an internal layer (e.g., interior panel) and an external layer (e.g., exterior garment panel), and aspects of the present technology are directing to transferring moisture vapor and/or heat from the internal layer to the external layer. The moisture vapor and/or heat can then dissipate or be dispersed into the space outside the garment.

The insulating vented garments in accordance with aspects herein, may be manufactured from light-weight fabric and may comprise a number of insulating, down, or synthetic fiber-filled chambers, optionally separated by seams. In one aspect, the garments may be woven or knit to comprise chambers created without seams. When seams are included in the garment, the seams separating the chambers may be spaced at varying intervals and may have any orientation and/or shape. In one example, the vented garment may be a standalone garment. The garment may be in the form of a vest covering a person's body core area, a jacket or coat with sleeves, pants, a total body suit, shirts, tights, base layers, and the like.

In one exemplary aspect, the seams may be formed by, for instance, actively adhering two panels (such as an interior and an exterior panel) of woven/knit fabric together to form a garment panel or a vented-insulation section. The seams may be adhered together with, for example, a suitable adhesive material, by stitching or bonding the two panels of fabric together, or by both using the adhesive tape and stitching or bonding. In the case of certain fabrics, an adhesive may not be needed if the fabrics can be bonded without the use of adhesive.

In one example, the vented garments may be formed from one or more garment panels, each garment panel comprising an inner panel and a corresponding outer panel joined at one or more seams formed along predetermined sections to form chambers having a desired shape and size, where the seams may be formed by heat bonding, applying an adhesive to an interior face of at least one of the inner panel and outer panel and activating the adhesive, stitching along first and second seam defining edges, or using both bonding and stitching. Therefore, one or more chambers are formed between at least each pair of seams. The spacing of the seams may vary, as may the relative orientation of the seams and/or the shape of the seams, enabling the chambers to have different shapes and sizes. The chambers may be filled with down, or synthetic insulating materials. The seams may comprise a plurality of openings extending through the inner panel and the outer panel to form vents that allow heat and moisture from perspiration to escape from an interior of the garment to an exterior of the garment.

In another example, interior openings may be formed in the interior panel at the seam area, exterior openings may or may not be offset from the interior openings may be formed in the exterior panel at the seam area, and a passage may be formed connecting the interior openings with the exterior openings at the seam area. When the interior openings and exterior openings are both located in the seam area, then the seam may be formed by a method that does not seal the interior and exterior panels together within the seam area where the openings are located, such as by two parallel tracks of stitching or bonding thereby creating a passage that connects the interior openings to the exterior openings.

In another exemplary aspect, the insulating vented garment may comprise an additional interior panel that is affixed at one or more areas to an exterior garment panel having the chambers separated by seams. In this aspect, the additional interior panel may or may not comprise additional openings formed in the additional interior panel and the exterior openings may be formed in the seam area between the chambers. If provided, the interior openings may be offset from the exterior openings. A passage may then be formed in the space between the additional interior panel and the exterior garment panel having the chambers separated by the seams. Alternatively, if not provided, the additional interior panel may be a continuous interior panel that does not comprise any openings or voids. Or in other words, the fabric or textile of the interior panel comprises unbroken or uninterrupted threads throughout the interior panel. In a further aspect, the technology described herein, when provided, the interior openings are offset from the exterior openings to provide an indirect passage for moisture vapor and/or heat to pass from the interior panel to the exterior panel. In other words, the offset interior and exterior openings create passages that may include one or more changes in direction and that is not completely perpendicular to the respective planes of the interior panel and the exterior panel. The indirect passage may also provide resistance to air movement and moisture that helps regulate the amount of air and moisture leaving the garment. In one exemplary aspect, the materials of construction and the length of the indirect passages can be used in a garment to provide an appropriate amount of resistance to achieve the desired moisture and heat transmission. Thus, an object of the technology described herein is to facilitate moisture transport out of the garment while minimizing heat loss.

The openings may be positioned in various portions of the interior and exterior garment portions. For example, in one aspect the openings are located in seam areas within a perimeter of the seam areas. The openings might be created in seams using various techniques. For instance, after the seams are formed, the seams may then be perforated/cut with a laser cutter, an ultrasonic cutting wheel, a water-jet cutter, a mechanical cutter, or the like to form the openings. With certain types of equipment, the affixing and perforating/cutting steps may be performed simultaneously, for example by using a welding and cutting wheel. The plurality of openings cut on the seams may be of different shapes and sizes and may create different patterns. The plurality of openings may be continuous along the seams, or may be intermittently placed along the seams. In addition, the plurality of openings may be placed strategically on seams located close to higher-perspiration areas (e.g., along the back of a wearer or under the arms of a wearer). The size and number of the plurality of openings may be optimized to allow a desired level of ventilation, while still maintaining heat insulation close to the body of the wearer.

Materials of Construction

Vented garments in accordance with the technology described herein may be constructed using woven or knit fabrics. The woven or knit fabrics may be optionally treated with down-proofing chemical treatments, and/or water repellants that may also act as down-proofing treatments, such chemical treatments referred to as DWR (durable water repellant). Although DWR is a waterproofing chemical treatment, in addition to waterproofing the fabric, it is also very useful for down-proofing fabrics, especially light and ultra-light weight fabrics. For example, fabrics that may particularly benefit from DWR treatment for down proofing are light fabrics (89 $g/m^2$ to 30 $g/m^2$) and ultra-light fabrics (29 $g/m^2$ or lighter). In some instances, down can have sharp shafts that can poke holes through light-weight fabrics, making the fabric more susceptible to tearing or down loss over time. Other types of fill material, such as polyester fibers, may lack the sharp shafts of down but are still challenging to contain within a light-weight textile. Heavier fabrics, such as fabrics with weights in the range of 90 $g/m^2$ to 149 $g/m^2$ or even 150 $g/m^2$ to 250 $g/m^2$ or higher, may be inherently more resistant to down and may or may not need a down-proofing treatment depending on the specific type of fabric/textile. Both heavy and light-weight fabrics may be used in garments in accordance with the technology described herein. Lighter weight fabrics may be more desirable in the manufacture of athletic and/or high aerobic activity insulating garments to minimize the garment weight.

In exemplary aspects, the insulating garment may be manufactured from a light-weight fabric and may comprise a number of insulating, down, or synthetic fiber-filled chambers, separated by seams. Seams separating chambers may be located at various areas of the garment, spaced at varying intervals, and may have any orientation and/or shape. The seams may be formed by actively adhering an exterior or outer panel and an interior or inner panel of fabric together with a suitable adhesive tape material to form an exterior garment panel, by stitching the two panels of fabric together, or by both using the adhesive tape and stitching. In the case of certain fabrics, a tape may not be needed if the fabrics can be bonded without the use of tape.

In one aspect, one or more portions of the insulating zones and/or the vented garment may be constructed using a weaving or knitting process (e.g., a weaving or knitting machine may be programmed to form various structures or constructions described herein). For example, such weaving or knitting processes may be used to form a seamless or nearly seamless garment or portions thereof.

Form Factor

The vented insulated garment described herein can take several forms. In one example of the garment in accordance with the technology described herein, the garment may be a standalone garment. The garment may be in the form of a vest covering a person's body core area, a jacket or coat with sleeves, pants, a skirt, a total body suit, ski pants, short pants, capri pants, long pants, a clothing liner, and the like. In other aspects, the technology described herein may be used in non-garment type articles such as sleeping bags, sacks, backpacks, purses, and the like, where thermal insulation and breathability may be needed or advantageous.

Alternatively, the garment in accordance with the technology described herein may be used as a removable interior-insulating panel having an exterior shell which may or may not be weather proof. This interior-insulating panel may also be worn as a standalone garment when detached from the exterior shell. Like in the previous example, the removable interior-insulating panel may be presented as a vest, a jacket, a body suit, and the like, depending on the type of garment and protection desired. For example, if the exterior shell is a long sleeved jacket, the interior-insulating panel may be presented as a vest, a jacket, or a jacket with removable sleeves to convert into a vest, depending on the amount of insulation desired. The interior-insulating panel may be fastened to the exterior shell by a zipper mechanism, buttons, hook-and-loop fasteners, or other suitable fastening mechanism or combination of fastening mechanisms.

Further, the vented garment may be engineered into an exterior shell. In other words, instead of being removable, an interior insulating and breathable panel in accordance with the technology described herein may be permanently attached to the exterior shell. This may be achieved by permanently affixing the exterior shell to the interior insulating and breathable panel at one or more areas using, for instance, stitching, bonding, welding, adhesives, and the like. Alternatively, an interior insulating and breathable panel may be integrated into an exterior shell panel by, for instance, integrally forming the interior insulating and breathable panel with the exterior shell using an engineered knitting and/or weaving process. Any and all aspects, and any variation thereof, are contemplated as being within the scope herein.

Definitions

Exterior panel: As used herein the phrase "exterior panel" describes a panel on the exterior of the garment. The exterior panel may be exposed to the external environment, or may not be exposed to the environment, for example, if the garment is worn under another garment or layer.

Exterior opening: As used herein the phrase "exterior opening" describes an opening in the exterior panel.

Interior panel: As used herein the phrase "interior panel" describes a panel inside of or interior to the exterior panel. A garment may have multiple interior panels.

Interior opening: As used herein the phrase "interior opening" describes an opening in an interior panel.

Water-Resistant Fabric: As used herein "water-resistant fabric" is a fabric that is substantially impervious to water. In some exemplary aspects, the term "water-resistant fabric" may be defined as a fabric that has greater than 1,000 mm of water resistance, which is the amount of water, in mm, which can be suspended above the fabric before water seeps through. However, values above and below this threshold are contemplated as being within the scope herein.

Non-breathable Fabric: As used herein "non-breathable fabric" is fabric that exhibits a low rate of moisture vapor transmission. In some exemplary aspects, a fabric may be defined as being non-breathable when it has a moisture vapor transmission rate less than 1000 ($g/m^2/d$), which is the rate at which water vapor passes through the fabric, in grams of water vapor per square meter of fabric per 24-hour period ($g/m^2/d$). However, values above and below this threshold are contemplated as being within the scope herein.

Weather-Resistant Fabric: As used herein "Weather-Resistant Fabric" is a fabric that is generally resistant to water and/or wind. In some instances, a weather-resistant fabric may comprise a fabric that is substantially impervious to water and exhibits a low rate of moisture vapor transmission.

Passage: As used herein the term "passage" is a space between garment layers where the garment layers are not directly connected. The passage is configured to and allows for the passage of moisture or moisture vapor and/or air.

Vented-insulation section: As used herein refers to a pod-type construction wherein a first/interior layer of pliable material and a second/exterior layer of pliable material are affixed to each other at one or more seams, wherein the one or more seams define one or more chambers between the first layer of pliable material and the second layer of pliable material. The chambers contain a thermally insulating material and the one or more seams comprise, at least in part, one or more openings on the one or more seams through the first layer of pliable material and through the second layer of material. The pod type construction is configured to cover only a portion of an exterior surface of the garment, for example, less than 50% of an exterior surface of the garment.

First/interior layer/panel: As used herein refers to a layer of material comprising a first/exterior surface and an opposite second/interior surface and, wherein the first/exterior surface is configured to face toward a body surface of a wearer when the garment is worn, and wherein the second/interior surface is configured to face toward the thermally insulating material contained within the chamber.

Second/exterior layer/panel: As used herein refers to a layer of material comprising a first/exterior surface and an opposite second/interior surface and, wherein the first/exterior surface is configured to face toward an external environment, away from the body surface of a wearer when the garment is worn, and wherein the second/interior surface is configured to face toward the thermally insulating material contained within the chamber.

Figure 1B:
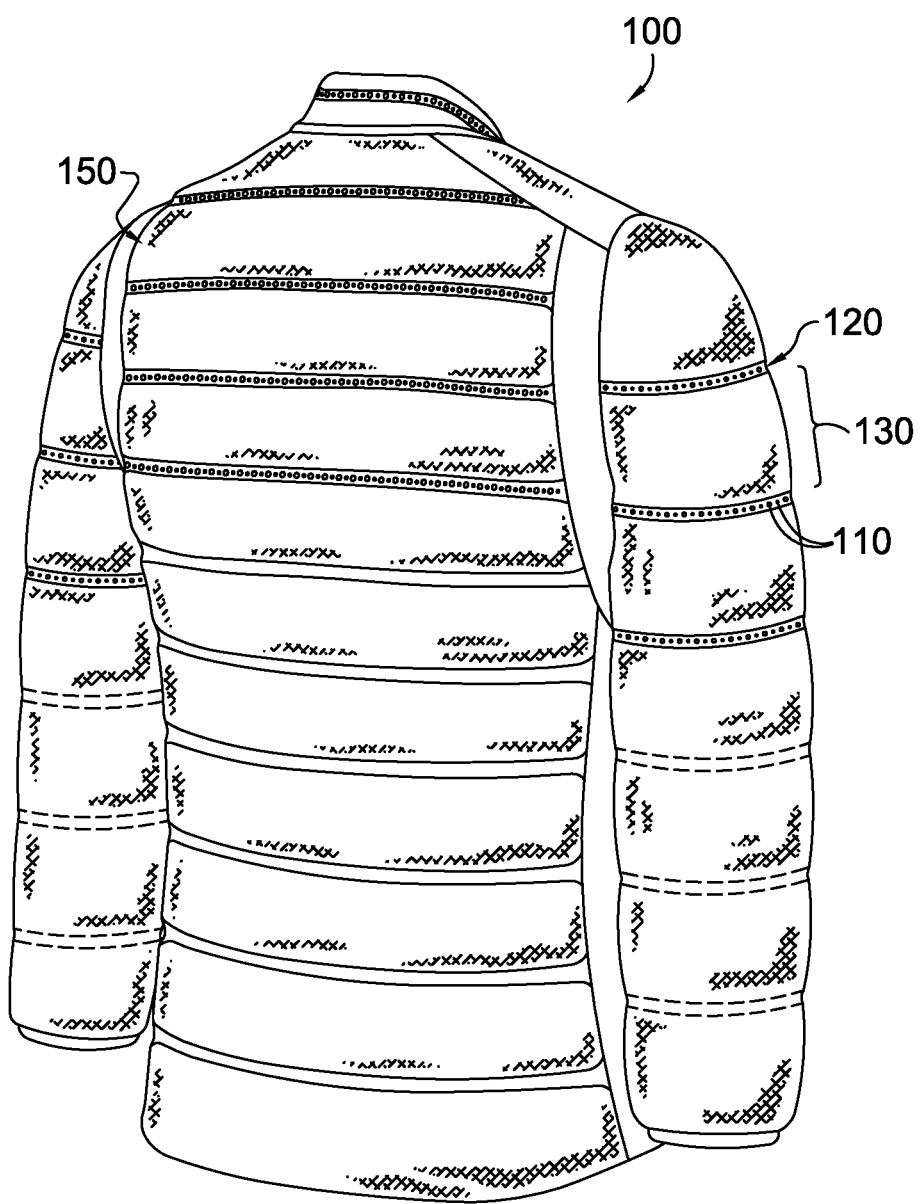

FIGS. 1A and 1B are a front view 140 and a back view 150 of a vented garment 100 in accordance with the technology described herein. The vented garment 100 in FIGS. 1A and 1B may be made from conventional synthetic or natural fabrics. The fabrics may be knit or woven to make the down or fill proof, the fabrics may be water-repellent and/or fill proof fabrics, or alternatively, such as in the case of, for example, light-weight fabrics, they may be treated with waterproofing and/or down-proofing chemicals such as, for example, the chemical treatments referred to as DWR (durable water repellent). Since insulated garments may be down or synthetic thermal fiber filled, these fabrics, whether chemically treated or not, can prevent the fill from poking through the fabric and help prevent water moisture from the environment from entering inside of the garment. However, as noted earlier, a downside of these fill proof fabrics or chemical treatments on fabrics is that these treatments may decrease the ability for moisture vapor to evaporate from an environment that is internal to the garment, when the garment is worn by a wearer.

Figure 3A:
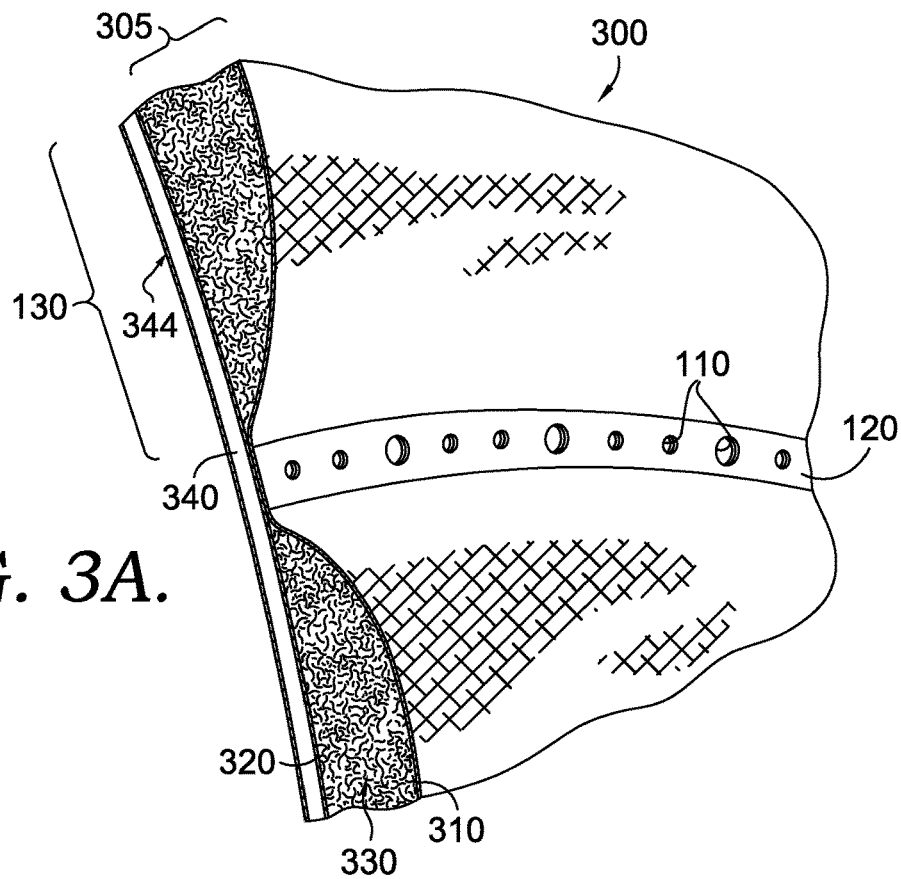
FIG. 3A is a close-up view of a section of an exemplary aspect of the vented garment in FIG. 1 in accordance with the technology described herein.
Figure 3B:
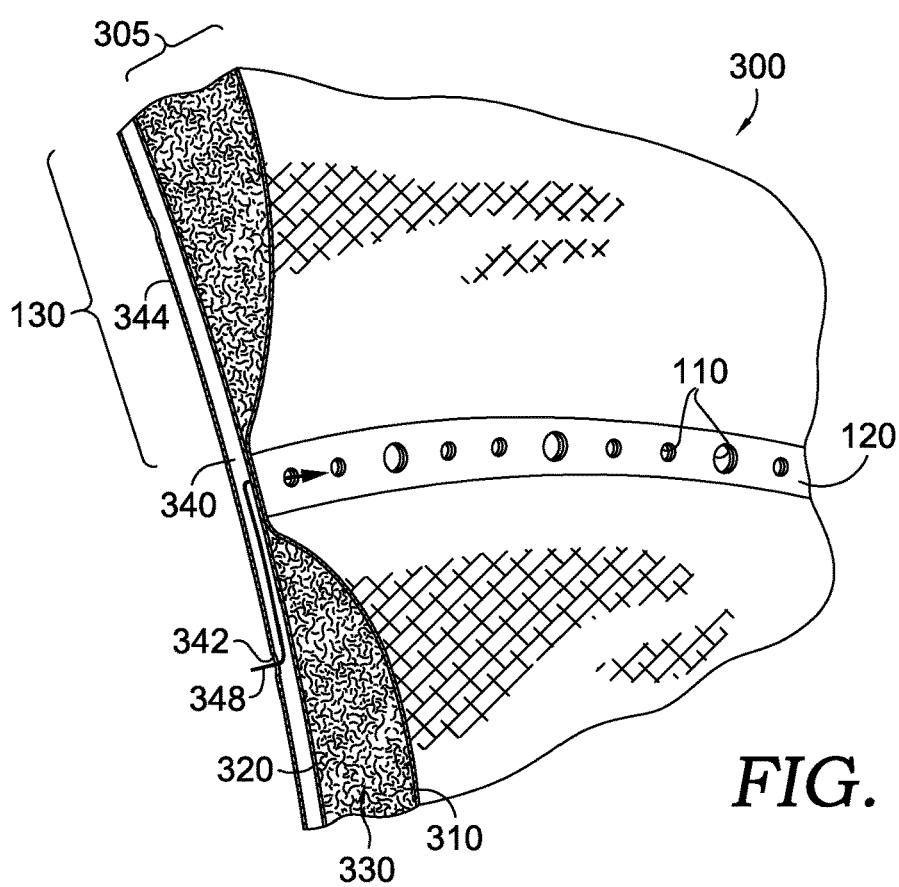
FIG. 3B is a close-up view of a section of an alternative exemplary aspect of the vented garment in FIG. 1 in accordance with the technology described herein.

In an exemplary aspect, the vented garment 100 in FIGS. 1A and 1B may be constructed by providing an interior panel and a corresponding exterior panel, for each section of the vented garment 100, the interior panel(s) and the corresponding exterior panel(s) may be cut out from a fabric piece(s) (not shown). An adhesive tape suitable for the particular type of fabric may be placed on the interior surface of one of the panels along predetermined sections of the panel to form chambers with a desired shape when the interior and the exterior panel(s) are affixed to each other. This affixing step can be achieved by, for example, aligning the panel without the adhesive tape on top of the panel with the adhesive tape, with its interior face facing the adhesive tape, once the adhesive tape is set in place. Then, the two panels may be pressed together with sufficient force and/or energy applied, to activate the adhesive tape to create a bond(s) between the two panels. The adhesive tape may be activated by, for instance, heat, or ultrasonic energy, or any other type of applied energy. Once the fabrics are bonded, seams, such as seam 120 are formed where the seams 120 define or delineate chambers, such as chamber 130, in between each pair of seams 120. In exemplary aspects, the interior panel and the exterior panel adhered together at the seams 120 form an exterior garment panel as shown in FIGS. 3A and 3B.

The chambers 130 may then be filled with down, or synthetic-insulating fibers. Depending on the size and/or shape of the chambers 130 formed, the chambers 130 may be filled with down or thermal-insulating fibers either manually or mechanically.

In a different example of the vented garment, depending on the fabric material used, the seams may be created without the use of an adhesive tape. For example, the fabric may be formed from fibers that are reactive to different stimuli such as heat, sound waves, mechanical pressure, chemicals, water, and the like. Upon application of the stimulus to the fabric, the fibers may undergo a transformation that causes the fibers to adhere or bond to each other. In this aspect, the stimulus could be applied to only those portions of the fabric where seams are desired. Any and all aspects, and any variation thereof, are contemplated as being within the scope herein.

In exemplary aspects, the seams 120 may be spaced apart in a generally horizontal orientation on the vented garment 100 as shown in FIGS. 1A and 1B. Or the seams 120 may be spaced apart in a generally vertical orientation on the vented garment 100. The spacing of seams 120 may vary, as may the relative orientation of the seams 120 and/or the shape of the seams 120, enabling the chambers 130 to be different shapes and/or sizes. In some aspects, the seams 120 may be spaced such that there is minimal space between the seams 120 thereby resulting in a smaller-sized chamber 130 with less insulating fill. In other aspects, the seams 120 may be spaced more widely apart to create a larger-sized chamber 130 with greater amounts of insulating fill. In some exemplary aspects, spacing between the seams 120 may be greater than the width of the seam 120. In other exemplary aspects, spacing between the seams 120 may be greater than twice the width of the seam 120, and so on. Exemplary distances between adjacent seams 120 may comprise, for example, between 1 cm and 20 cm, between 2 cm and 15 cm, and/or between 3 cm and 10 cm, although ranges above and below these values are contemplated herein. In aspects, the spacing between adjacent seams 120 may be variable depending upon the desired amount of insulation needed at different portions of the vented garment 100.

The seams 120 may be perforated to form one or more openings during bonding, after bonding, and/or after filling the chambers 130. In exemplary aspects, openings 110 in the seams 120 may be formed using, for instance, a laser, an ultrasonic cutter, a water-jet cutter, a mechanical cutter, and the like. Provided the proper equipment, the seams 120 may be simultaneously formed and perforated in a single step to form the openings 110, although the seams 120 and the openings 110 may be formed in separate steps without departing from the scope of the technology described herein. In other aspects, the openings 110 may be integrally formed in the seams 120 during a knitting or a weaving process. As well, the seams 120 themselves may be formed during the knitting or weaving process. For example, a Jacquard head may be used to integrally knit the seams 120 and the chambers 130. Moreover, this same knitting or weaving process may be used to integrally fill the chambers 130 using float yarns at the time they are created. Any and all aspects, and any variation thereof, are contemplated as being within the scope herein.

The openings 110 may provide ventilation and moisture management by allowing moisture vapor from perspiration and/or heat to escape to the exterior environment. The location of the openings 110 in the interior and exterior panels can vary in different aspects. For example, the openings 110 may penetrate both panels in the seam 120 (e.g., penetrate the exterior panel, the adhesive (if used) and the interior panel within the seam 120). In another aspect, an additional interior panel may be provided, where the additional interior panel may or may not comprise openings. If openings are provided in the additional interior panel, the openings may or may not be offset from the openings 110, as shown in FIGS. 3A and 3B, and as discussed below. In another example, in a two-panel garment (e.g., in a garment comprising just the exterior garment panel without the additional interior panel), the holes or openings 110 in the exterior panel in the seam 120 can be offset from openings in the interior panel at the seam 120 as shown and discussed below with respect to, for example, FIGS. 6 and 7.

Figure 2:
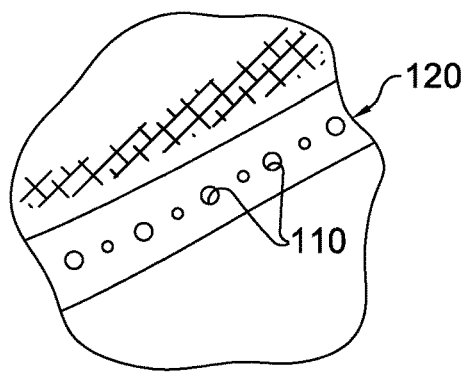
FIG. 2 is a close-up view of a venting seam from the vented garment in FIG. 1.

FIG. 2 is a close-up view of one of the seams 120. The seam 120 may be formed as described above (e.g., adhering an exterior panel to an interior panel at the seam 120 to form an insulated garment panel), and may be presented in a straight line (as shown), in a curved line, in a wavy line, or any other shape that may be useful, for example in forming and defining the chamber 130 and being visually appealing at the same time. The openings 110 may be of the same size, or different sizes (as shown). The openings 110 may be of different shapes such as circular (as shown), triangular, rectangular, or any other shape desired. The openings 110 may be evenly spaced in a straight line, curvy line, zig-zag, or any other suitable shape for placing the openings 110 on the seam 120. Additionally, depending on the size of the individual openings, there may be multiple rows of openings 110 on each seam 120. The plurality of openings 110 may be presented continuously along the seam 120 (as shown), or may be presented intermittently along the seam 120, or may be strategically placed on only a portion of the seam 120, for example, in the areas of high perspiration such as along the back of a wearer, under the arms of a wearer, between the legs of a wearer, and the like.

The garment construction may become more apparent in reference to FIGS. 3A and 3B, where an angled cross-sectional view 300 of a small section of the vented garment 100 is shown. The vented garment 100 in accordance with the technology described herein may be constructed from an exterior panel 310 and a middle panel 320 that together form an insulated garment panel 305, and an interior panel 344. In exemplary aspects, one or more of the panels 310, 320, and/or 344 may be formed from a fabric that is substantially impervious to water and/or a fabric that exhibits a low rate of moisture vapor transmission. Moreover, in exemplary aspects, the interior panel 344 may comprise a mesh material, or a material having moisture-wicking or moisture-management properties. Including a mesh material or a material having moisture-wicking or moisture-management properties as the interior panel 344 may increase wearer comfort, where the moisture management fabric is configured to move moisture from an inner-facing surface to an outer-facing surface of the garment.

The seam 120 and the chamber 130 may be created as described above in reference to FIGS. 1A and 1B (e.g., adhering the exterior panel 310 to the middle panel 320 at the seams 120 to form the insulated garment panel 305). The edges of the chambers 130 are formed by the seam 120. In other words, the seam 120 delineates and defines the chamber 130. The chamber 130 may then be filled with a fill material 330, such as down or synthetic fibers. In aspects, once filled, the vapor transmission rate of the vented garment 100 may be reduced even when the fabric used to form the vented garment 100 comprises a breathable material because the chambers 130 may hinder the transmission of moisture vapor through the vented garment 100. The openings 110 extending through the seam 120 of the insulated garment panel 305 may comprise exterior openings in that they open to the external environment.

In exemplary aspects, the interior panel 344 may be somewhat loosely affixed to the insulated garment panel 305 at one or more locations such that the interior panel 344 may be spaced apart from the insulated garment panel 305 at areas where it is not affixed. In other words, a void or space 340 may be formed between the interior panel 344 and the inner-facing surface of the middle panel 320, where the space 340 may function as a passage for transmission of moisture vapor and/or air.

In accordance with another aspect herein, the interior panel 344 comprises a continuous panel/layer of material, wherein there are no breaks and/or deviations in the weaving/knitting patterns and/or yarns in the case of knit or woven textile materials, or there are no breaks/voids formed through the surface of a non-woven materials, as shown in FIG. 3A, or the interior panel 344 may comprises a plurality of interior openings, such as interior opening 342, as shown in FIG. 3B. The openings 342 may be thought of as interior openings in that they do not directly communicate with the external environment in contrast to the exterior openings 110. The interior openings 342 on the interior panel 344 are configured such that the interior openings 342 are offset from the exterior openings 110. In other words, there is not a direct communication path between the exterior openings 110 and the interior openings 342. This is indicated in FIG. 3B by the arrow 348 which indicates the route that moisture vapor and/or air would traverse when traveling, namely: from the wearer's body, through the interior opening 342, into the space 340, and out the exterior opening 110 where the moisture vapor may be discharged into the external environment.

The interior openings 342 in the interior panel 344 may be distributed throughout the interior panel 344 and/or may be localized in certain areas depending on the level of ventilation and/or breathability needed in a certain area. In one exemplary aspect, the interior openings 342 on the interior panel 344 are configured to not overlap with the exterior openings 110 associated with the insulated garment panel 305. In another exemplary aspect, the distribution of the interior openings 342 in the interior panel 344 may be configured such that a majority of the interior openings 342 (e.g., greater than 50%, 70%, 80%, or 90%) do not overlap with the exterior openings 110.

The size and number of the openings 342 and/or 110 may be adjusted to provide different ventilation and breathability characteristics, while still maintaining the structural integrity of the fabric, and maintaining a high level of thermal insulation. For instance, a larger size and greater number of openings 342 and/or 110 in portions of the vented garment 100 may provide a higher degree of ventilation and breathability characteristics to these portions. In another example, a smaller size and a fewer number of openings 342 and/or 110 in other portions of the vented garment 100 may provide for a lower degree of ventilation and breathability characteristics. Thus, by adjusting the size and/or number of the openings 342 and/or 110, different ventilation and breathability characteristics may be imparted to different portions of the vented garment 100. In exemplary aspects, the width size of each individual opening 342 and/or 110 may range anywhere from 0.1 mm to 5 mm, and the spacing between each individual opening 342 and/or 110 measured from edge to edge, may range anywhere from 0.5 mm to 10 mm. Other sizes and/or spacing of openings 342 and/or 110 may be used without departing from the scope of the technology described herein.

Figure 4:
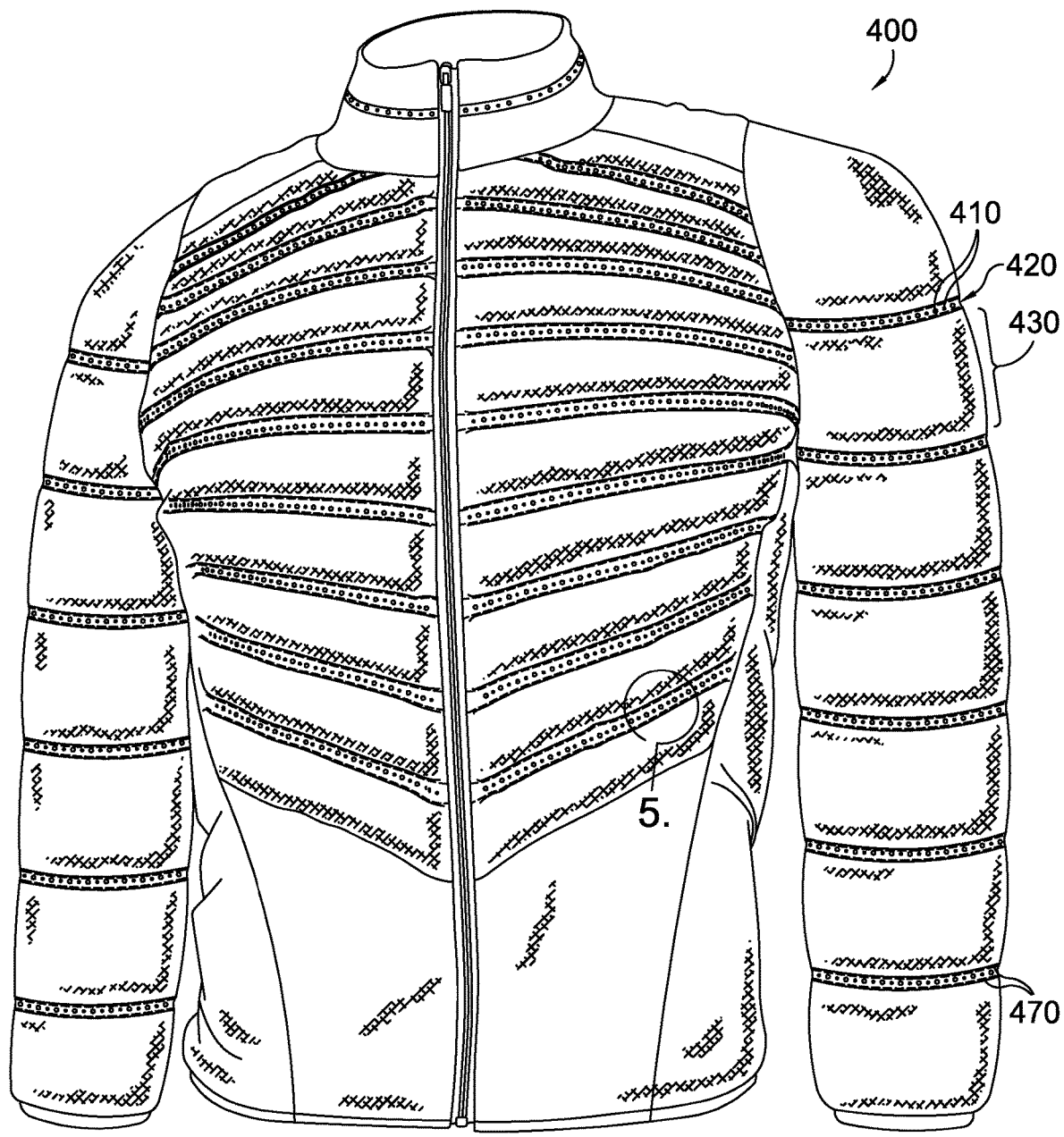
FIG. 4 is a view of a different exemplary vented garment in accordance with the technology described herein.
Figure 5:
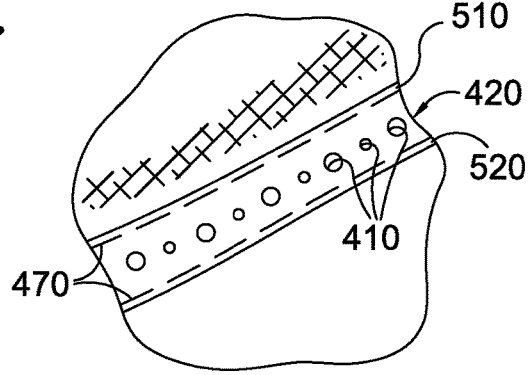
FIG. 5 is a close up view of a venting seam with stitches from the vented garment in FIG. 4 in accordance with the technology described herein.

Now, in reference generally to FIGS. 4-7, and particularly to FIG. 4, a front view of another different garment 400 is shown in accordance with an aspect of the technology described herein. With respect to the garment 400, the garment 400 may comprise an exterior panel adhered to an interior panel at seams 420 to form an insulated garment panel, where the seams 420 define chambers 430 that may be filled with a fill material. But the garment 400 may or may not have an additional interior panel as described for the vented garment 100. The garment 400 in FIG. 4 may be constructed in a fashion similar to that described above with regard to the vented garment 100 shown in FIG. 1 to form the seams 420. Moreover, the seams 420 may be further reinforced by adding stitching 470 along their upper seam boundary 510 and/or lower seam boundary 520, as can be seen in the close up view of FIG. 5. Although stitching is shown in FIG. 5, other methods of selectively affixing the seam 420 are contemplated herein such as use of adhesives, bonding, spot welding, and the like. Stitching 470 may be applied mechanically and/or by hand, and may use any type of thread, whether natural or synthetic. Likewise, stitching 470 may be applied before or after openings 410 are formed and/or before or after the chambers 430 are filled. In one aspect, the part of the seam 420 between the upper seam boundary 510 and the lower seam boundary 520 is configured to remain open (i.e. no adhesive or other bonding in between upper seam boundary 510 and lower seam boundary 520) to form a passage for moisture vapor and/or air to pass between the exterior and interior panels.

The garment 400 may be vented using through openings such as those describe in reference to vented garment 100 where the openings 110 on the seams 120 extend through the interior and exterior panels, or in the alternative, garment 400 may be vented using offset openings within the seams 420. In other words, the exterior openings 410 in the garment's exterior panel may be offset from openings in the garment's interior panel (better shown in FIGS. 6 and 7) at the seams 420. The offset openings force moisture to pass through a passage within the seam 420 formed between the interior and exterior panels. The arrangement of the exterior and interior openings is illustrated with more detail in FIGS. 6 and 7.

Figure 6:
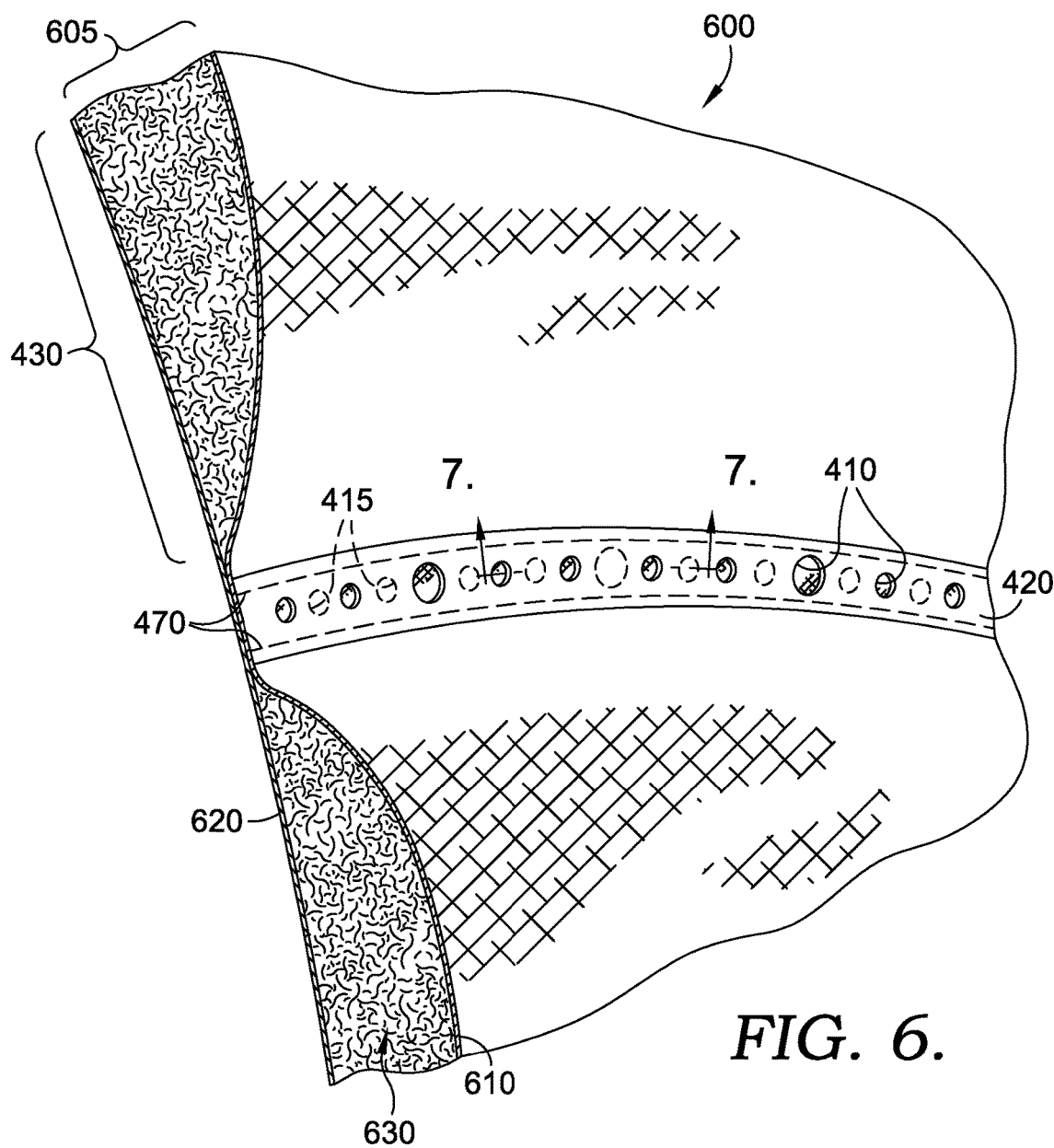
FIG. 6 is a close-up view of a section of the venting seam from the garment of FIG. 4 in accordance with the technology described herein.

FIG. 6 shows an angled cross-sectional view 600 of a small section of the garment 400. The garment 400 in accordance with the technology described herein may be constructed from an interior panel 620 and an exterior panel 610, where the interior panel 620 is affixed to the exterior panel 610 at the seam 420 to form an exterior garment panel 605. The seam 420 delineates and defines in part the chambers 430. The chambers 430 may then be filled with fill 630, such as down or synthetic fibers.

In the example shown in FIG. 6, the seam 420 comprises both exterior openings 410 and interior openings 415 (shown as dashed circles) that are offset from the exterior openings 410. The exterior openings 410, in some exemplary aspects, are formed just through the exterior panel 610 and may be open to or in communication with the external environment, while the interior openings 415 are formed just through the interior panel 620 and are not in direct communication with the external environment. As used herein, the term "offset" means the interior area of an exterior opening 410 does not overlap with the interior area of the interior opening 415. The offsetting of the exterior openings 410 from the interior openings 415 forces moisture and/or heat exiting the garment 400 to traverse a passage within the seam 420 connecting the interior openings 415 and exterior openings 410 as shown in FIG. 7.

Figure 7:
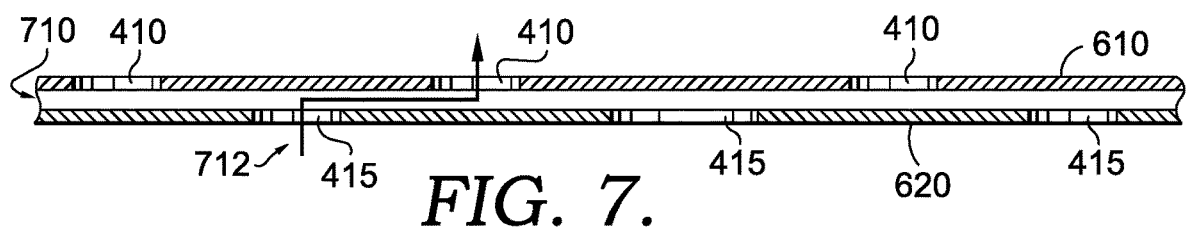
FIG. 7 is a cross-sectional view of a small section of the seam area in FIG. 6, where the insulating chambers are shown in relation to the openings in the seams in accordance with the technology described herein.

FIG. 7 provides a cross-section of the seam 420 to illustrate the offset nature of the exterior openings 410 and the interior openings 415 according to an aspect. As previously described and as shown in FIG. 5, the seam 420 is formed by affixing in part the exterior panel 610 and the interior panel 620 at the upper seam boundary 510 and the lower seam boundary 520. By just affixing the panels 610 and 620 at the upper seam boundary 510 and the lower seam boundary 520, a passage or space 710 is maintained between the exterior panel 610 and the interior panel 620 as shown in FIG. 7. Thus, as shown by the arrow 712, moisture vapor and/or air would leave the wearer's body by traveling through the interior opening 415, traversing the passage or space 710, and exiting via the exterior opening 410 where it can be dissipated into the external environment. The exterior openings 410 and the interior openings 415 are shown as evenly spaced and/or sized in FIGS. 6 and 7, but other arrangements are possible as described herein.

Like the vented garment 100 of FIGS. 1A/1B, the garment 400 in FIG. 4 may be made from conventional synthetic or natural woven or knit fabrics. The fabrics may be water repellent and/or engineered to be down proof/fill proof, or alternatively, such as in the case of ultra-light fabrics (29 g/m² or lower) and light-weight fabrics (89 g/m²–30 g/m²), the fabrics may need to be treated with waterproofing and down-proofing chemicals, such as, for example, the chemical treatments referred to as DWR (durable water repellent).

In some exemplary aspects, the insulating chambers in the vented garment in accordance with the technology described herein may be formed by welding separate pieces of fabric at each seam, or as discussed earlier, may be formed by pressing two whole panels with adhesive tape in strategic places in between the two panels. In the example where the chambers may be formed by welding separate pieces of fabric at each seam, this would allow for the introduction of different textures, colors, or functionalities by introducing different types of fabrics at different sections of the garment. Further, as described earlier, in one aspect, one or more portions of the insulating zones and/or the vented garments are constructed using an engineered weaving or knitting process (e.g., program a weaving or knitting machine to form these structures).

Figure 8:
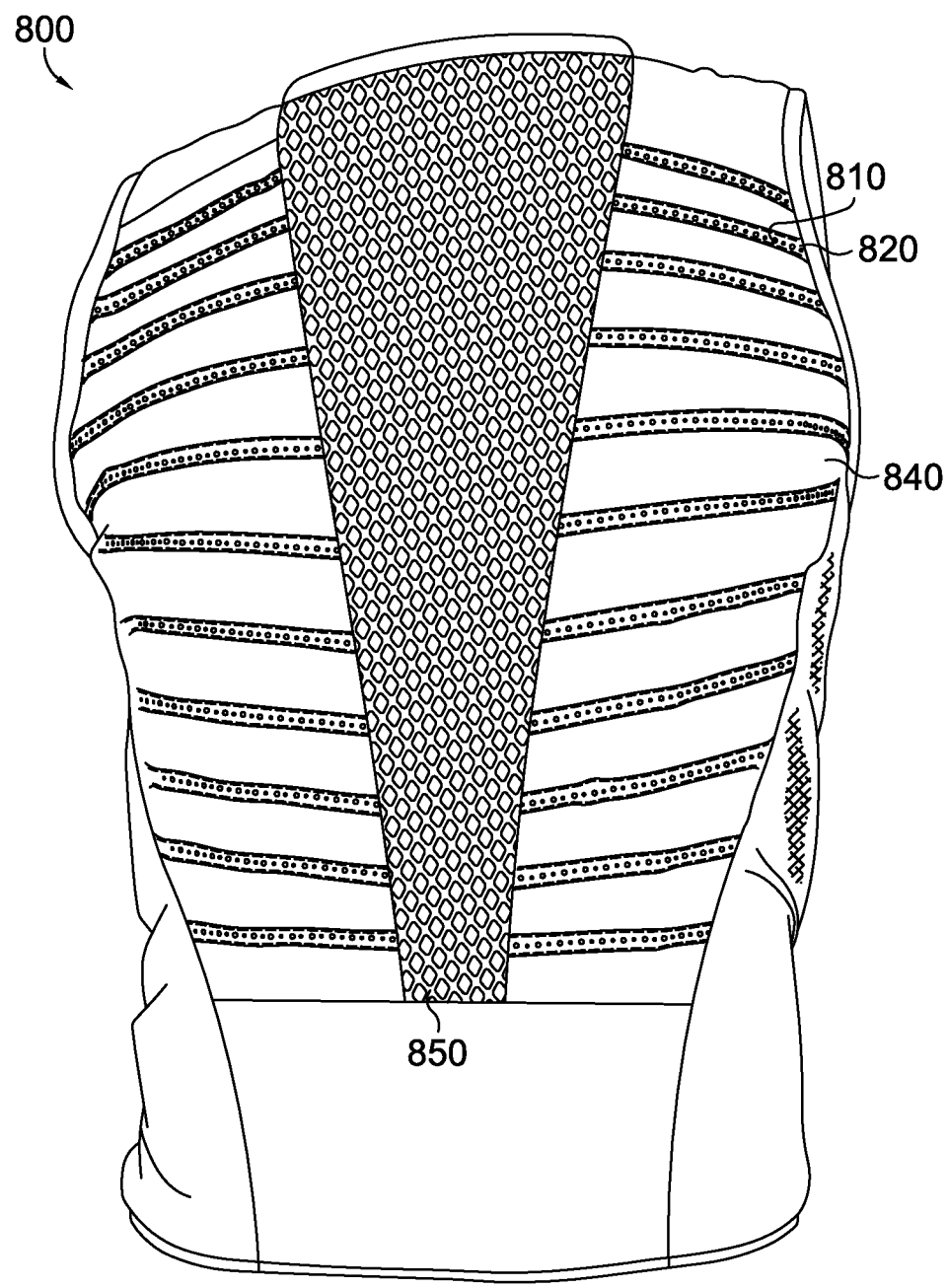
FIG. 8 is an additional exemplary vented garment that comprises a mesh back section in accordance with the technology described herein.

Further, the vented insulating garment examples shown in the examples of FIGS. 1A and 1B and FIG. 4 are vented cold-weather jackets or coats. However, the insulating vented garments in accordance with the technology described herein may also be constructed in the form of vests, pants, overalls, gloves, hats, and the like. FIG. 8 is an example of a vest 800 in accordance with the technology described herein. As seen in FIG. 8, the vest 800 may have seams 820 with a plurality of openings 810, forming thermally insulating chambers 840, which may be filled with down, or any other thermally-insulating material, such as polyester fibers. In exemplary aspects, the insulating portions of the vest 800 may be formed as shown in FIGS. 3A and/or 3B and/or the insulating portions of the vest 800 may be formed as shown in FIGS. 5-7, any and all aspects, and any variation thereof, are contemplated as being within the scope herein. The vest 800 may be used as a light-weight, breathable, thermal-insulation garment, for example by a runner. The vest 800 may comprise a mesh vent area 850 to provide additional ventilation.

Figure 9:
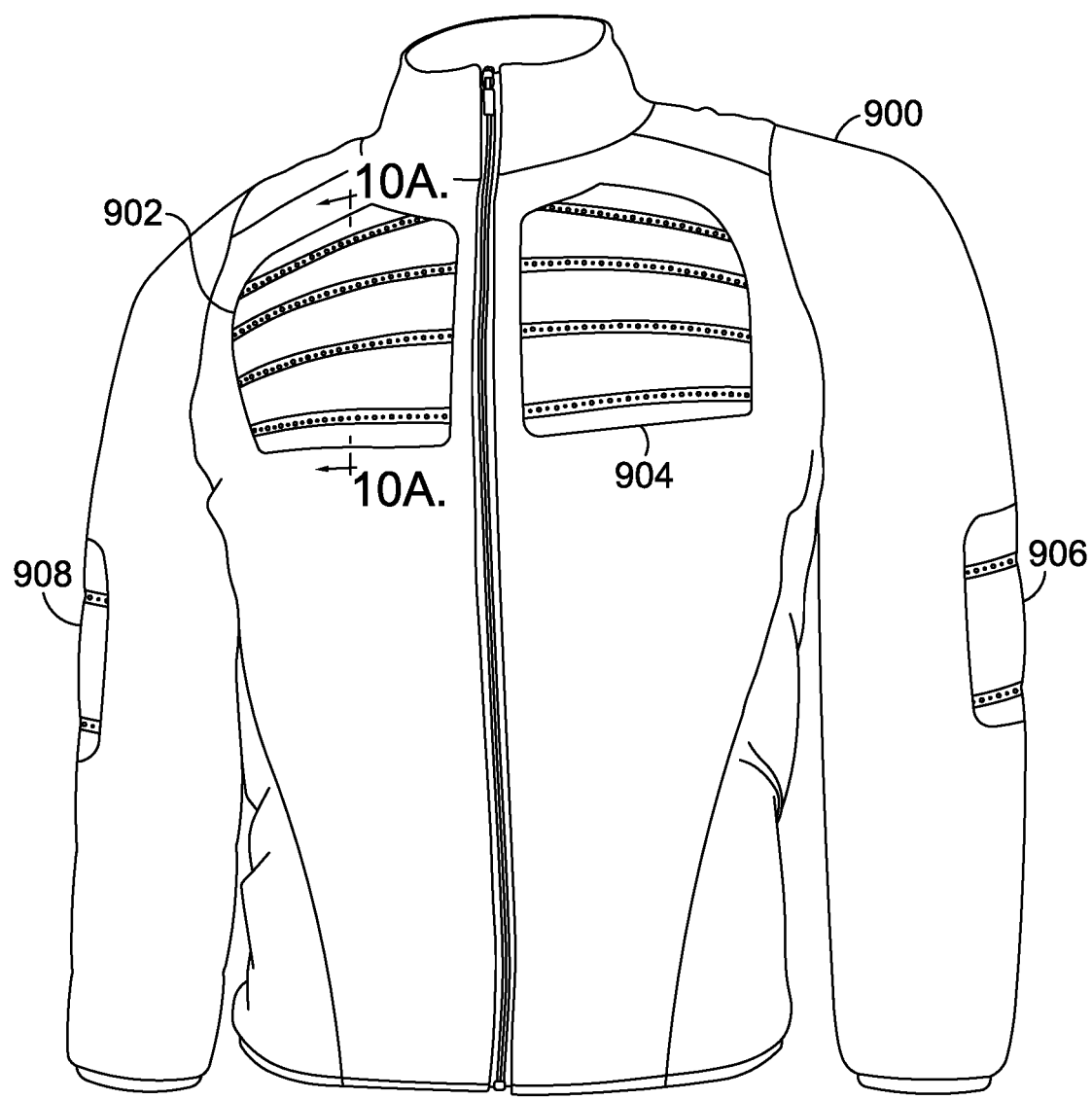
FIG. 9 is a view of an additional exemplary vented garment with vented-insulation sections in accordance with the technology described herein.

In various embodiments, the vented-insulation sections or zones as described herein may be located in parts of the garment instead of throughout the garment. FIG. 9 shows a garment 900 with a right-chest vented insulation section 902, a left-chest vented insulation section 904, a left-arm vented insulation section 906, and a right-arm vented insulation section 908. The vented insulation sections 902, 904, 906, and 908 may be located to maximize the retention of heat while still allowing for moisture venting. For example the vented insulation sections 902, 904, 906, and 908 may be located in areas of the body that produce more perspiration or areas that produce more heat or need an increased amount of vapor escape, such as the chest region, thighs, and the like. Another example is that the vented insulation sections 902, 904, 906, and 908 may be located in regions of the body that are more sensitive to cold. The vented-insulation sections 902, 904, 906, and 908 may also be located based on the comfort of the wearer when exercising.

Figure 10A:
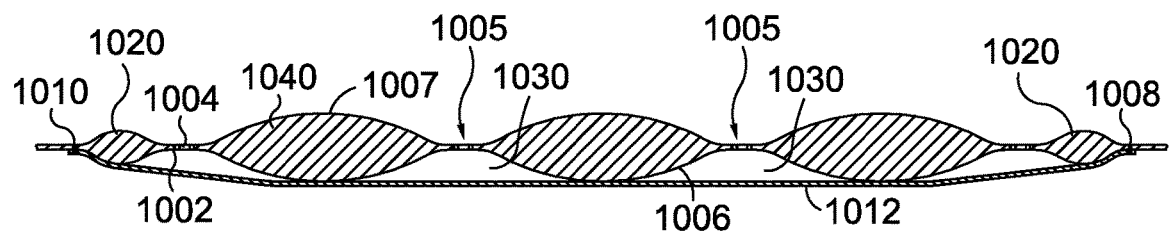
FIG. 10A is a cross-sectional view of the a vented-insulation section in FIG. 9 in accordance with the technology described herein.

Turning now to FIG. 10A, a cross-section of the right-chest vented-insulation section 902 is provided. The right-chest vented-insulation section 902 can be installed within the garment 900 by, for instance, cutting out a portion of the garment 900 and adding the vented-insulation section 902 in place of the cutout area, or the vented-insulation section 902 may be placed over and joined to a garment layer (garment base layer) 1012. The vented-insulation section 902 is joined to the garment 900 at seam 1008 and seam 1010. The vented-insulation section 902 comprises chambers 1020 formed by joining an interior panel 1006 and an exterior panel 1007 at one or more seams 1005 to form the vented insulation section 902. In one exemplary aspect, the seams 1005 comprise offset exterior openings 1004 formed on exterior panel 1007 and interior openings 1002 formed on interior panel 1006. This configuration is similar to that shown in, for example, FIGS. 6 and 7. Alternatively, the seams 1005 may comprise openings 1004 that extend straight through the interior panel 1006 and the exterior panel 1007 (i.e., the openings in the interior panel 1006 and the exterior panel 1007 are axially aligned with respect to one another). Additional interior openings may or may not be formed in a garment layer 1012 that faces the interior-facing side (next to the wearer) of the interior panel 1006 of the vented-insulation section 902, where a passage or space 1030 is formed between the garment layer 1012 and the interior panel 1006 of the vented insulation section 902. This configuration would be similar to that shown in FIGS. 3A and 3B. Any and all aspects, and any variation thereof, are contemplated as being within the scope herein.

Figure 10B:
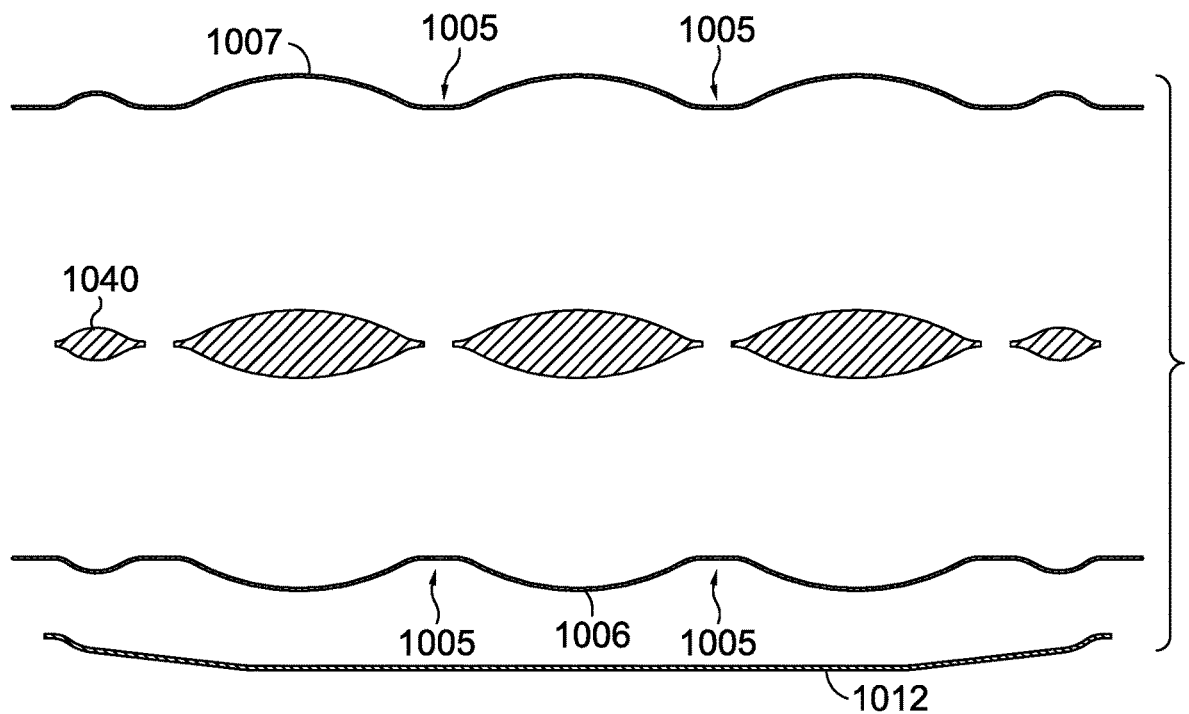
FIG. 10B is an exploded view of the cross-sectional view of the vented-insulation section in FIG. 10A in accordance with the technology described herein.

FIG. 10B, shows an exploded view of FIG. 10A. The vented-insulation section 902 as briefly described above, is formed by joining an interior panel 1006 and an exterior panel 1007 at one or more seams 1005 to form the vented-insulation section 902. A thermally insulating material 1040 is contained between the interior panel 1006 and the exterior panel 1007 within chambers 1020 divided by the one or more seams 1005. In one aspect, and as shown in FIG. 10B, the garment layer 1012 may not comprise openings and may be continuous throughout. In a different aspect, the garment layer 1012 may be provided with one or more openings in the area provided with (covered by) the vented-insulation section 902. In yet another aspect, the garment layer 1012 may be provided with a cutout corresponding in shape and size with the shape and size of the vented-insulation section 902 such that there is no garment layer 1012 beneath the vented-insulation section 902 (not shown). The garment layer 1012 may comprise a mesh material, or a material having moisture-wicking or moisture-management properties. Using a mesh material or a material having moisture-wicking or moisture-management properties as garment layer 112 to form the garment, may increase wearer comfort.

Figure 11:
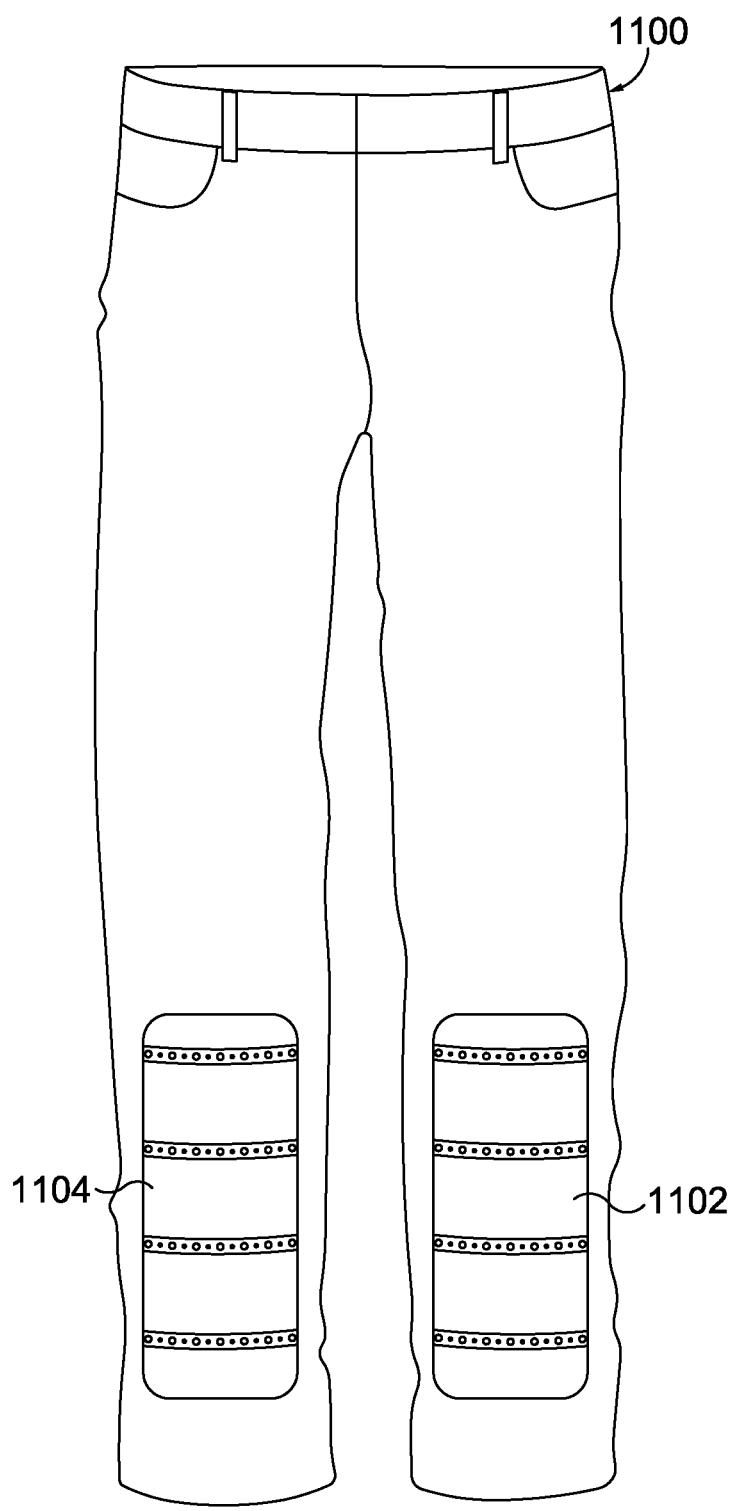
FIG. 11 is a view of vented pants with vented-insulation sections in accordance with the technology described herein.

Turning now to FIGS. 11-20, a number of exemplary configurations of insulation zones are depicted in accordance with aspects herein. The insulation zones shown in these figures comprise the vented-insulation sections having a configuration similar to that shown in, for example, FIGS. 3A, 3B, and/or FIGS. 6-7. For example, FIG. 11 depicts insulation zones within pants 1100. The right insulation zone 1104 and the left insulation zone 1102 are located in the shin areas, although aspects are not limited to these locations. Insulation zones may be located in other desired/suitable locations.

Figure 12:
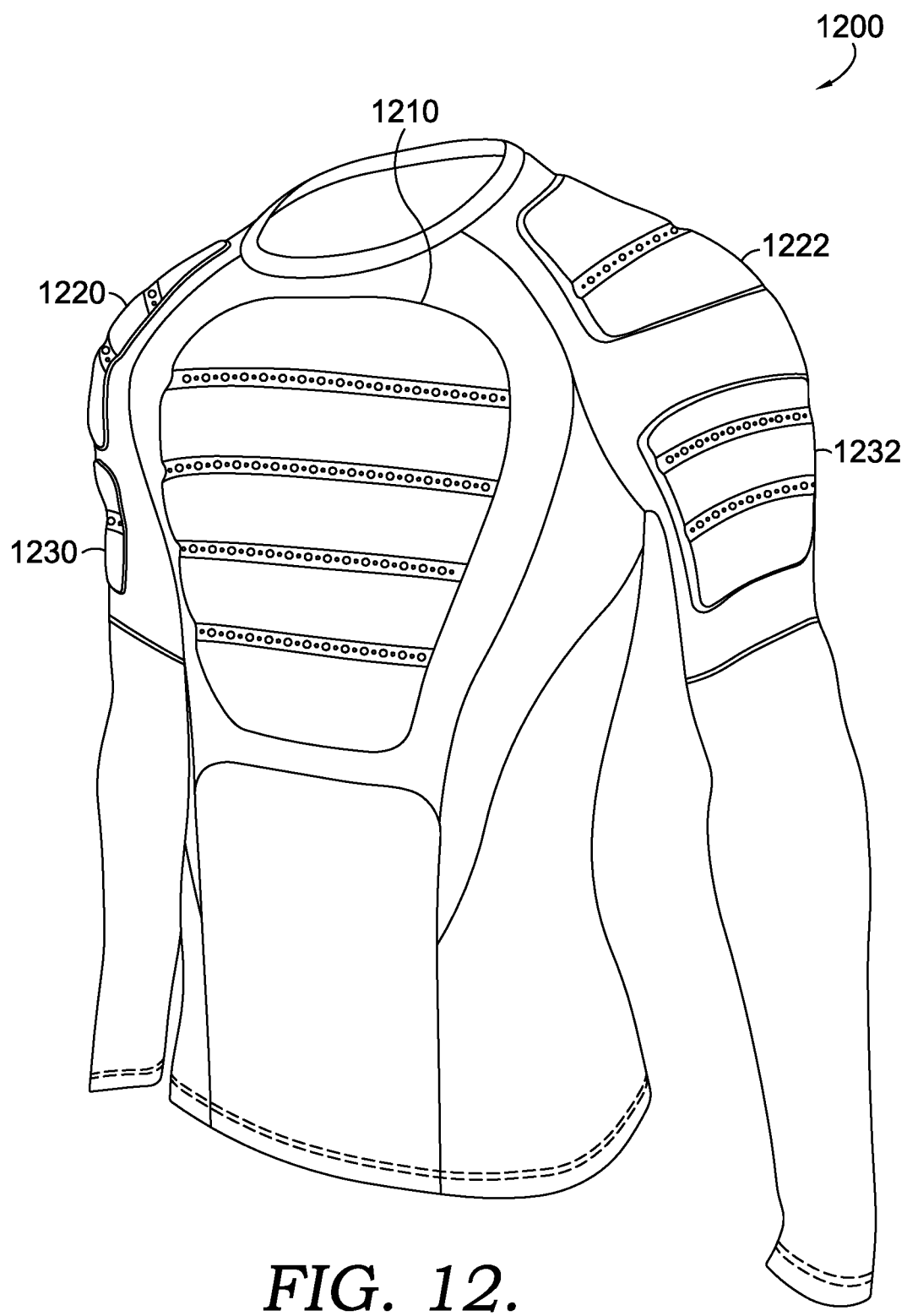
FIG. 12 is a front view of a vented top with vented-insulation sections in accordance with the technology described herein.
Figure 13:
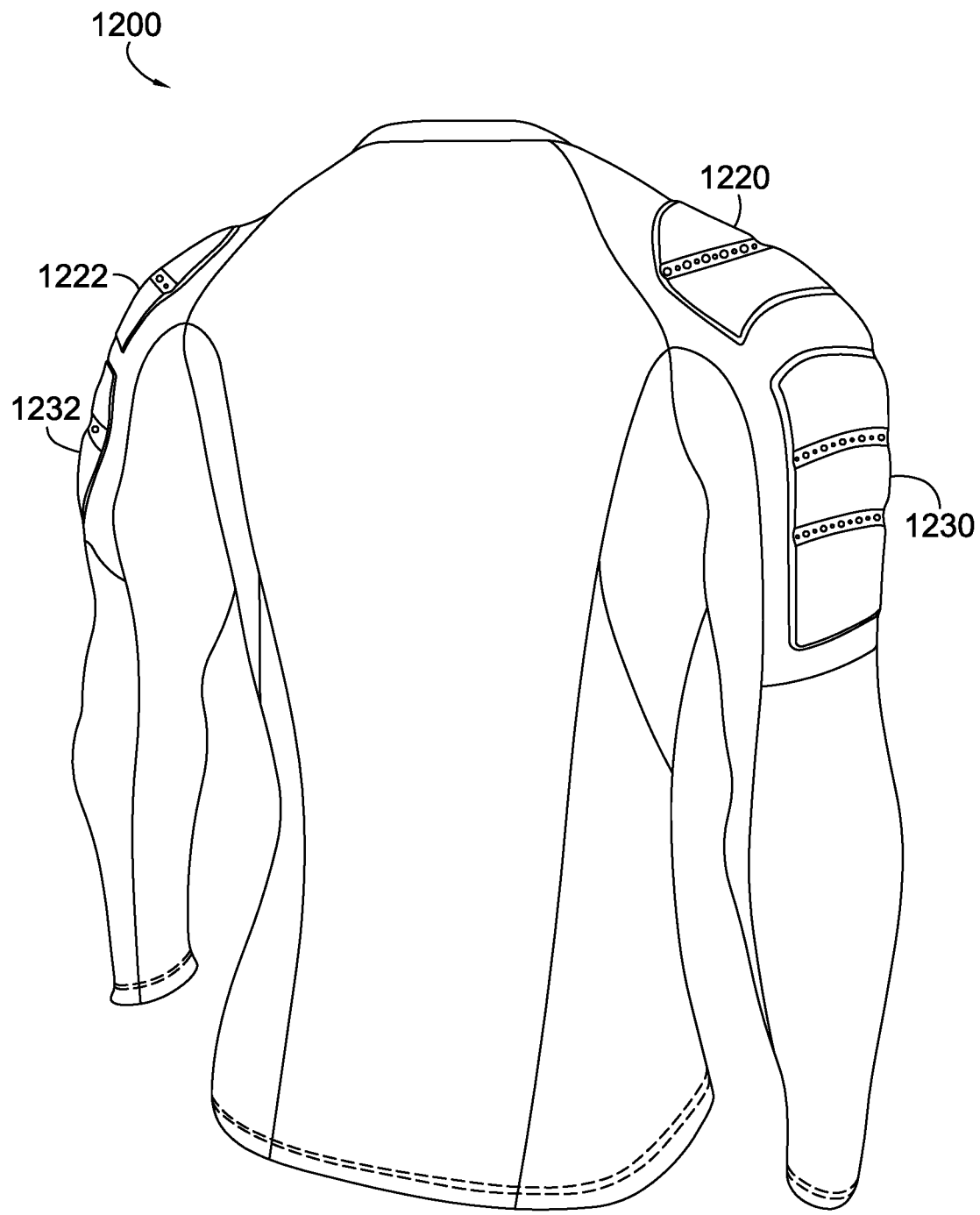
FIG. 13 is a back view of a vented top with vented-insulation sections in accordance with the technology described herein.

FIG. 12 depicts insulation zones within an athletic top 1200 in accordance with an aspect of the technology described herein. As shown in the perspective view of FIG. 12, the athletic top 1200 comprises a chest vented-insulation section 1210, right and left-shoulder vented-insulation sections 1222, and upper right and left-arm vented-insulation sections 1232. FIG. 13 depicts another perspective view of the athletic top 1200 and illustrates more clearly the right-shoulder vented-insulation section 1220 and the upper right-arm vented-insulation section 1230 in accordance with an aspect of the technology described herein. The garment/garment base layer may be constructed from a mesh material, or a material having moisture-wicking or moisture-management properties. The construction of a garment, for example, as shown in garment 1200, will increase comfort for a wearer as the need for layering multiple garments together may be eliminated by providing thermal insulation to only those areas in the garment configured to cover thermally sensitive or most exposed areas of the wearer's body that would benefit from having a thermally protective layer. Another advantage of a garment construction with zonal thermal insulation is that there is no bulkiness impeding motion (as in conventional thermally insulated garments) and therefore, the wearer is afforded to have greater range of motion, especially when provided in garments that are configured to conform to the wearer's body when worn, such as garment 1200.

Figure 14:
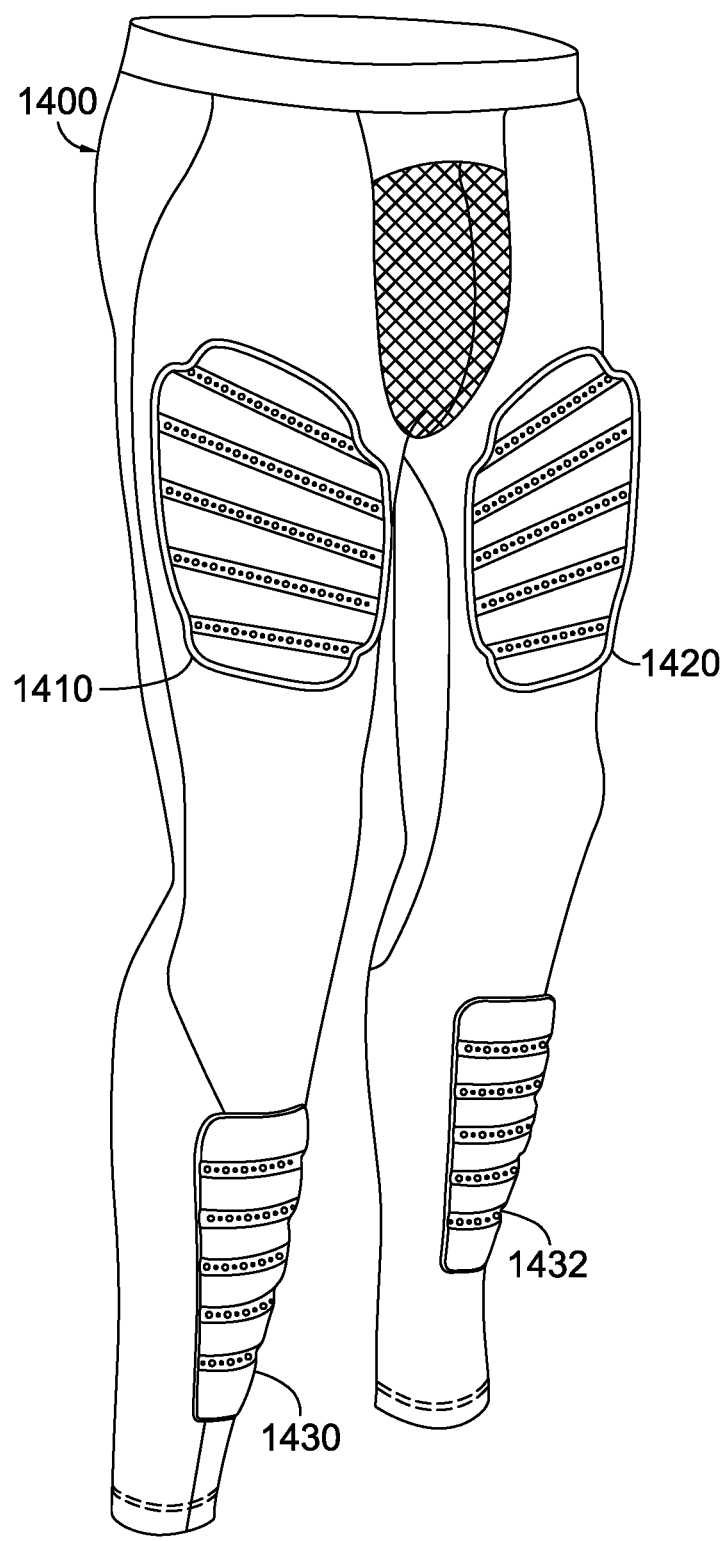
FIG. 14 is a perspective view of vented pants with vented-insulation sections in accordance with the technology described herein.
Figure 15:
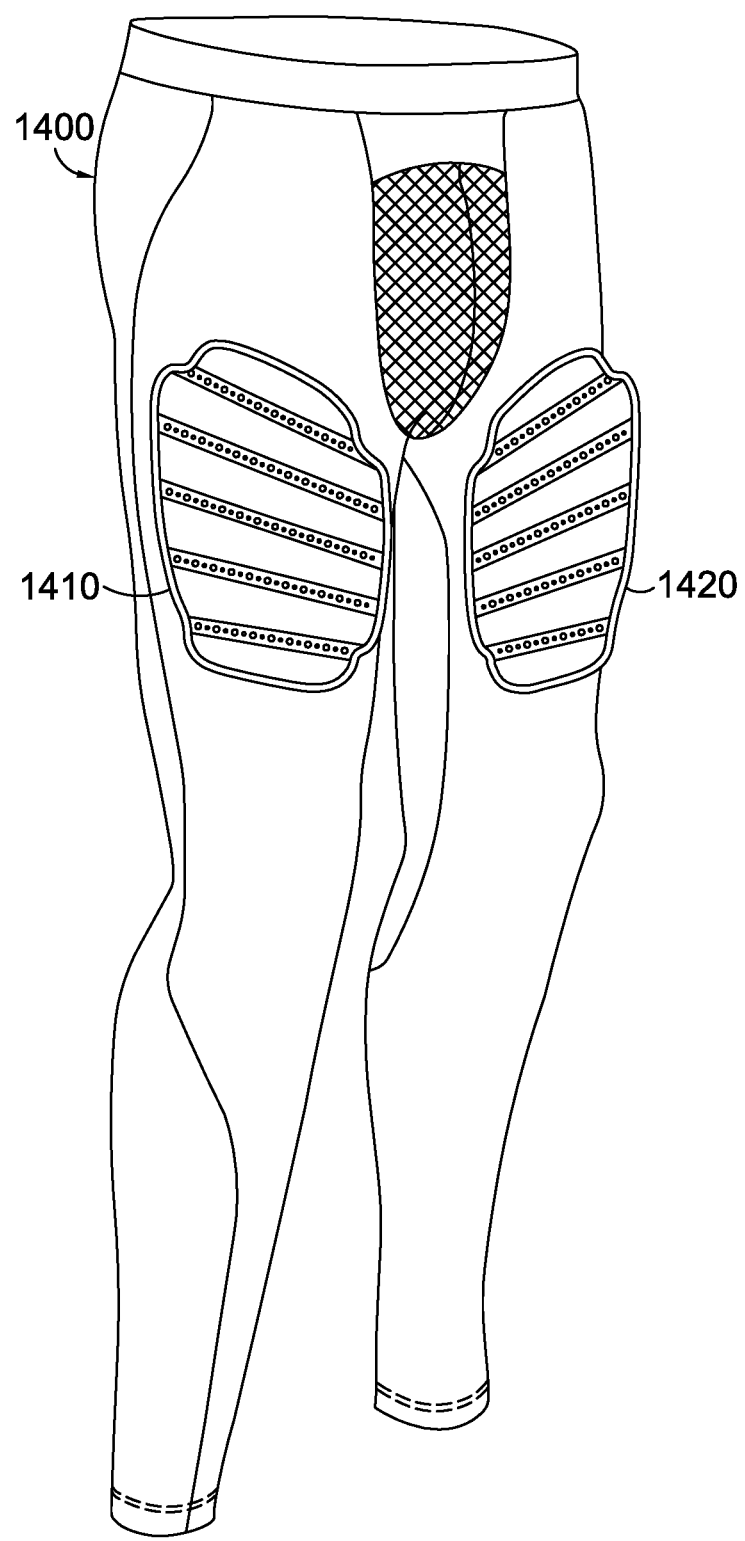
FIG. 15 is a perspective view of vented pants with vented-insulation sections in accordance with the technology described herein.

Turning now to FIG. 14, insulation zones within compression pants 1400 are shown, in accordance with an aspect of the technology described herein. The compression pants 1400 are another example of garments that are configured to conform to the wearer's body when worn, and comprise a right-thigh vented-insulation section 1410 and a left-thigh vented-insulation section 1420. The compression pants 1400 also comprise a right-shin vented-insulation section 1430, and a left-shin vented-insulation section 1432. In exemplary aspect, the compression pants 1400 may comprise just the right-thigh vented-insulation section 1410 and the left-thigh vented-insulation section 1420. This aspect is shown in FIG. 15 which depicts compression pants 1500 having a right-thigh vented-insulation section 1510 and a left-thigh vented-insulation section 1520.

Figure 16:
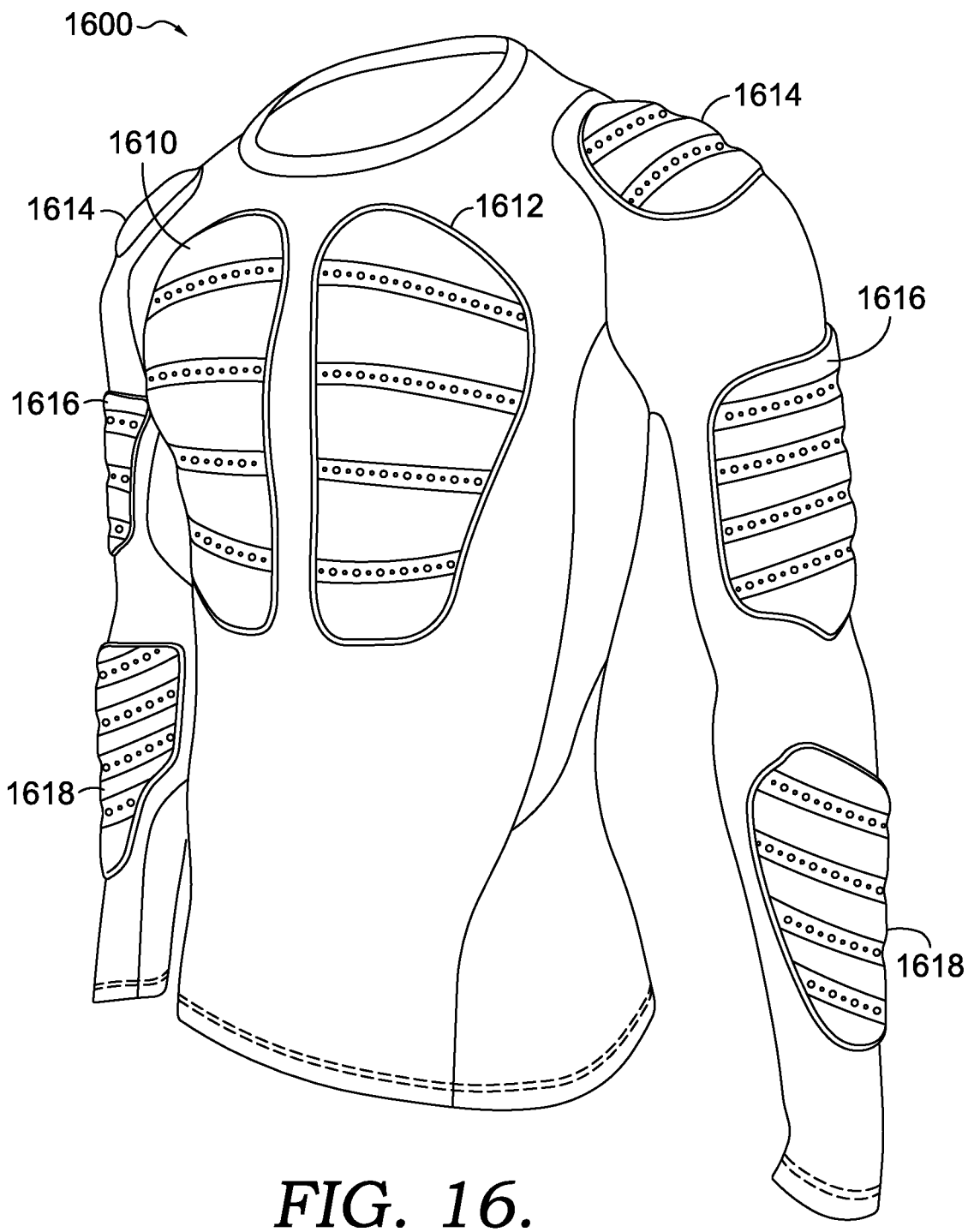
FIG. 16 is a front view of a vented top with vented-insulation sections in accordance with the technology described herein.
Figure 17:
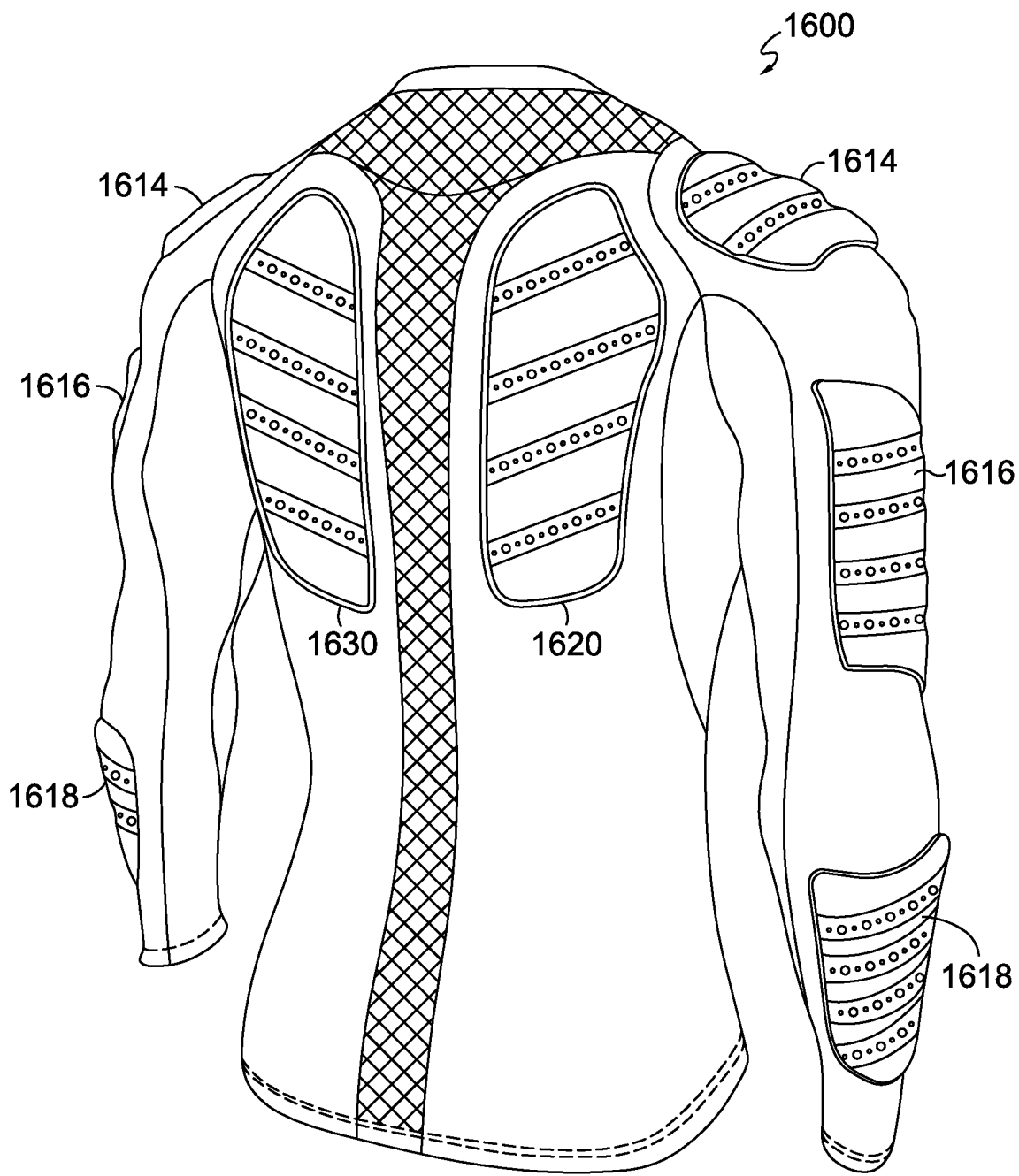
FIG. 17 is a back view of a vented top with vented-insulation sections in accordance with the technology described herein.

Turning now to FIG. 16, insulation zones within an athletic top 1600 are shown, in accordance with an aspect of the technology described herein. The athletic top 1600 comprises a right-chest vented-insulation section 1610 and a left-chest vented-insulation section 1612. The athletic top 1600 also comprises a left and right-shoulder vented-insulation sections 1614, upper left and right-arm vented-insulation sections 1616, and left and right-forearm vented-insulation sections 1618. Turning now to FIG. 17, a rear-view of the athletic top 1600 illustrates a right-back vented-insulation section 1620 and a left-back vented-insulation section 1630, in accordance with an aspect of the technology described herein.

Figure 18:
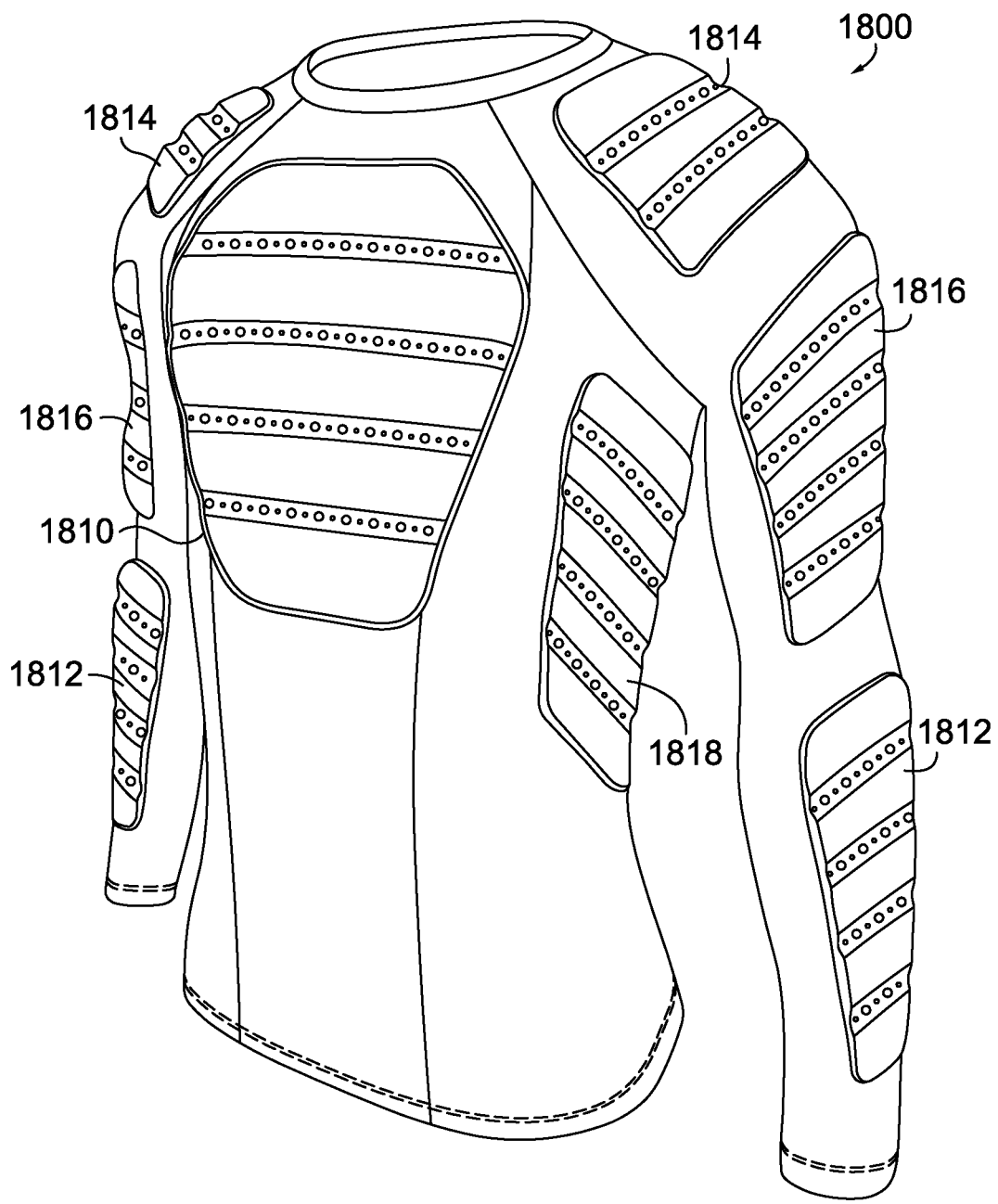
FIG. 18 is a front view of a vented top with vented-insulation sections in accordance with the technology described herein.
Figure 19:
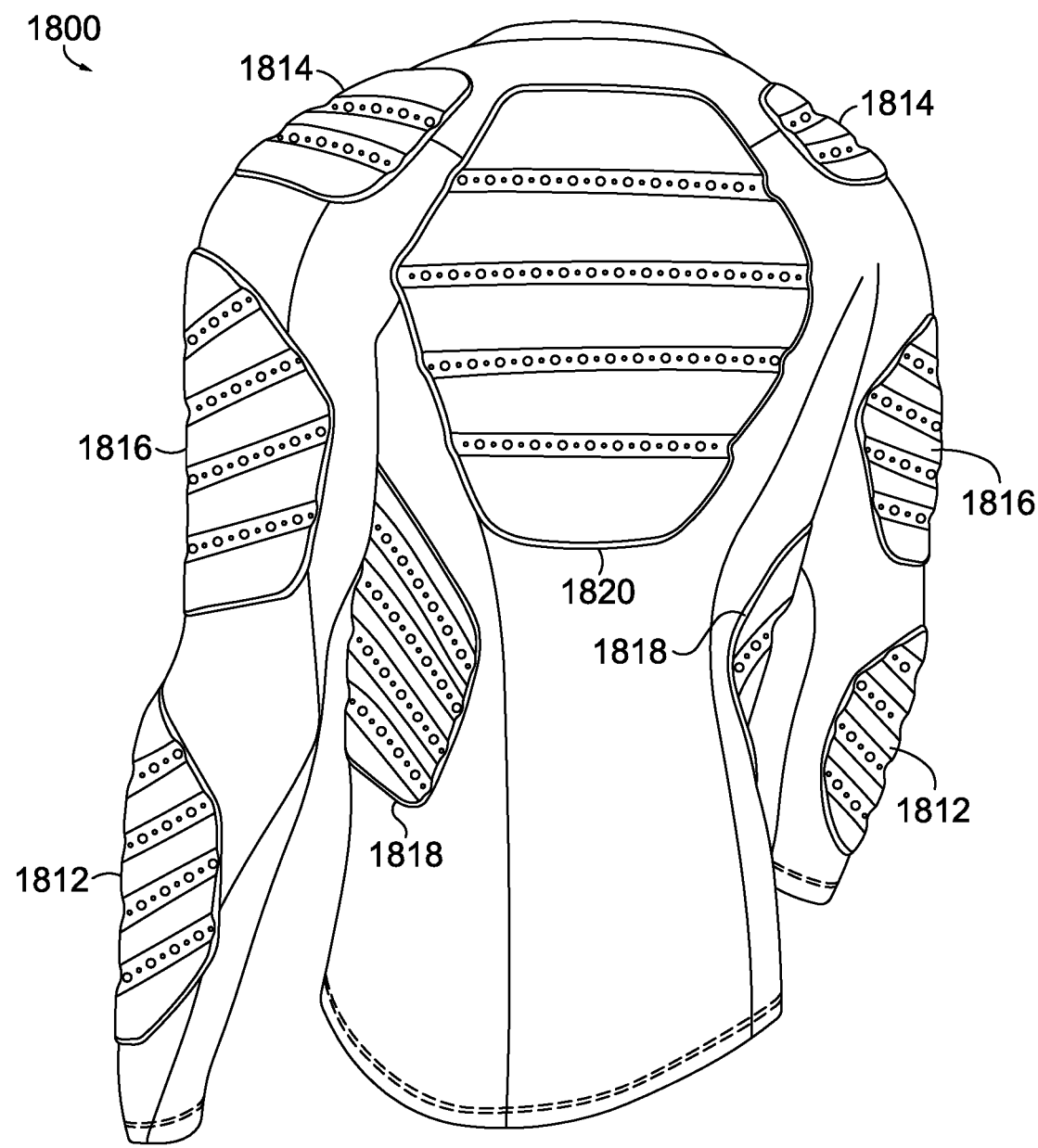
FIG. 19 is a back view of a vented top with vented-insulation sections in accordance with the technology described herein.

Turning now to FIG. 18, insulation zones within an athletic top 1800 are shown, in accordance with an aspect of the technology described herein. The athletic top 1800 comprises a chest vented-insulation section 1810, right and left-shoulder vented-insulation sections 1814, upper right and left-arm vented-insulation sections 1816, right and left-arm forearm vented-insulation sections 1812, and left and right-side vented-insulation sections 1818 and 1818, respectively (only the left-side vented-insulation section 1818 is shown in FIG. 18). Turning now to FIG. 19, a rear-view of the athletic top 1800 further shows a back vented-insulation section 1820 and the right-side vented-insulation section 1818 in accordance with an aspect of the technology described herein.

Figure 20:
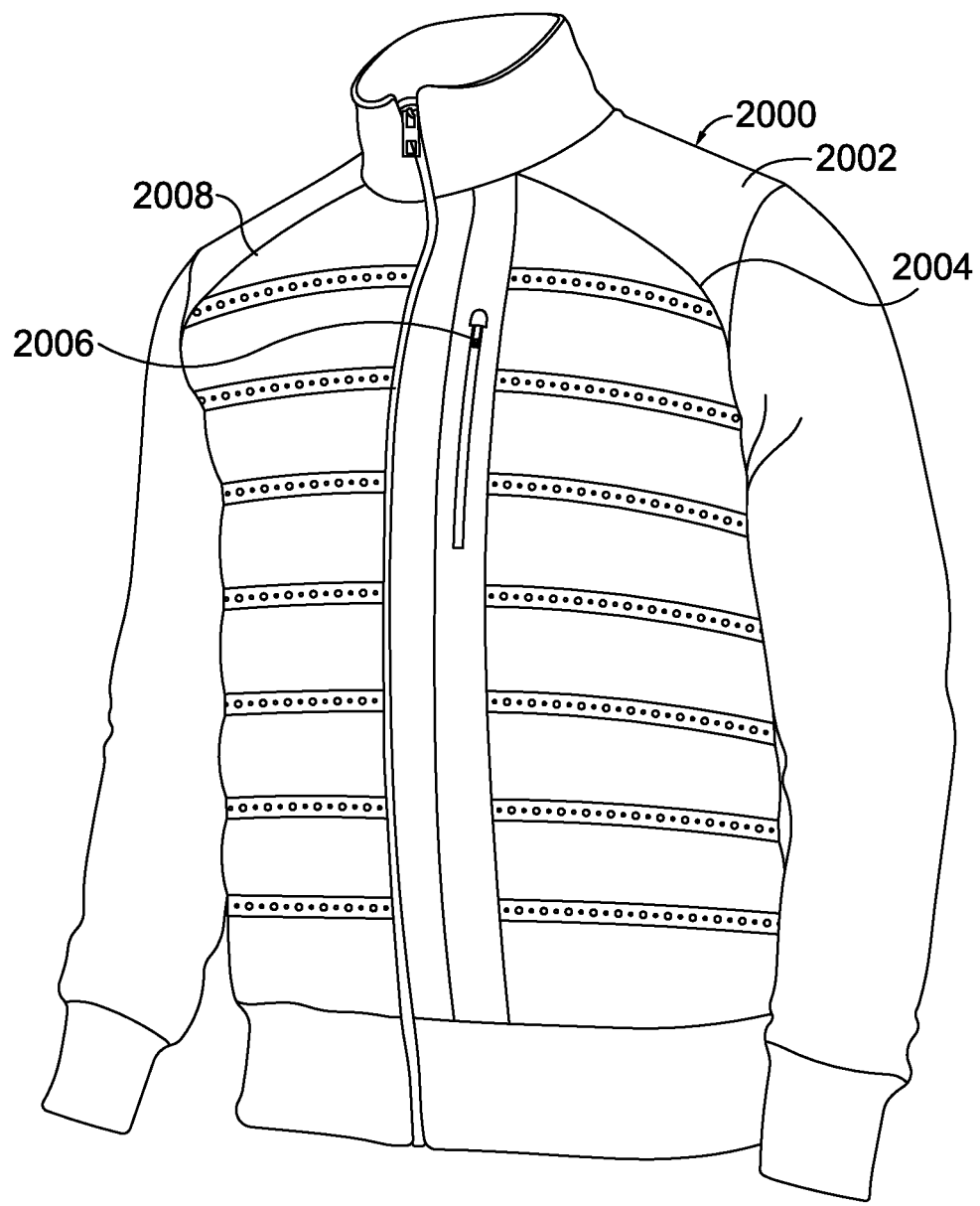
FIG. 20 is a front view of a vented fleece top with vented-insulation sections in accordance with the technology described herein.

Turning now to FIG. 20, insulation zones within a fleece top/jacket 2000 are shown, in accordance with an aspect of the technology described herein. The fleece top/jacket 2000 comprises a left-chest vented-insulation section 2004 and a right-chest vented-insulation section 2008. The body 2002 of the fleece top/jacket 2000 may comprise a breathable fleece material. A zipper 2006 can provide entrance to a pocket (not shown). The pocket can be constructed of mesh or another breathable material that works with the left-chest vented-insulation section 2004 to facilitate the transfer of heat and moisture through the fleece top/jacket 2000.

Figure 21:
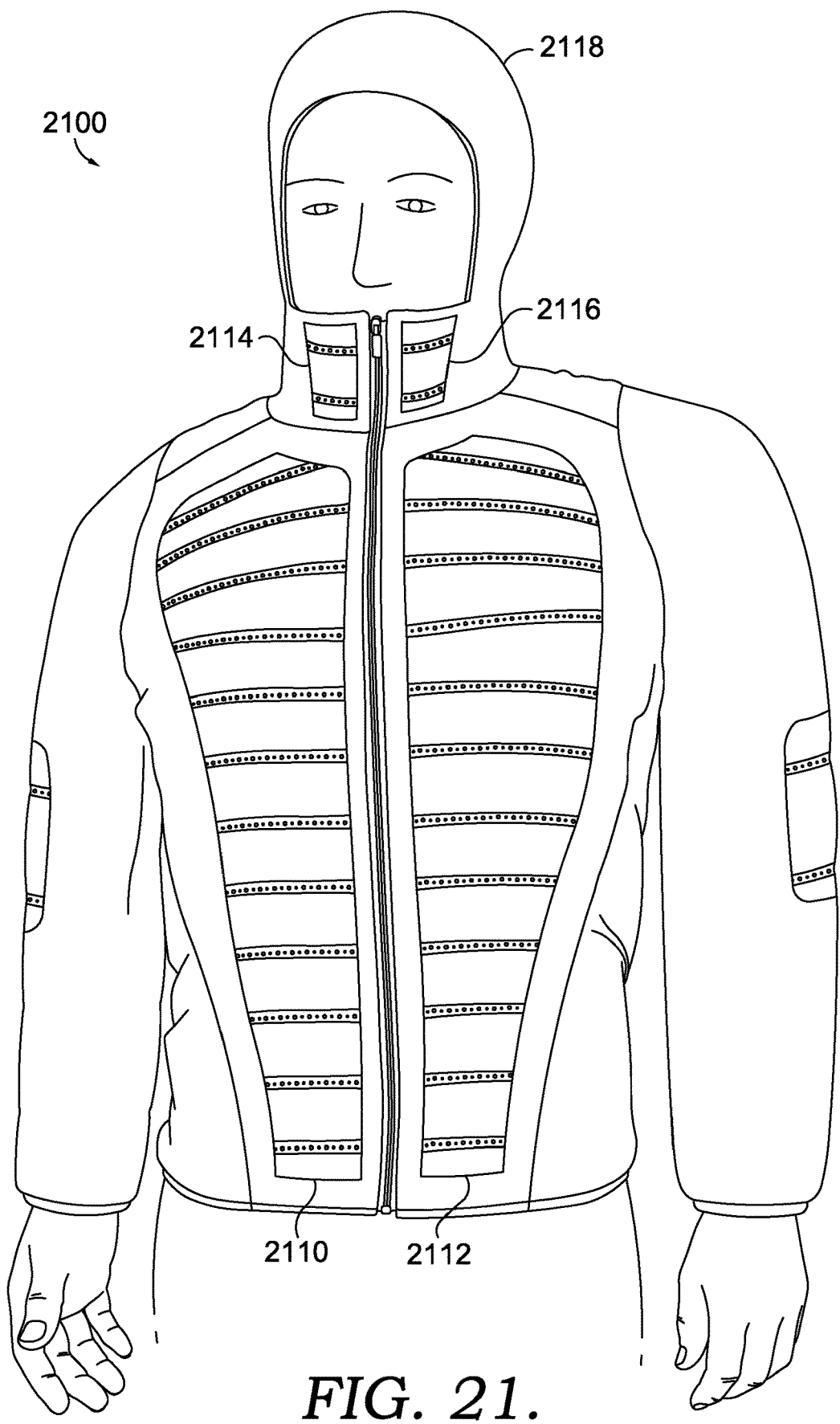
FIG. 21 is a front view of a vented jacket with a hood and vented-insulation sections in accordance with the technology described herein.

Turning now to FIG. 21, insulation zones within a hooded jacket 2100 are shown, in accordance with an aspect of the technology described herein. The hooded jacket 2100 comprises a left-chest vented-insulation section 2112 and a right-chest vented-insulation section 2110. The hooded jacket 2100 may further comprise a hood 2118. The hooded jacket 2100 also comprises a right-neck vented-insulation section 2114 and a left-neck vented-insulation section 2116, which might also align with a mouth and/or nose region of a wearer. As such, the right-neck vented-insulation section 2114 and the left-neck vented-insulation section 2116 might help to facilitate transfer of moisture, heat, and gas (e.g., carbon dioxide) away from a lower-face region of the wearer.

Figure 22:
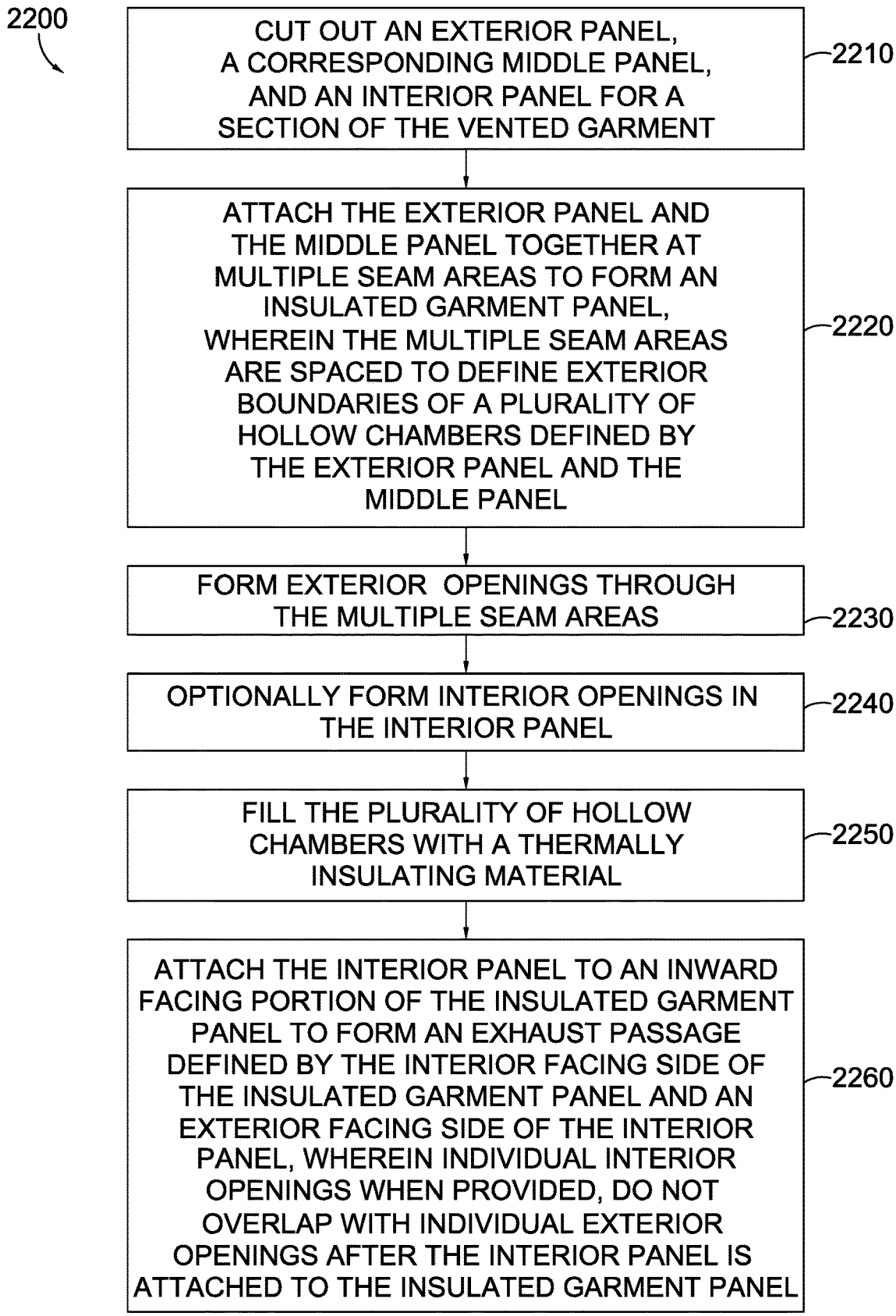
FIG. 22 is a flow chart showing an exemplary method of making a vented garment in accordance with the technology described herein.

Turning now to FIG. 22, a flow chart showing an exemplary method 2200 of making a vented garment is provided. The vented garment could be a jacket, a vest, pants, full body suit, and the like and may comprise any of the configurations as described herein. At step 2210 an exterior panel, a corresponding middle panel, and an interior panel are cut out for a section of the vented garment. In an aspect, this process is repeated for each section of the garment and the sections, once completed at step 2260, are then connected to form the final vented garment.

At step 2220 the exterior panel and the middle panel are attached together at multiple seams to form an insulated garment panel. The multiple seams are spaced to define boundaries of a plurality of hollow chambers defined by the exterior panel and the middle panel. The hollow chambers can be different sizes and shapes to provide varying levels of insulation.

At step 2230 exterior openings through the multiple seams are formed. The exterior openings may have varying numbers as well as different sizes and/or different shapes. The openings can be formed via, for example, laser cutting, water jet cutting, mechanical cutting, and the like. Alternatively, when the panels are formed though an engineered weaving or knitting process, the openings may be formed through the weaving or knitting process. At step 2240, interior openings are optionally formed in the interior panel through any of the methods outlined above. The interior openings if, provided, can have different sizes and different shapes.

At step 2250 the plurality of hollow chambers defined by the seams are filled with a thermally-insulating material, such as down or other synthetic fibers.

At step 2260 the interior panel is attached to an inward-facing portion of the insulated garment panel at one or more areas to form an exhaust passage or space defined by the interior-facing side of the insulated garment panel and an exterior-facing side of the interior panel. In an exemplary aspect, individual interior openings, when provided, generally do not overlap with individual exterior openings after the interior panel is affixed to the insulated garment panel. In other words, the interior openings, when provided, are offset from the exterior openings. The exterior and interior openings, when provided, are connected by the exhaust passages or space between the interior panel and the exterior garment panel.

In one aspect, one or more portions of the vented garment are constructed using an engineered weaving or knitting process (e.g., program a weaving or knitting machine to form these structures). For example, the exterior panels and the interior panels may be formed together through the knitting and weaving process, where the knitting or weaving process may be used to form the seams and/or the exterior and interior openings. Any and all aspects, and any variation thereof, are contemplated as being within the scope herein.

In an alternative method of manufacture, an exterior panel and a corresponding interior panel may be cut out for a section of a garment. Exterior openings may be formed in the exterior panel and interior openings may be formed in the interior panel. The exterior panel and the interior panel may be joined together at one or more seam areas to form an exterior garment panel. The panels may be joined together by, for example, stitching or bonding or upper part of the seam and stitching or bonding a lower part of the seam, where the areas between the stitched or bonded portions remain unaffixed. The exterior panel and the interior panel are positioned or aligned prior to the stitching or bonding process so that the interior openings are offset from the exterior openings at the seam areas and so that the interior openings and the exterior openings are in communication with each other via the unaffixed areas between the stitched or bonded areas.

The one or more seam areas define and delineate one or more chambers which may be filled with a natural or synthetic fill material. The spacing between adjacent seams, in turn, defines the size of the chamber formed between the adjacent seams. As such, the spacing between seams may be adjusted to provide varying levels of insulation for different portions of the garment. Moreover, the spacing, size, and/or number of the exterior openings and the interior openings may be adjusted to facilitate greater or lesser amounts of moisture vapor and/or air transport. For example, the size and number of openings may be increased, and the spacing between openings decreased, to provide a greater amount of moisture vapor and/or air transport, while the size and number of openings may be decreased, and the spacing between openings increased, to provide a lesser amount of moisture vapor and/or air transport. Further, these variables may be adjusted corresponding to where the openings are positioned on the resultant garment. For example, moisture vapor and/or heat transport may be greater on portions of the garment that overlay high heat and/or moisture producing areas of the body such as the back torso along the spine, the flank areas of the wearer the chest area, the thigh or shin areas, the upper arm areas of the wearer, and the like. Continuing, the variables associated with the openings may also be adjusted depending on whether the resultant garment will be used for a male or a female as heat and/or moisture transport needs may differ between males and females. Any and all aspects, and any variation thereof, are contemplated as being within the scope herein.

Figure 23:
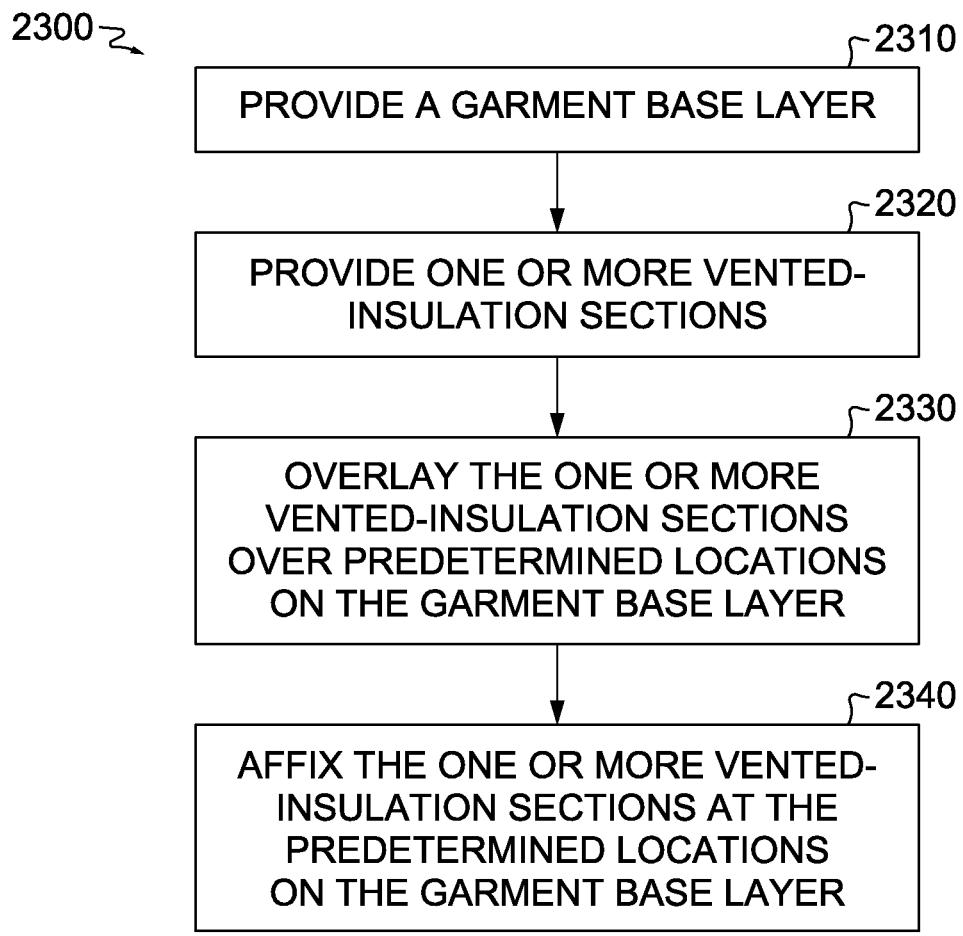
FIG. 23 is a flow chart showing an additional exemplary method of making a vented garment in accordance with the technology described herein.

Turning now to FIG. 23, a flow chart showing an exemplary method 2300 of making a vented garment is provided where the garment comprises one or more vented-insulation sections, such as those shown in FIGS. 9 and 11-21, for example. The method comprises providing at least one garment base layer at step 2310, where the garment base layer may comprise knit or woven synthetic or natural fabrics made for comfort and/or performance enhancement such as moisture wicking fabrics, stretch fabrics, water-resistant fabrics, cotton fabrics, etc. Then, one or more vented-insulation sections constructed according to any of the aspects described above, and having specific shapes and sizes predetermined for their specific location on the finalized garment are provided, as described at step 2320. The one or more vented-insulation sections are placed adjacent to an outer-facing surface of the garment base layer at predetermined locations on the garment base layer as described at step 2330, and are affixed to the garment base layer such that the vented-insulation sections help form an exterior face of the garment once assembled, as described at step 2340. The finalized garment is then constructed from all respective garment base layers.

Figure 24:
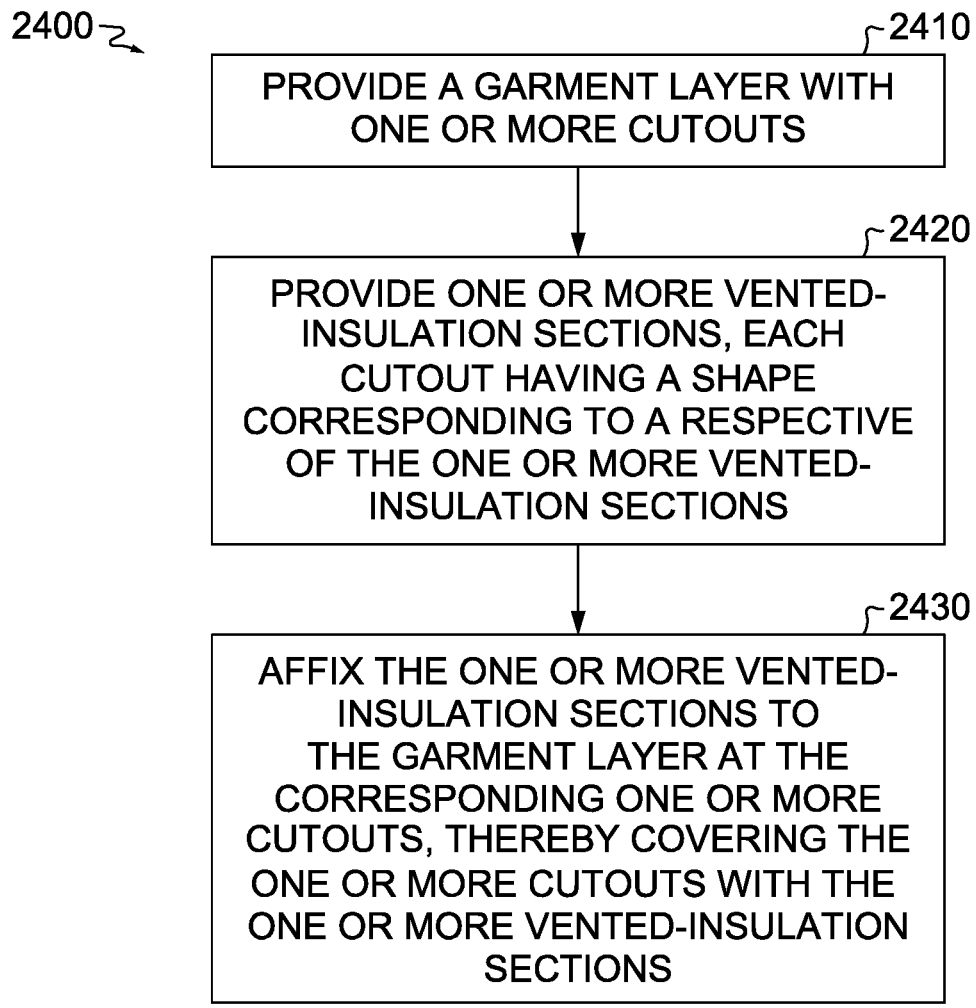
FIG. 24 is a flow chart showing another exemplary method of making a vented garment in accordance with the technology described herein.

FIG. 24 is a flow chart that describes an alternative method of construction to the one described in FIG. 23, where the at least one garment layer is provided having one or more cutouts at step 2410. The one or more cutouts have a shape and size corresponding to the respective one or more vented-insulation sections provided at step 2420. The one or more vented-insulation sections may be affixed to the at least one garment layer at the corresponding one or more cutouts, thereby covering the one or more cutouts with the one or more vented-insulation sections, as described at step 2430.

Figure 25A:
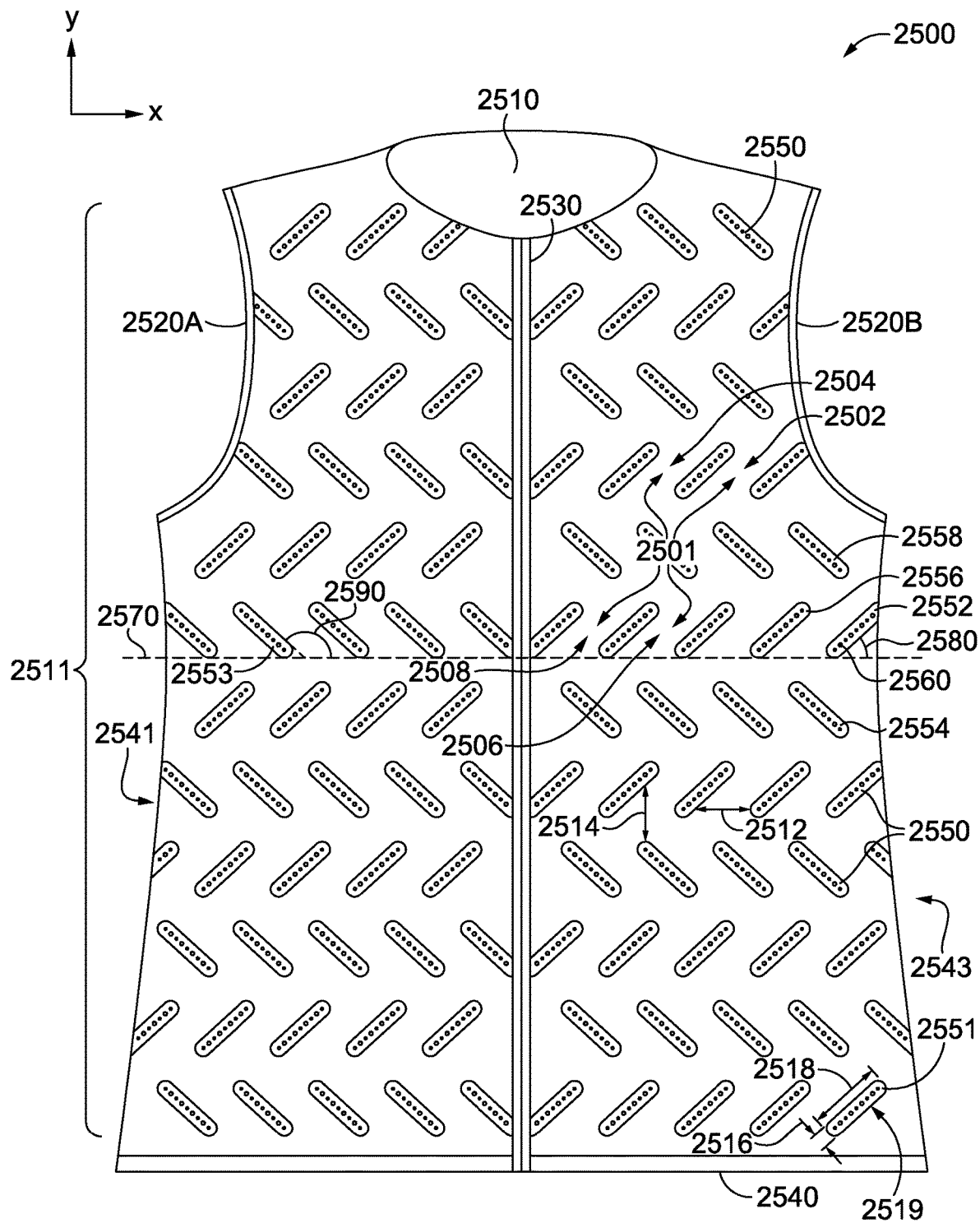
FIGS. 25A and 25B depict front and back views of an exemplary garment in accordance with aspects herein.
Figure 25B:
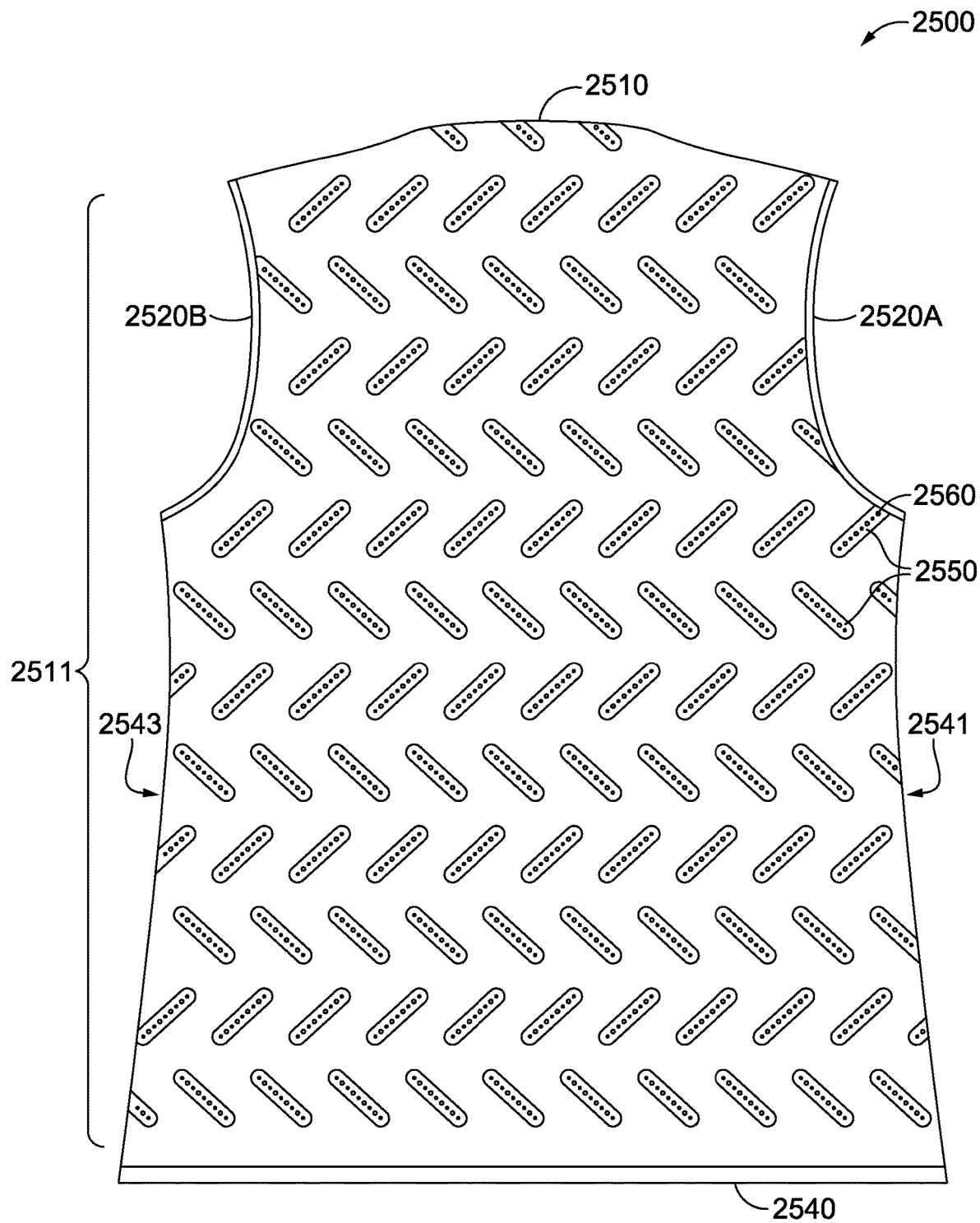

FIG. 25A depicts a frontal view of an exemplary upper body garment 2500, while FIG. 25B depicts a back view of the upper body garment 2500, in accordance with additional aspects herein. As depicted, the upper body garment 2500 is in the form of a vest that comprises at least a collar opening 2510, two armholes 2520A and 2520B, a waist opening 2540 (waist opening), and optionally an opening and closing mechanism 2530 that can be, for example, a zipper, a hook and loop system, a slider mechanism, and the like. As shown, the upper body garment 2500 comprises a plurality of seams 2550, where each seam in the plurality of seams 2550 is bound by a perimeter. For example, seam 2551 is bound by perimeter 2519 defining, for instance, a width 2516 and a length 2518 for seam 2551 in the plurality of seams 2550. Further, at least one seam, for example, seam 2552 in the plurality of seams 2550 may have at least one opening 2560 on a portion of the at least one seam 2552. The at least one opening 2560 may extend through the at least one seam 2552 to provide a vent opening between an interior environment (proximal to a wearer's body when the upper body garment 2500 is worn) and an exterior environment (proximal to environmental elements that the garment is configured to protect the wearer from). The at least one opening 2560, although shown as being a circular vent opening, it is envisioned that the at least one opening 2560 may take on any shape or form such as any alphanumeric form, geometric form, organic form, or any other suitable form such as, for example, a special design, character, and the like.

Furthermore, each seam in the plurality of seams 2550 in accordance to aspects herein, is angularly oriented with respect to an adjacent or neighboring seam in the plurality of seams 2550 or with respect to an imaginary horizontal axis 2570 (i.e. and axis extending along the x-direction) cutting the upper body garment 2500 widthwise across, for example, when the upper body garment 2500 is an as-worn configuration. For example, seam 2552 is angularly oriented with respect to adjacent or neighboring seams 2554, 2556, and 2558. The term "adjacent" as used herein means seams in the plurality of seams 2550 that are beside one another in any direction (above, below, side-to-side, and the like) without another seam interposed therebetween. The angle of the angular orientation of seam 2552 for example, may be measured with respect to the imaginary horizontal axis 2570 cutting across the upper body garment 2500. In accordance with aspects herein, the angle of the angular orientation may be any angle between 0° and 179°. For example, as shown in FIG. 25A, the angle of the angular orientation of each seam in the plurality of seams 2550 with respect to the imaginary horizontal axis 2570 may be an acute angle as, for example, the angle 2580 formed between seam 2552 and the imaginary horizontal axis 2570, or the angle of the angular orientation may be an obtuse angle as, for example, the angle 2590 formed between seam 2553 and the imaginary horizontal axis 2570. As well, the angle of orientation between each seam may be further measured with respect to an adjacent seam as will be further discussed below, for example, with respect to FIG. 33.

The angular orientation of each seam in the plurality of seams 2550 forms or defines, for example, the plurality of interconnected chambers 2501. As described above, the term "interconnected chamber" may be defined as two or more chambers that are connected to each other forming a continuous open path between the two or more chambers. The angular orientation of the plurality of seams 2550 is important because the angular orientation of the plurality of seams 2550 causes the formation of angular interconnected chambers (e.g., plurality of interconnected chambers 2501). The combination of angularly oriented seams (e.g., plurality of seams 2550) and angular interconnected chambers (e.g., plurality of interconnected chambers 2501) prevent or minimize the drift of the thermally insulating materials such as, for example, down or synthetic fibers from one chamber (e.g., one of 2502, 2504, 2506, 2508) to another chamber (e.g., one of 2502, 2504, 2506, 2508) in the plurality of interconnected chambers 2501. In other words, even though the plurality of seams 2550 form or define a plurality of interconnected chambers 2501, the travel of the insulating material contained within each chamber (e.g., one of 2502, 2504, 2506, 2508) in the plurality of interconnected chambers 2501 is prevented or minimized because, for example, although chamber 2502 is interconnected with at least chamber 2506 and chamber 2504 is interconnected with at least chamber 2508, there is no straight downward path (i.e., relative to the upper body garment 2500) formed between the interconnected plurality of interconnected chambers 2501. To put it yet another way, by the angular orientation of the plurality of seams 2550 and the lack of a straight (or generally straight) vertical (or generally vertical) open chamber path that would allow the down or synthetic fibers to settle, the settling of the down or synthetic fiber is avoided or reduced.

Continuing, drift of the thermally insulating material due to gravity (downward) or in a lateral direction (side-to-side) is prevented or minimized because the pattern that is followed by the plurality of seams 2550, and, by extension, the plurality of interconnected chambers 2501, does not leave a straight open path along at least a y axis (e.g., as shown in FIGS. 25A and 25B). For example, zig-zag pattern 2511 followed by the plurality of seams 2550 prevents the formation of a straight open path (or generally straight open path) in a vertical direction (i.e., perpendicular to the imaginary horizontal axis 2570) that extends, for example, from the collar opening 2510 to the waist opening 2540. Optionally, the plurality of seams 2550 may be placed in a pattern (as further discussed with reference to the figures below) that may prevent the formation of a straight open path (or generally straight open path) in a horizontal direction (i.e., parallel to the imaginary horizontal axis 2570) that extends, for example, from a first garment lateral end 2541 to a second garment lateral end 2543, as well as in the vertical direction, to further prevent or minimize lateral drift.

Thus, in accordance with aspects herein, the plurality of seams 2550 are arranged in the zig-zag pattern 2511 shown, where each seam in a row of seams is located at a distance 2512 from each adjacent seam in the plurality of seams 2550. And each seam in a column of seams is located at a distance 2514 from each adjacent seam in the plurality of seams 2550. The distances 2512 and 2514 define a size of each chamber in the plurality of interconnected chambers 2501. Further a seam (e.g., seam 2552) in a first row of the plurality of seams 2550 may be angularly oriented in a first direction and another seam in a second successive row of seams (e.g., seam 2554) may be oriented in a second direction that is opposite to the first direction. Additionally, seam 2552 and 2554 may be horizontally offset from one another to create the zig-zag pattern 2511 (horizontally offset (i.e., offset in the x-direction) in accordance herein means, for example, that a midpoint of first seam 2552 is not vertically aligned (i.e., aligned in the y-direction) with a midpoint of second seam 2554). In other words, a portion of seam 2552 is horizontally aligned with a portion of at least neighboring seam 2554. Furthermore, the size of each chamber in the plurality of interconnected chambers 2501 is further defined by, for example, the width 2516 and the length 2518 of each seam in the plurality of seams 2550. Additionally, in some exemplary aspects, the plurality of seams 2550 may all comprise the same width 2516 and length 2518 (as shown in FIGS. 25A and 25B), or, in another exemplary aspect, the plurality of seams 2550 may comprise different widths and/or different lengths, depending on the pattern formed by the plurality of seams 2550, as will be further described with respect to FIGS. 26A-28B.

It is to be noted that although the zig-zag pattern 2511, is shown as extending throughout the whole upper body garment 2500 in FIGS. 25A and 25B, it is envisioned that a garment may comprise different seam configurations at different portions of the garment. For example, the zig-zag pattern 2511 (or any other pattern forming interconnected chambers) may be located only at a top portion of the garment (e.g., the portion of the upper body garment 2500 that is above the imaginary horizontal axis 2570) with a continuous (uninterrupted) seam extending along the imaginary horizontal axis 2570 demarcating the separation and preventing the downward (i.e., vertical) shift of the insulating material below the demarcating seam (not shown). The remaining portions of the insulated garment may then comprise a different type of seam configuration that may or may not form interconnected chambers. In other words, discrete garment or article portions may be demarcated and provided with a seam configuration that is different than the rest of the garment or article. For instance, as will become more apparent with respect to the description of the figures below, portions of a garment or article may be demarcated and provided with a specific seam configuration having a plurality of openings on the seams that are within the demarcated portion, while the plurality of seams that are outside of the demarcated portion may or may not have the plurality of perforations. Alternatively, the seams separating insulated chambers that are formed in the garment or article outside of the demarcated portion may be traditional stitched seams (i.e., seams that do not have a width beyond the width of the thread or yarn used for stitching). Further, as described above, for example, discrete vented-insulation sections having the interconnected chambers (e.g., panel inserts) may be provided in garments or articles that are otherwise not insulated or constructed in a different manner, (as described in FIGS. 9-21). Any and all possible combinations are within the scope of the aspects described herein.

Figure 26A:
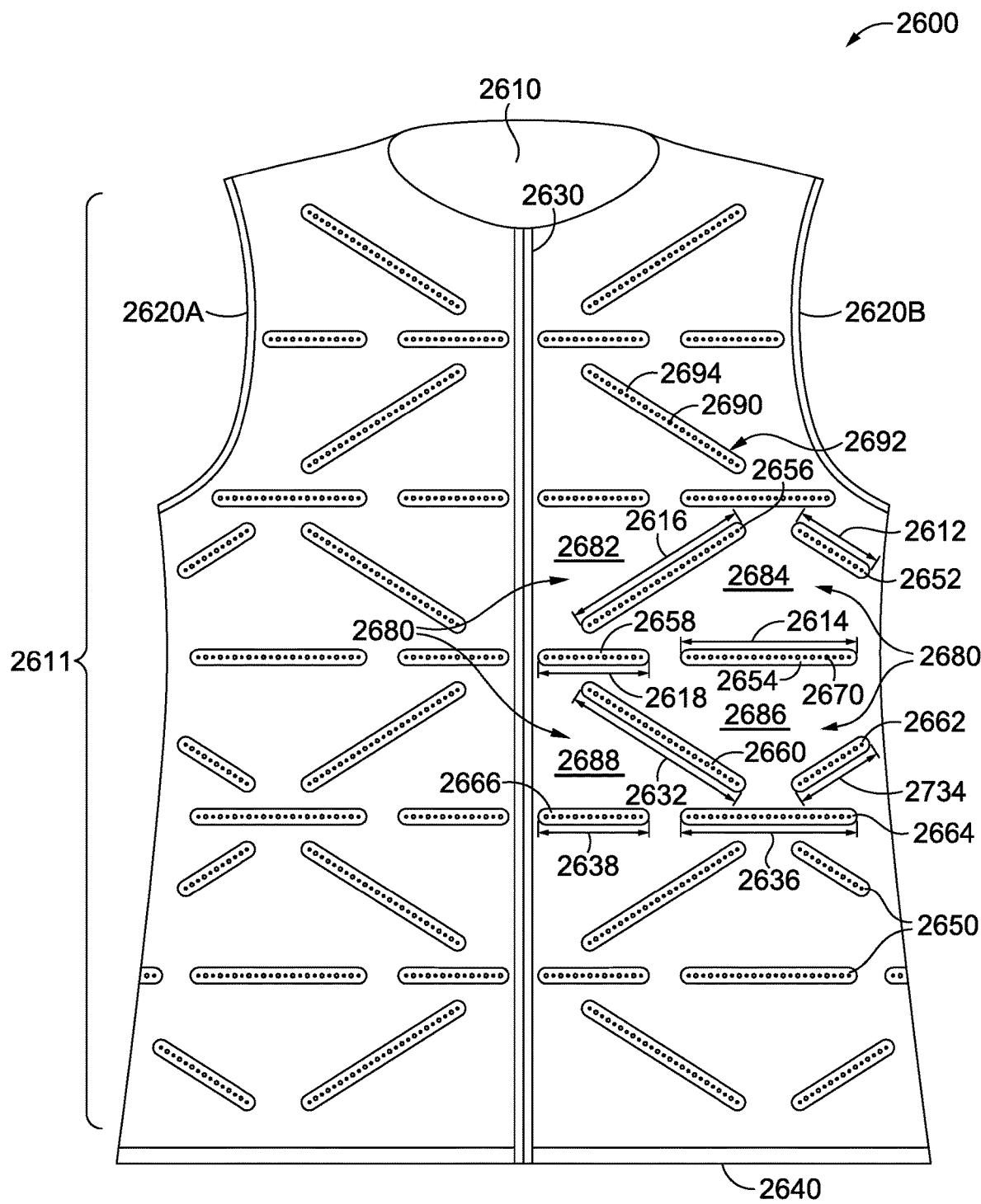
FIGS. 26A and 26B depict front and back views of another exemplary garment in accordance with aspects herein.
Figure 26B:
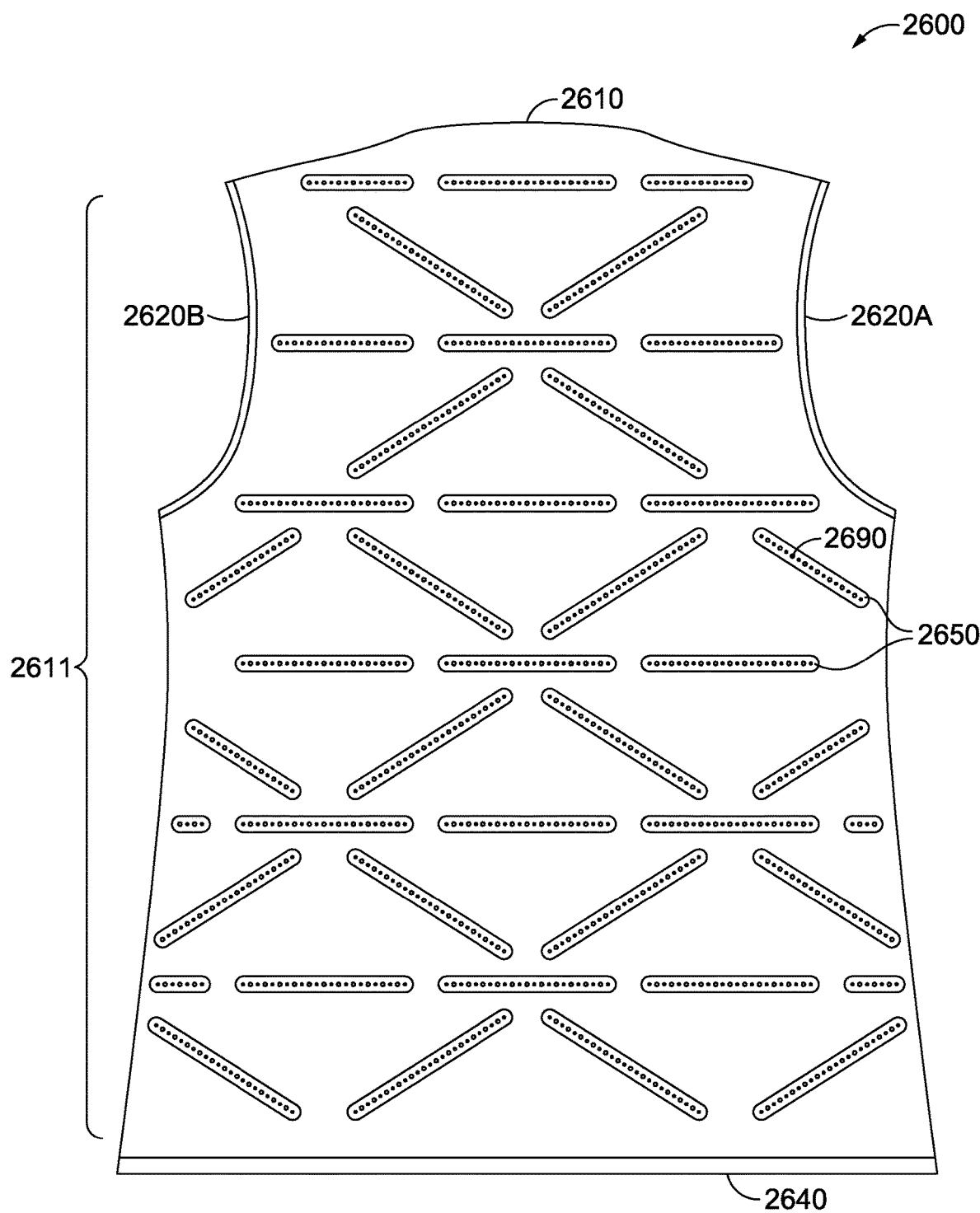

FIG. 26A depicts a frontal view of another exemplary upper body garment 2600, while FIG. 26B depicts a back view of the upper body garment 2600, in accordance with additional aspects herein. Like the upper body garment 2500, the upper body garment 2600 is a vest comprising a collar opening 2610, a first armhole 2620A, a second armhole 2620B, a bottom opening 2640 (waist opening), and an optional closable mechanism 2630. Further, the upper body garment 2600 comprises a plurality of seams 2650 arranged in a pattern (indicated generally by the reference numeral 2611) that is different from the zig-zag pattern 2511 shown in FIGS. 25A and 25B. The pattern 2611 forms a plurality of interconnected chambers 2680. Like upper body garment 2500, each seam in the plurality of seams 2650 is located at an angle from each adjacent or neighboring seam in the plurality of seams 2650. However, unlike the upper body garment 2500, the plurality of seams 2650 comprise different sizes and angles of orientation in the pattern 2611.

For example, the pattern 2611 shown in FIGS. 26A and 26B is formed by a repetition of a first seam 2652 having a first length 2612, a second seam 2654 having a second length 2614, a third seam 2656 having a third length 2616, a fourth seam 2658 having a fourth length 2618, a fifth seam 2660 having a fifth length 2632, a sixth seam 2662 having a sixth length 2634, a seventh seam 2664 having a seventh length 2636, and an eighth seam 2666 having an eight length 2638. The first seam 2652, the second seam 2654, the third seam 2656, the fourth seam 2658, the fifth seam 2660, the sixth seam 2662, the seventh seam 2664, and the eighth seam 2666, collectively form, for example, interconnected chambers 2682, 2684, 2686, and 2688.

As presented above with reference to FIGS. 25A and 25B, despite the plurality of interconnected chambers 2680 being interconnected, the pattern 2611 formed by the plurality of seams 2650, and the angular orientation (any angle between 0° and 179°) of the plurality of seams 2650 with respect to each other, for example, prevents the lateral and downward/upward drift of the thermally insulating material from one chamber to another chamber in the plurality of interconnected chambers 2680, when the garment is in an as-worn configuration. In other words, the lack of a straight path in the lateral/horizontal direction or in the vertical direction, helps prevent the thermally insulating material from traveling to and from, for example, chambers 2682, 2684, 2686, and 2688. Further, one or more of the plurality of seams 2650 may comprise one or more openings extending through the one or more of the plurality of seams 2650. For example, opening 2690 extends through seam 2694 within the perimeter 2692 of seam 2694. In other words, the opening 2690 extends through all layers forming the garment at seam 2694 to provide a vent to allow a fluid exchange (e.g., air, vapor, perspiration) between an interior environment (proximal to a wearer's body) and an exterior environment (proximal to environmental elements), when the garment is worn.

Figure 27A:
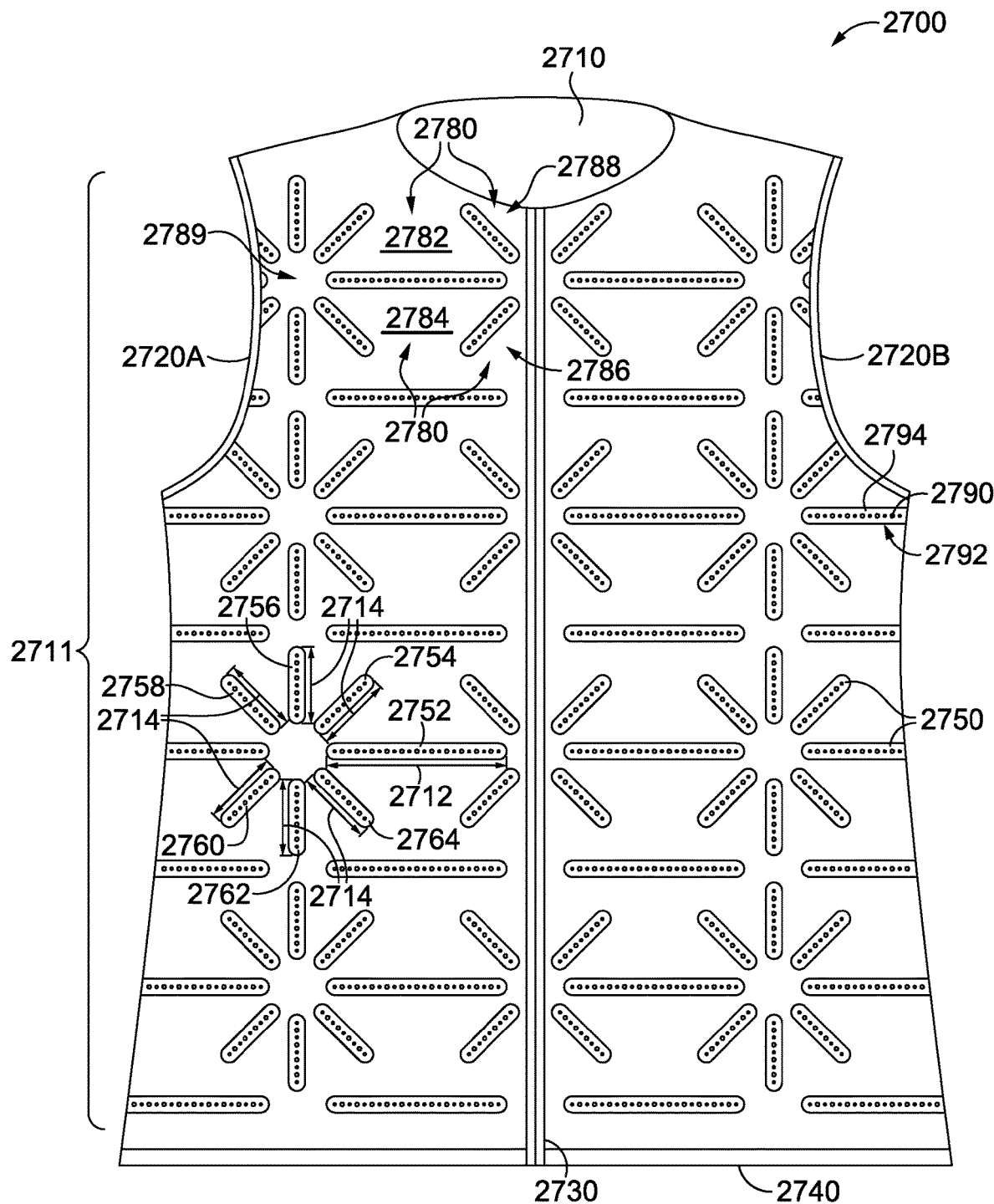
FIGS. 27A and 27B depict front and back views of a different exemplary garment in accordance with aspects herein.
Figure 27B:
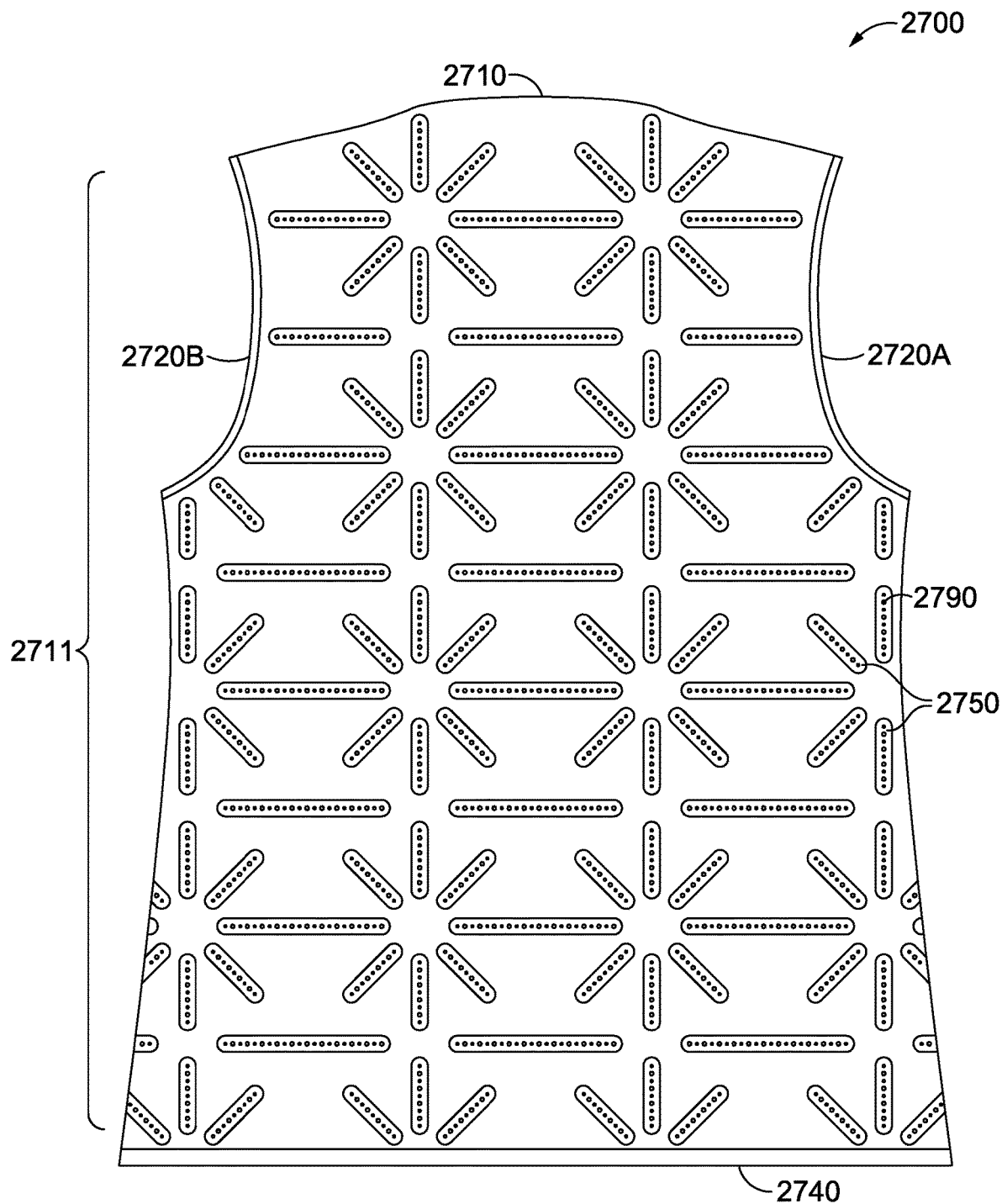

FIG. 27A depicts a frontal view of a further exemplary upper body garment 2700, while FIG. 27B depicts a back view of the upper body garment 2700, in accordance with additional aspects herein. Like the upper body garments 2500 and 2600, the upper body garment 2700 is a vest comprising a collar opening 2710, a first armhole 2720A, a second armhole 2720B, a bottom opening 2740 (waist opening), and an optional closable mechanism 2730. Further, the upper body garment 2700 comprises a plurality of seams 2750 arranged in a different pattern 2711 forming a plurality of interconnected chambers 2780.

Like upper body garments 2500 and 2600, each seam in the plurality of seams 2750 is located at an angle from each adjacent or neighboring seam in the plurality of seams 2750. Further, like the upper body garment 2600, the plurality of seams 2750 comprise different sizes when forming the pattern 2711. For example, the pattern 2711 shown in FIGS. 27A and 27B is formed by a repetition of a first seam 2752 having a first length 2712, a second seam 2754 having a second length 2714, a third seam 2756 having the second length 2714, a fourth seam 2758 having the second length 2714, a fifth seam 2760 having the second length 2714, a sixth seam 2762 having the second length 2714, and a seventh seam 2764 also having the second length 2714. The repeated pattern formed from, for example, the first seam 2752, the second seam 2754, the third seam 2756, the fourth seam 2758, the fifth seam 2760, the sixth seam 2762, and the seventh seam 2764, collectively form, for example the plurality of interconnected chambers 2780 such as interconnected chambers 2782, 2784, 2786, 2788, and 2789. As presented above, despite the plurality of interconnected chambers 2780 being interconnected, the pattern 2711 formed by the plurality of seams 2750, and the angular orientation (any angle between 0° and 179°) of the plurality of seams 2750 with respect to each other, prevents or minimizes the lateral and downward/upward drift of the thermally insulating material from one chamber to another chamber in the plurality of interconnected chambers 2780. In other words, the lack of a straight path in the lateral direction or in the up/down direction, helps prevent or minimize the thermally insulating material from traveling to and from, for example, interconnected chambers 2782, 2784, 2786, and 2788.

Further, one or more of the plurality of seams 2750 may comprise one or more openings. For example, as shown in seam 2794, seam 2794 may comprise an opening 2790 formed within a perimeter 2792 defined by a length and a width of the seam 2794. In other words, the opening 2790 is located on the seam 2794 and is configured extend through all layers of the upper body garment 2700 forming the seam 2797, to provide a vent to allow for a fluid exchange (e.g. air, vapor, perspiration) between an interior environment (proximal to a wearer's body) and an exterior environment (proximal to environmental elements).

Figure 28A:
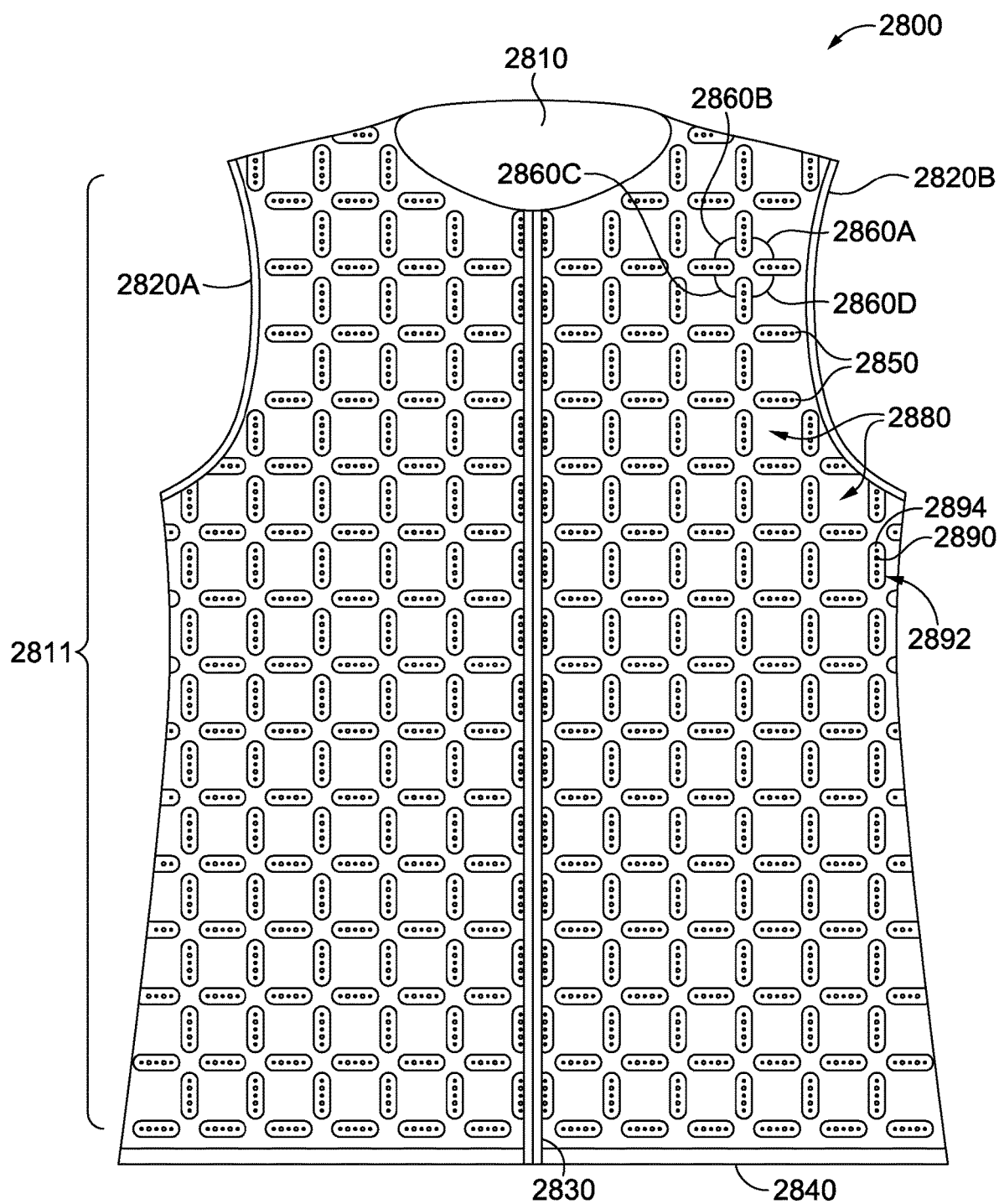
FIGS. 28A and 28B depict front and back views of yet another exemplary garment in accordance with aspects herein.
Figure 28B:
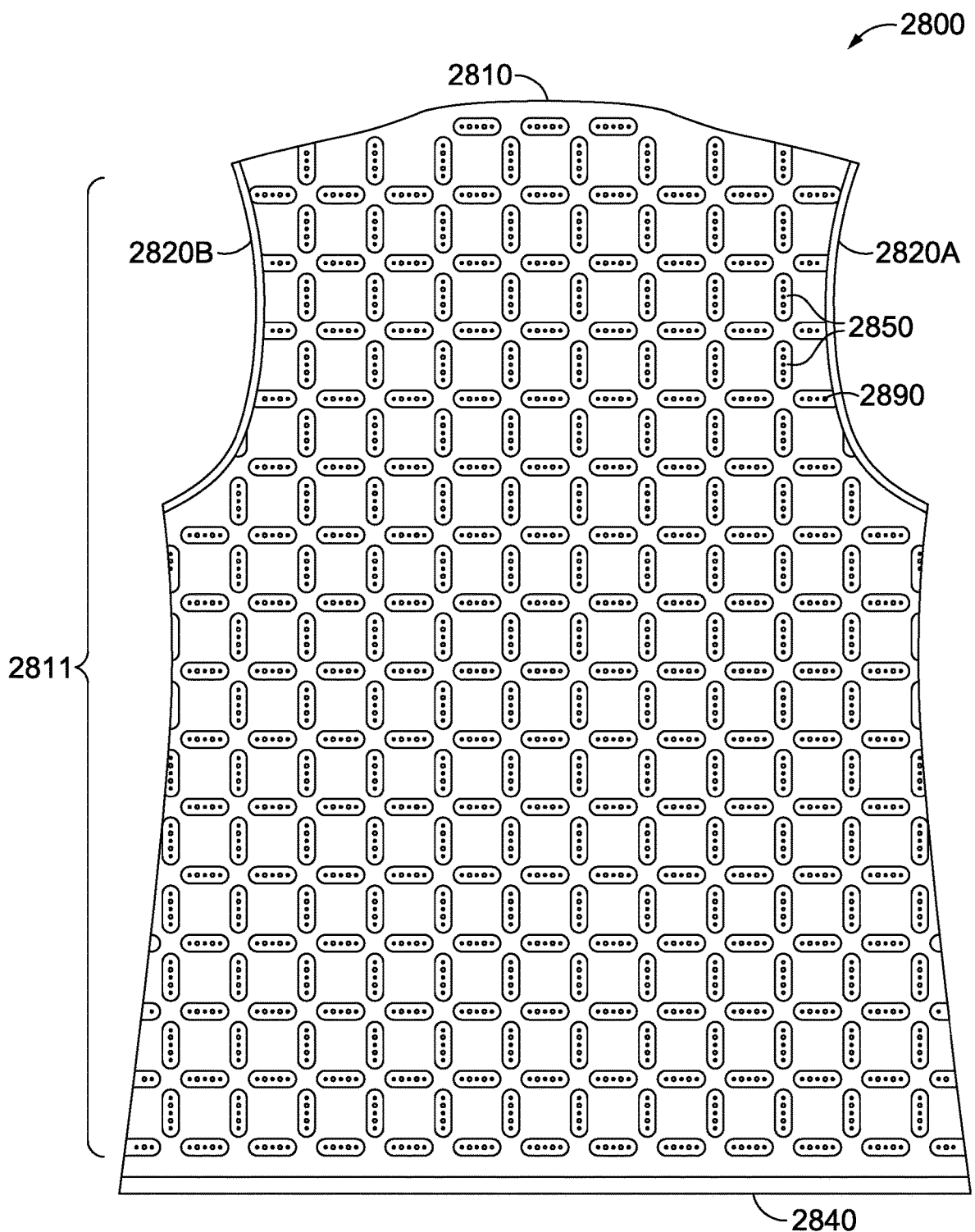

Moving on to FIGS. 28A and 28B, FIG. 28A depicts a frontal view of a further exemplary upper body garment 2800, while FIG. 28B depicts a back view of the upper body garment 2800, in accordance with additional aspects herein. Like the upper body garments 2500, 2600, and 2700, the upper body garment 2800 is depicted as a vest comprising a collar opening 2810, a first armhole 2820A, a second armhole 2820B, a bottom opening 2840 (waist opening), and an optional closable mechanism 2830. Further, the upper body garment 2800 comprises a plurality of seams 2850 arranged in a pattern 2811 forming a plurality of interconnected chambers 2880. Like upper body garments 2500, 2600, and 2700, each seam in the plurality of seams 2850 is located at an angle from each adjacent or neighboring seam in the plurality of seams 2850.

In the upper body garment 2800, the plurality of seams 2850 are arranged so that adjacent or neighboring seams in the plurality of seams 2850 are at right angles 2860A, 2860B, 2860C, and 2860D with each other, thereby forming the pattern 2811 with interconnected chambers 2880, where each seam in the plurality of seams 2850 comprises generally the same length and width like in the upper body garment 2500. As presented above, despite the plurality of interconnected chambers 2880 being interconnected, the pattern 2811 formed by the plurality of seams 2850 and the angular orientation (in this exemplary garment being 90°) of the plurality of seams 2850 with respect to each other, prevents or helps minimize the lateral and downward/upward drift of the thermally insulating material from one chamber to another chamber in the plurality of interconnected chambers 2880. In other words, the lack of a straight path in the lateral direction or in the up/down direction helps prevent the thermally insulating material from shifting around.

Further, one or more of the plurality of seams 2850 may comprise one or more openings extending through one or more of the plurality of seams 2850. For example, seam 2894 comprises one or more openings 2890 within a perimeter 2892 of the seam 2894. In other words, at the seam 2894, the one or more openings 2890 extend through all layers of the seam 2894 to provide a vent opening to allow for a fluid exchange (e.g. air, vapor, perspiration) between an interior environment (proximal to a wearer's body) and an exterior environment (proximal to environmental elements).

FIGS. 29A, 29B, 30A, 30B, 31A, and 31B depict yet other types of garments 2900, 3000, and 3100 in accordance with aspects herein. Garments 2900, 3000, and 3100 are only exemplary for the application of the technology described herein. It is contemplated that the technology described herein may be implemented in other types of garments and articles that may be configured to provide thermal insulation to a user such as, shorts, t-shirts, hoodies, pullovers, body suits, sleeping bags, blankets, and the like. Although FIGS. 29A to 31B are depicted as comprising a seam pattern similar to the zig-zag pattern 2511 described above with respect to FIGS. 25A and 25B, it is contemplated that garments 2900, 3000, and 3100 may comprise any seam pattern that is in accordance with aspects herein. As well, it is contemplated that many other seam patterns may be attained where a plurality of suitably sized discrete seams angularly oriented (any angle between 0° and 179°) with respect to each other may be provided. As described above, the seam pattern and the angular orientation of the seams prevent or help minimize thermally insulating materials such as down or synthetic fibers from migrating from their original location even if the chambers formed between the seams are interconnected.

Figure 29B:
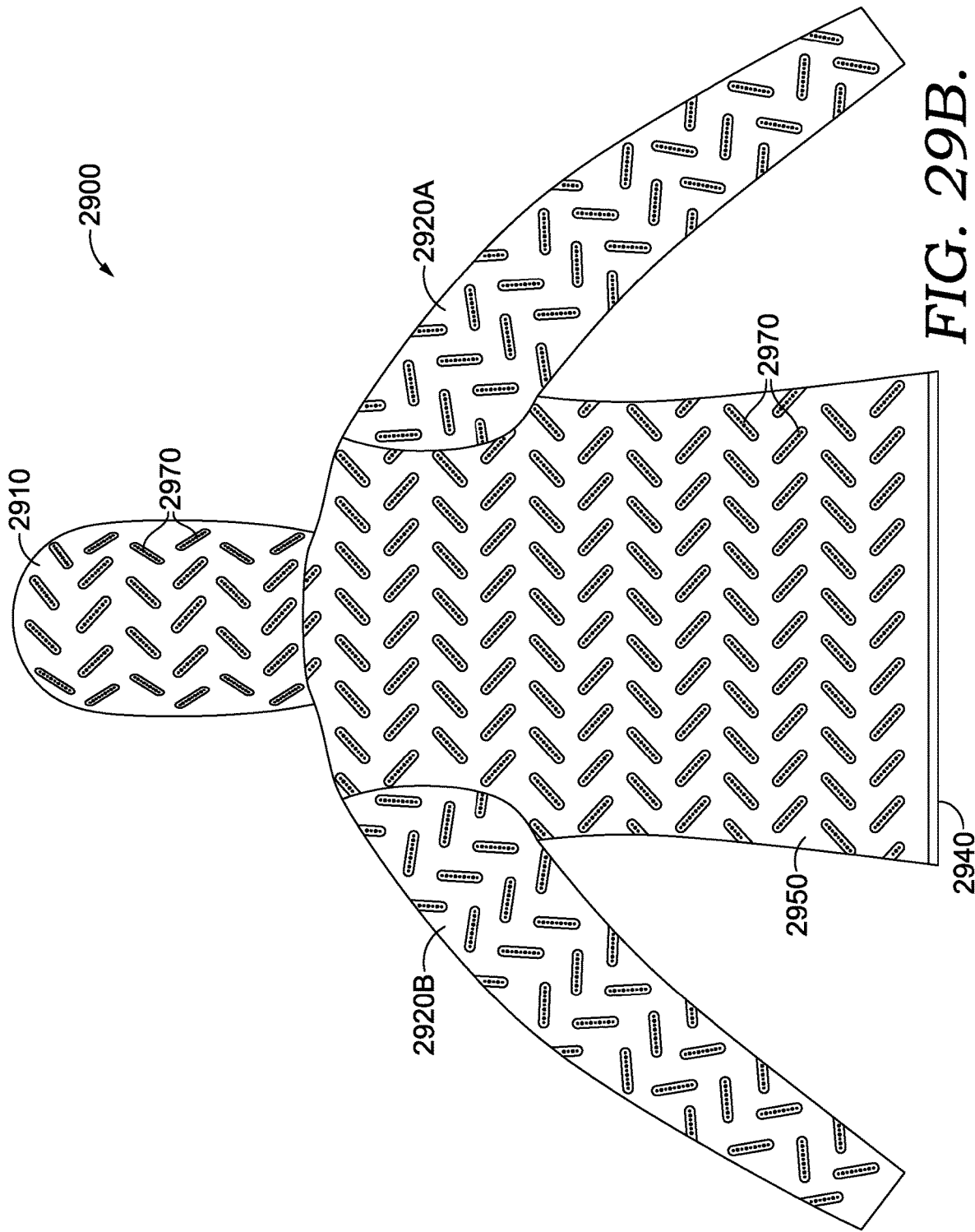

Garment 2900 shown in FIGS. 29A and 29B is depicted as a jacket/coat having a hood 2910, a body portion 2950 with a first sleeve 2920A and a second sleeve 2920B. Specifically, FIG. 29A depicts a front view and FIG. 29B depicts a back view of the garment 2900, in accordance with aspects herein. The garment 2900 may optionally comprise an opening and closing mechanism 2930 such as, for example, a zipper, a hook and loop mechanism, a sliding mechanism, and the like. When in a closed configuration (as shown), garment 2900 may further comprise a first opening 2940 (waist opening) formed by the body portion 2950 and a second opening 2960 (face opening) formed by the hood 2910, wherein the hood 2910 is configured to provide protection to a wearer's head when the garment 2900 is worn. As well, the hood 2910 in accordance with aspects herein may also comprise a plurality of seams 2970 as in the rest of the garment 2900. As discussed previously, one or more seams of the plurality of seams 2970 may comprise one or more openings 2972 within the seam perimeter of the one or more seams in the plurality of seams 2970. The one or more openings being configured to allow for a fluid to flow between an interior environment of the garment 2900 to an exterior environment of the garment 2900 to provide a more comfortable wear for the wearer. Further, as described above, a plurality of interconnected chambers 2980 may be formed between the plurality of seams 2970. Further, because of the angular orientation (between 0° and 179°) of the plurality of seams 2970 with respect to each other, the insulating material provided in the plurality of interconnected chambers 2980 may be prevented from migrating away from its original location.

Figure 30A:
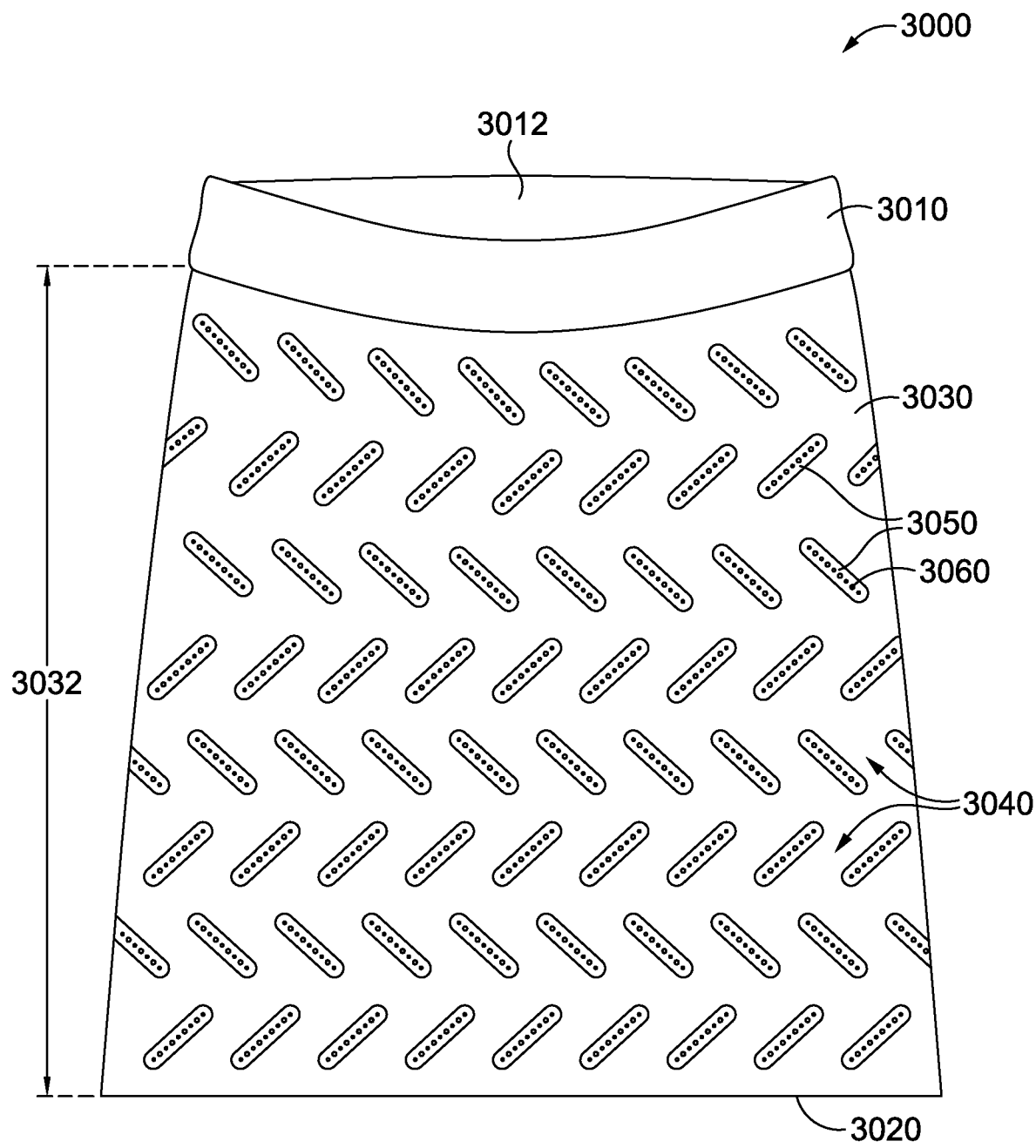
FIGS. 30A and 30B depict front and back views of a further exemplary garment in accordance with aspects herein.
Figure 30B:
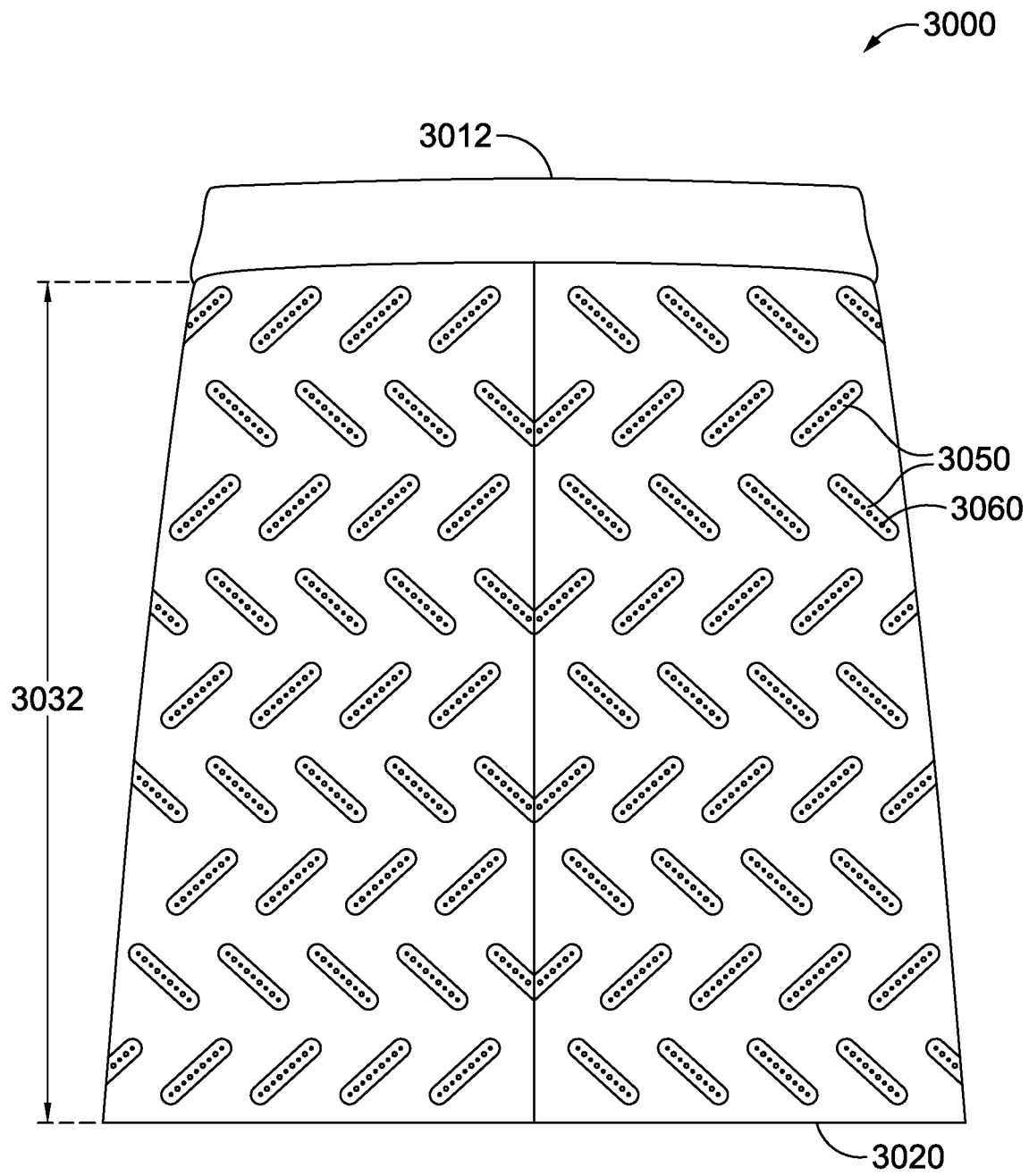

Garment 3000 shown in FIGS. 30A and 30B is depicted as a skirt having a waist opening 3012 defined by a waistband 3010, a body portion 3030 having a length 3032 measured between the waistband to a bottom edge 3020. Specifically, FIG. 30A depicts a front view and FIG. 30B depicts a back view of the garment 3000, in accordance with aspects herein. As shown, the garment 3000 may comprise a plurality of seams 3050 that are angularly oriented with respect to each other (angle between 0° and 179°) where one or more seams in the plurality of seams 3050 may comprise one or more openings 3060 for allowing a fluid to flow between an inner and an outer environment. As well, a plurality of interconnected chambers 3040 may be formed between the plurality of seams 3050.

Figure 31A:
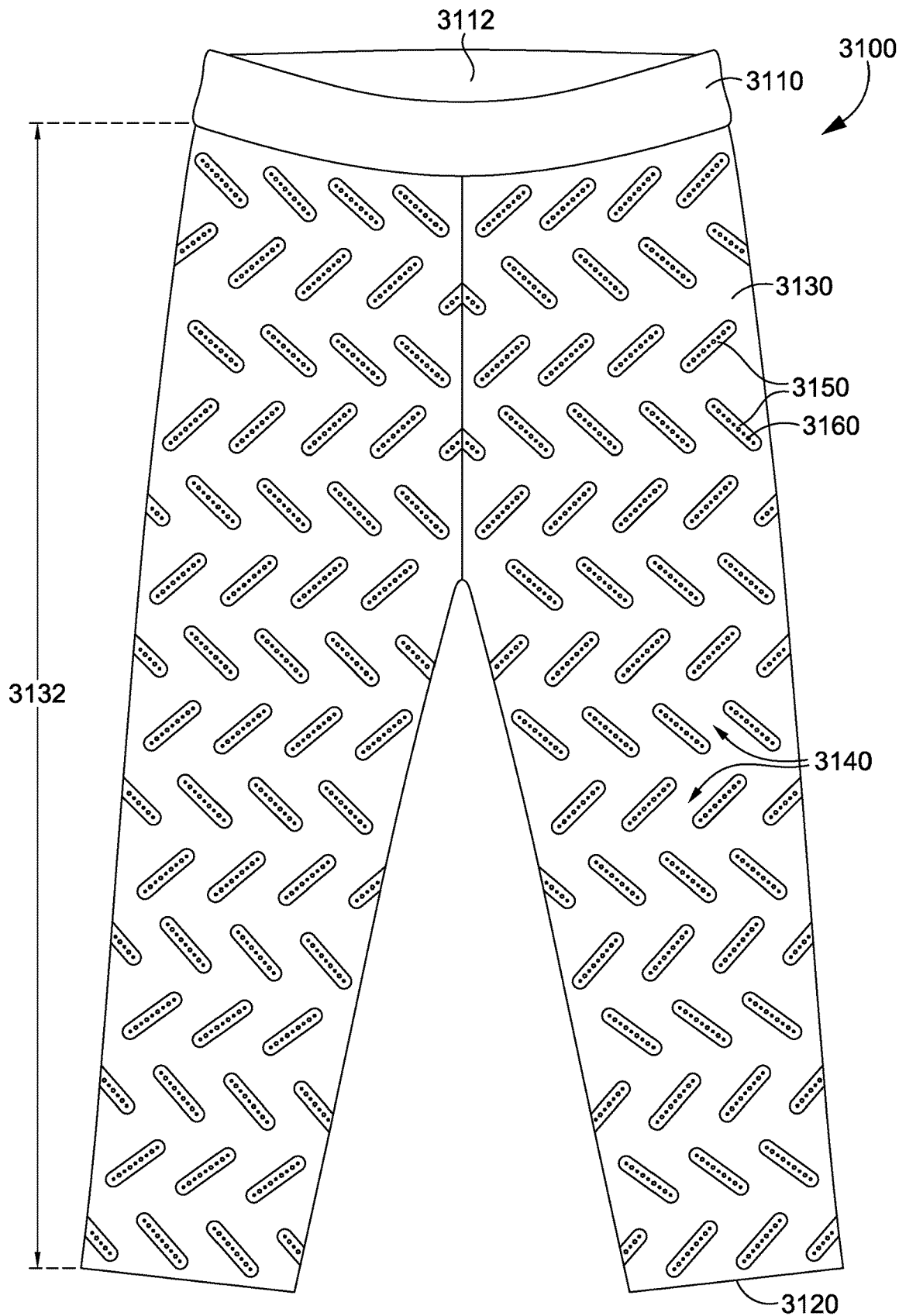
FIGS. 31A and 31B depict front and back views of another exemplary garment in accordance with aspects herein.
Figure 31B:
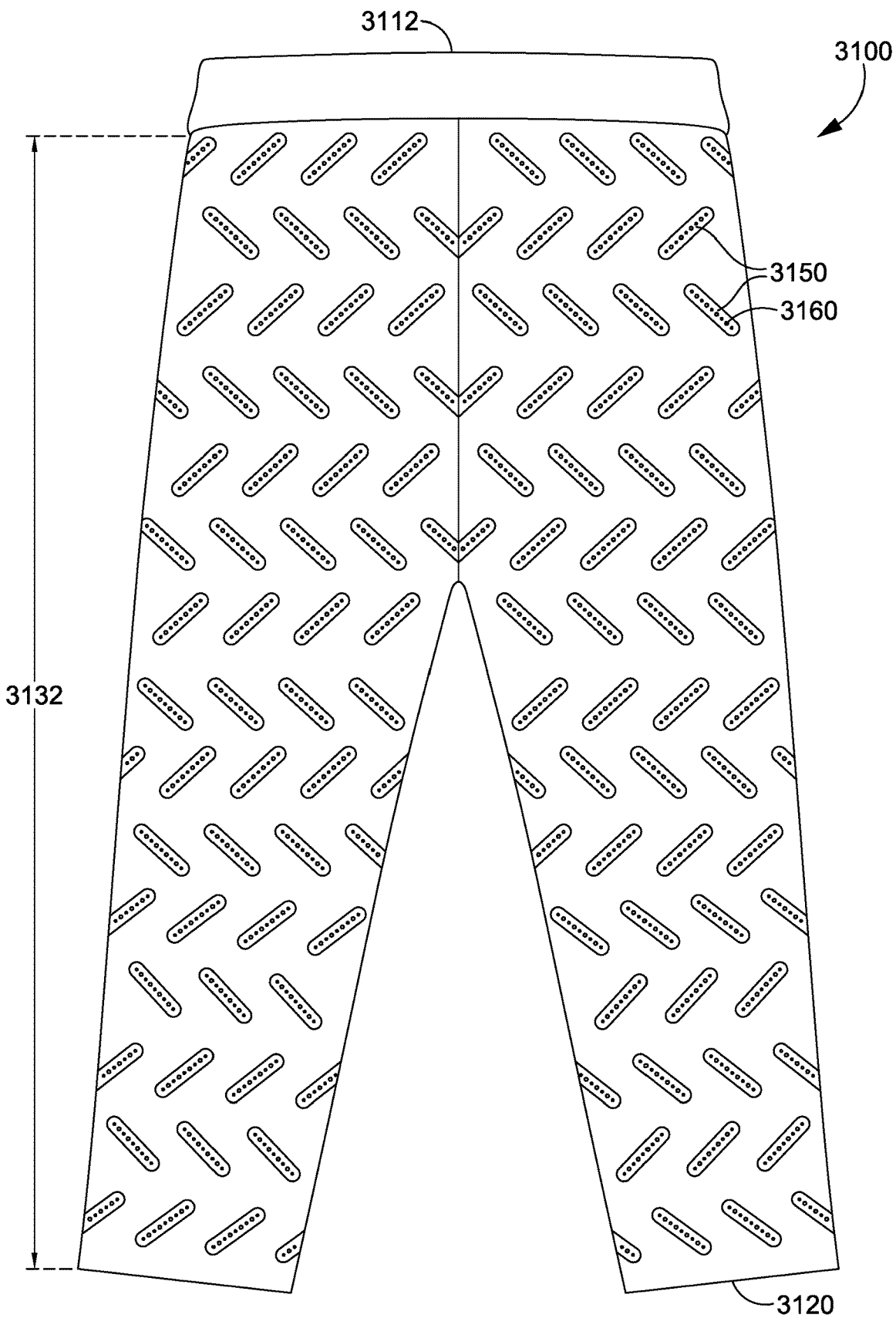

Garment 3100 shown in FIGS. 31A and 31B is depicted as a pair of pants having a waist opening 3112 defined by a waistband 3110, a body portion 3130 having a length 3132 measured between the waistband 3110 to a bottom edge 3120. Specifically, FIG. 31A depicts a front view and FIG. 31B depicts a back view of the garment 3100, in accordance with aspects herein. As shown, the garment 3100 may comprise a plurality of seams 3150 that are angularly oriented with respect to each other (angle between 0° and 179°) where one or more seams in the plurality of seams 3150 may comprise one or more openings 3160 for allowing a fluid flow between an inner and an outer environment. As well, a plurality of interconnected chambers may be 3140 may be formed between the plurality of seams 3150.

Figure 32A:
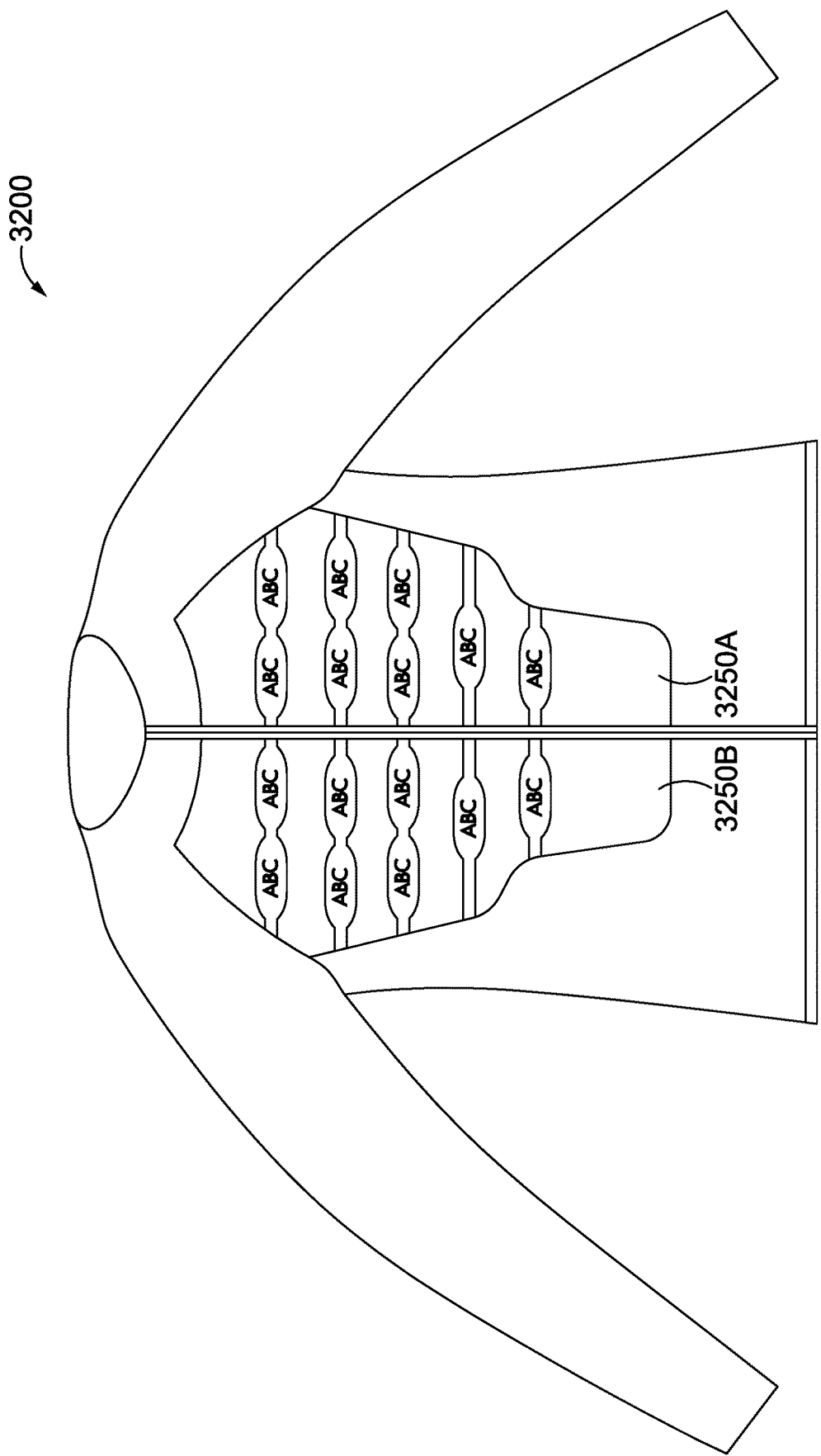
FIGS. 32A and 32B depict front and back views of an additional exemplary garment in accordance with aspects herein.
Figure 32B:
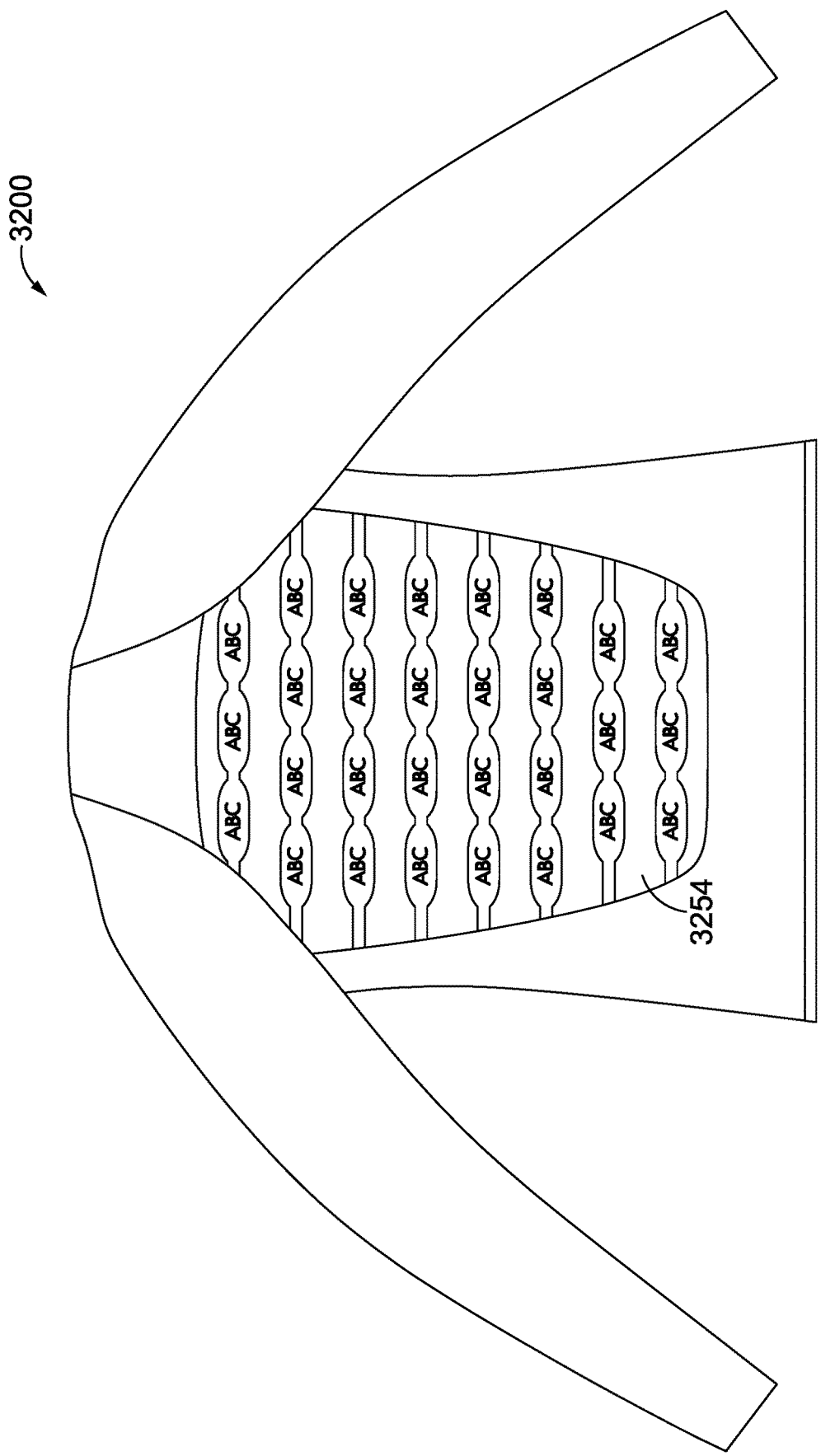

Garment 3200 shown in FIGS. 32A and 32B is depicted as a jacket/coat comprising insulated areas 3250A and 3250B on the front, and 3254 on the back, where the insulated areas 3250A, 3250B, and 3254 (shown in FIG. 32B) may be constructed in a similar manner as the vented-insulation sections or zones described above. Insulated areas 3250A, 3250B, and 3254 of garment 3200 comprise one or more seams separating one or more insulated chambers, where at least one seam in the one or more seams may comprise one or more openings or perforations located on the at least one seam. As described above, the one or more openings or perforations formed on the one or more seams, in accordance with aspects of the technology described herein may comprise any desired shape and/or size suitable to fit within the boundaries of the seams. In the garment 3200, for example, the one or more openings or perforations are in the form of one or more alphanumerical characters and may be formed to spell, for example, a name, a brand name, or a message. Further, as shown, the one or more seams do not have to comprise straight edges or an even uniform width. Rather, as shown, the one or more seams may comprise irregular widths defined by curvilinear perimeters forming symmetrical or asymmetrical shapes, as necessary for a particular garment configuration.

Figure 33:
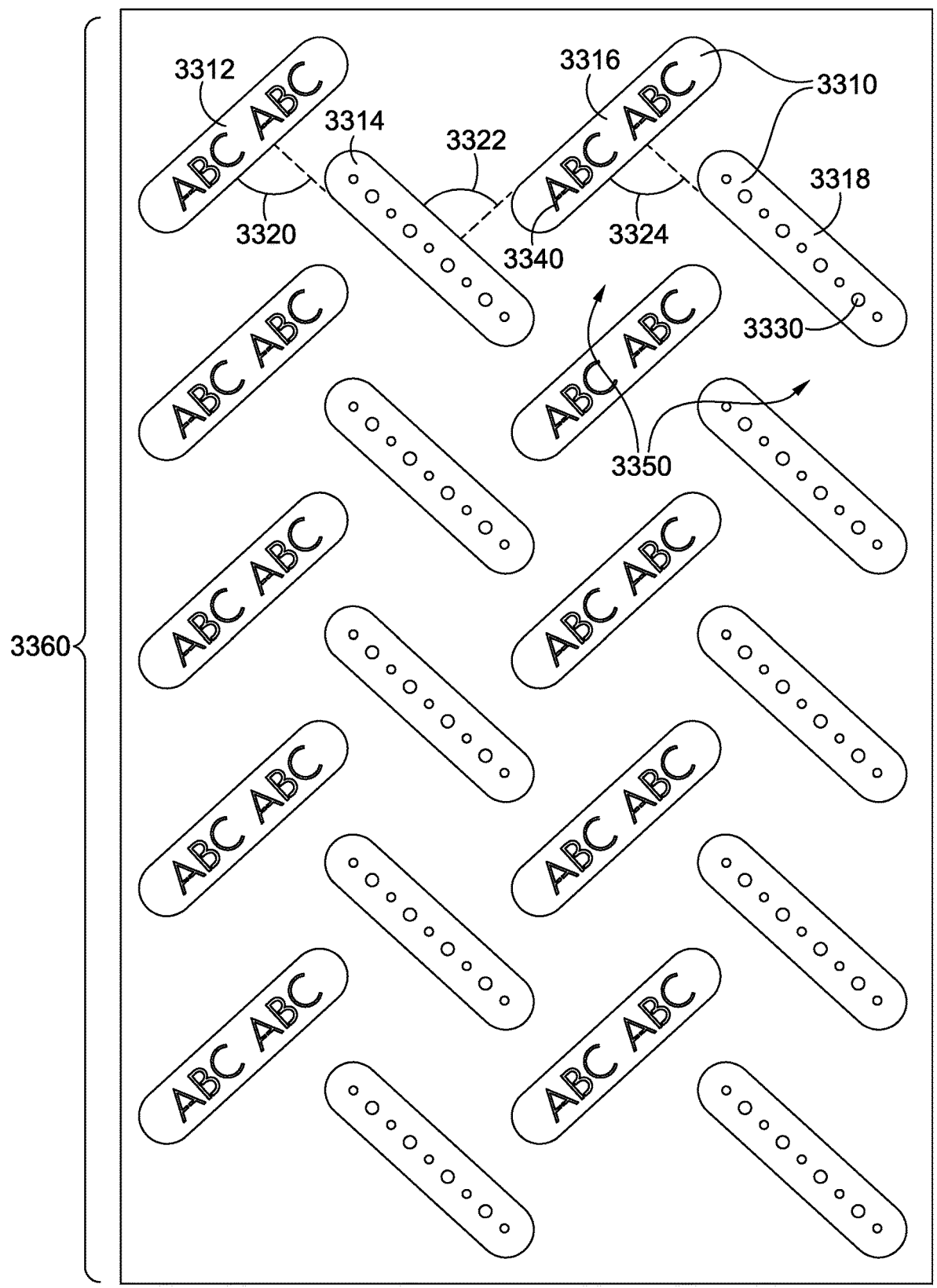
FIG. 33 depicts an exemplary panel with seams in accordance with aspects herein.

FIG. 33 shows an exemplary panel 3300 with an exemplary pattern and seam configuration in accordance with aspects herein. For example, panel 3300 comprises a plurality of angularly oriented seams 3310 forming a plurality of interconnected chambers 3350 between two or more of the plurality of angularly oriented seams 3310. Each seam in the plurality of angularly oriented seams 3310 may be oriented at an angle between 0° and 179° with respect to a neighboring seam to produce a pattern that prevents or minimizes an open straight path from forming between the plurality of angularly oriented seams 3310. For example, in FIG. 33, seam 3312 is located at an angle 3320 with respect to neighboring seam 3314, seam 3314 is located at an angle 3322 with respect to neighboring seam 3316, and seam 3316 is located at an angle 3324 with respect to seam 3318. Further, one or more seams, such as seams 3312 and 3316 may comprise one or more perforations 3340 in the form of alphanumeric characters located on the seams 3312 and 3316, or one or more seams, such as seams 3314 and 3318 may comprise one or more geometrically shaped openings or perforations 3330. Although the plurality of angularly oriented seams 3310 and one or more openings or perforations 3340 and 3330 are depicted in a certain specific pattern 3360, pattern 3360 is only exemplary and many more configurations for arranging the plurality of angularly oriented seams 3310 are available, as well, with many more different configurations for the one or more openings or perforations 3330 and 3340, other than what is shown in FIG. 33. This will become more apparent with respect to FIGS. 34A-34H, as further discussed below.

Figure 34A:
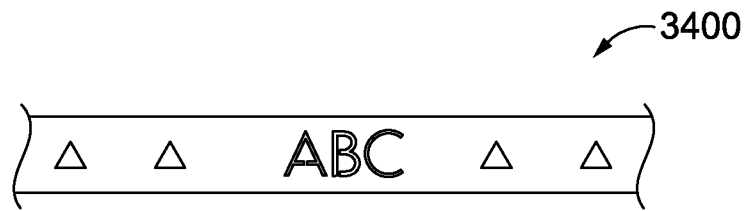
FIGS. 34A-34H depict exemplary seam configurations in accordance with aspects herein.
Figure 34B:
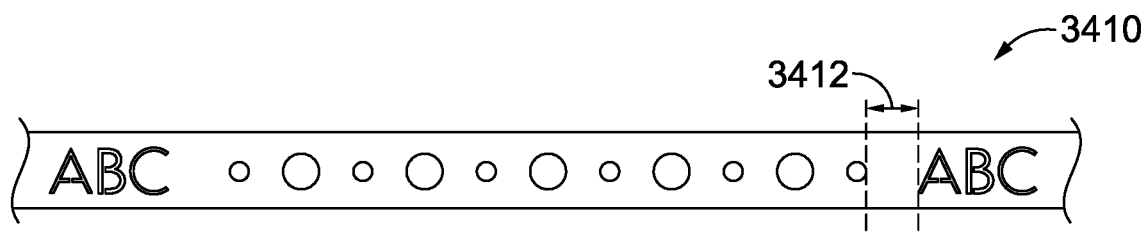
Figure 34C:
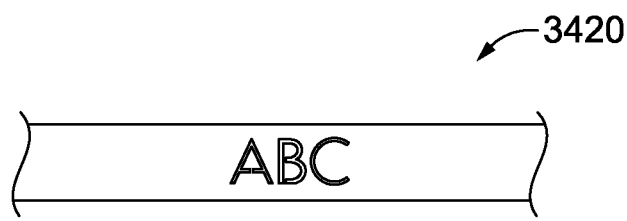
Figure 34D:
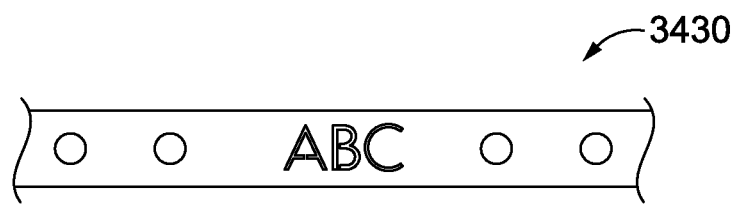
Figure 34E:
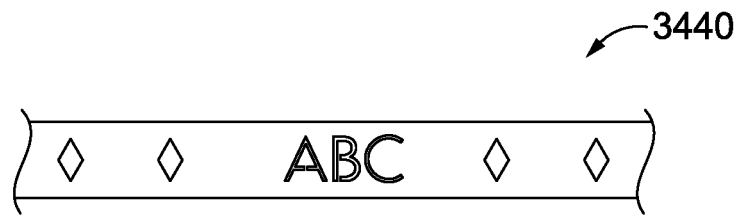
Figure 34F:
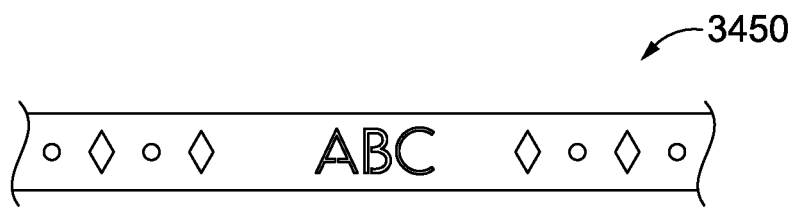
Figure 34G:
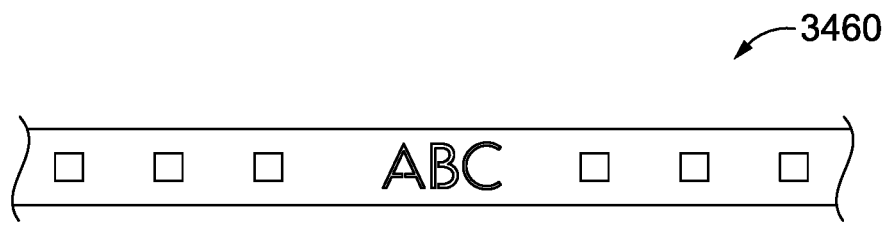
Figure 34H:
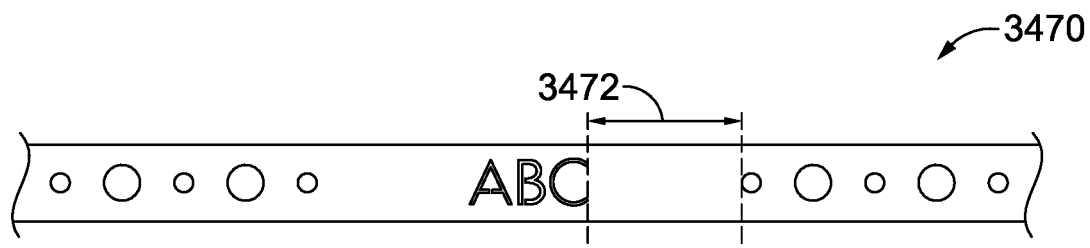

For example, 34A shows a seam configuration 3400 in accordance with aspects herein, where the openings formed through the seams are a combination of triangular openings and alphanumeric openings. FIG. 34B shows a seam configuration 3410 where the openings formed through the seams are a combination of alphanumeric openings with circular openings comprising different sizes. FIG. 34C shows a seam configuration 3420 where the seam only comprises alphanumeric openings formed thereon. FIG. 34D shows a seam configuration 3430 with alphanumerically shaped openings and circular openings comprising a consistent size. FIG. 34E shows a seam configuration 3440 where the openings formed through the seams are a combination of alphanumeric openings with diamond shaped openings. FIG. 34F shows a seam configuration 3450 where the seam comprises alphanumerically shaped openings and a combination of diamond shaped openings and circular openings formed thereon. FIG. 34G shows a seam configuration 3460 with alphanumerically shaped openings and square shaped openings. FIG. 34H shows a seam configuration 3470 similar to the seam configuration 3410 shown in FIG. 34B but, showing how the openings can be spaced apart on the seam, where for example, in FIG. 34H, the gap 3472 between the circular openings and the alphanumerically shaped openings is bigger than the gap 3412 between the circular openings and the alphanumerically shaped openings in the seam configuration 3410.

Figure 35A:
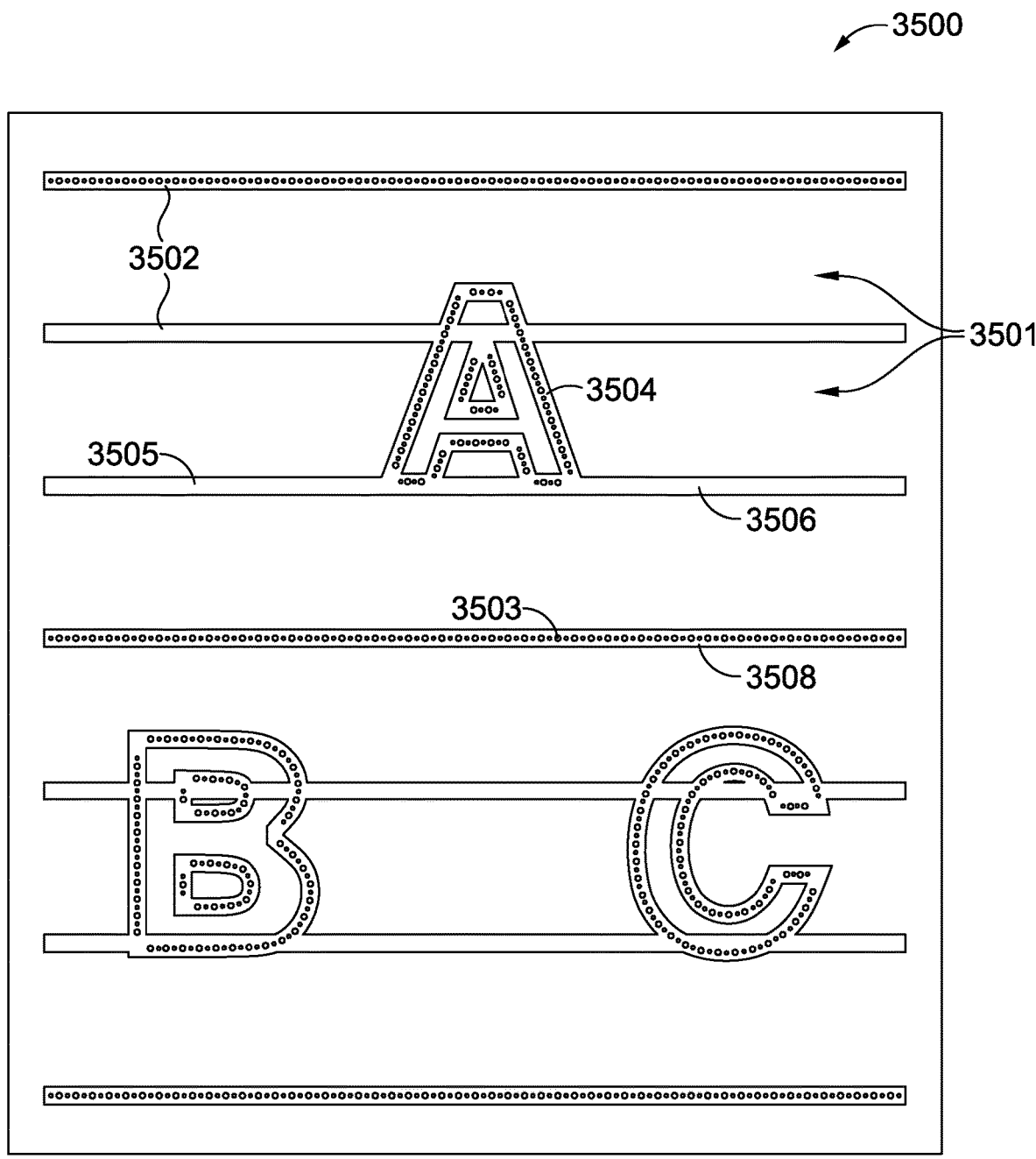
FIGS. 35A-35C depict exemplary panels with seam configurations in accordance with aspects herein.
Figure 35B:
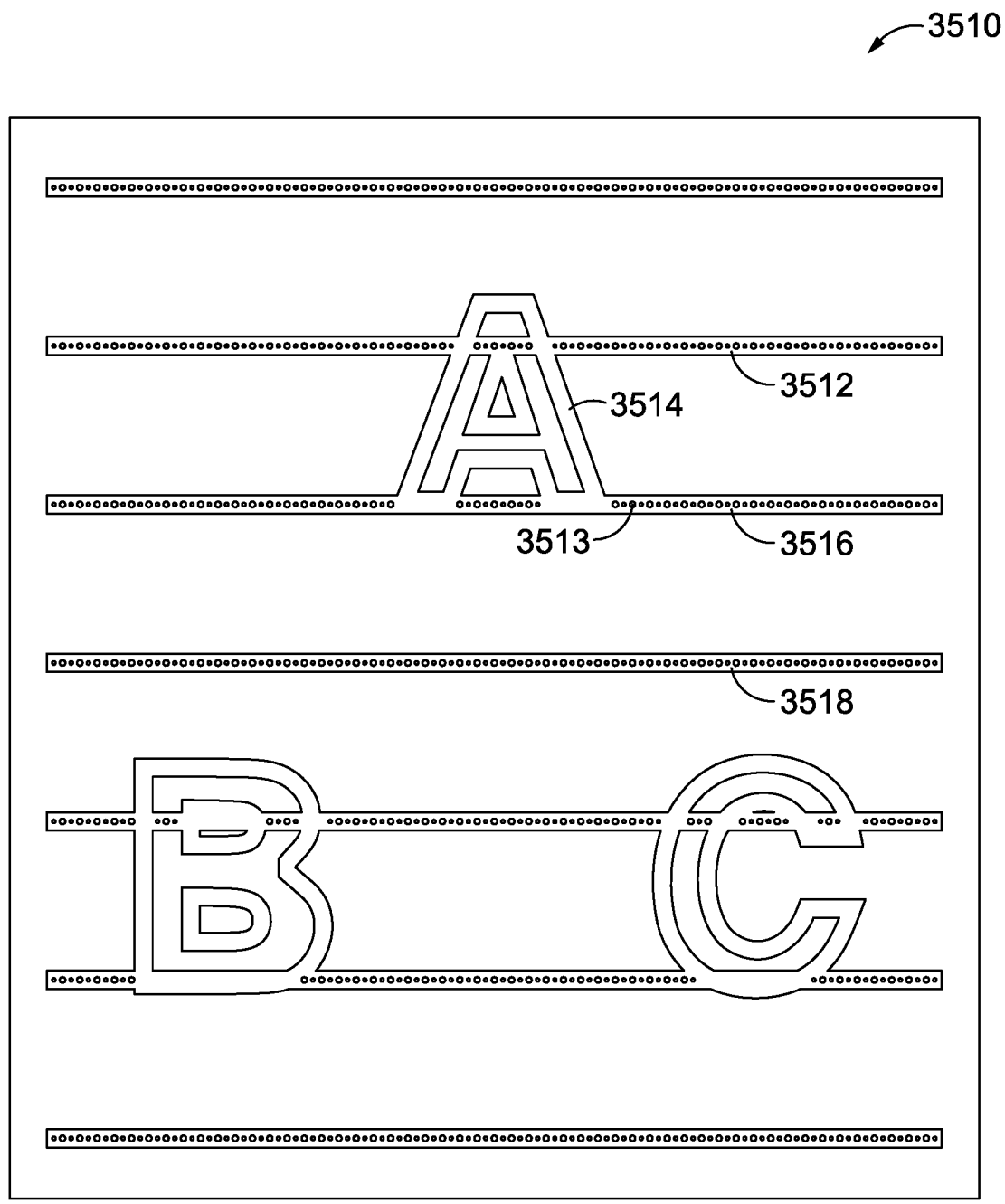
Figure 35C:
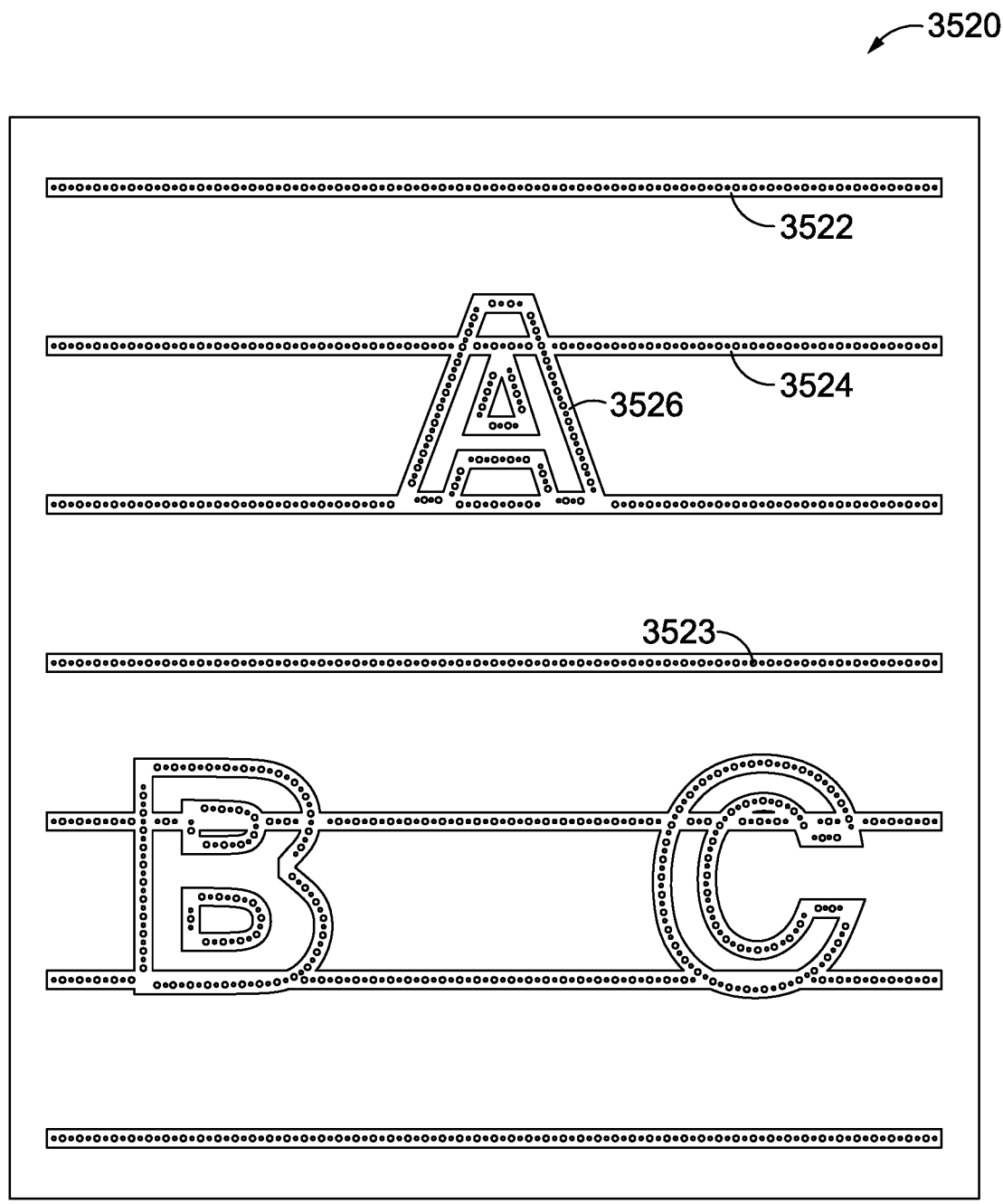

FIGS. 35A-35C, on the other hand, show how the seams themselves may be used to form different patterns, logos, and the like to create special visual effects while still maintaining their function of forming chambers for containing thermally insulating materials, therein. For example, FIG. 35A shows a panel 3500 for the thermally insulating garments or articles in accordance with aspects herein. For example, the seams or seam areas configured to separate the chambers filled with insulating materials, as discussed earlier, may be formed into any desired shape or pattern such as, for example, linear, organic, curvilinear, and the like. In FIG. 35A, for example, the plurality of seams or seam areas 3502 separating the plurality of chambers 3501 are shown as a combination of linear seams or seam areas 3506 and 3508 with alphanumerically shaped seams or seam areas 3504. Although the seams or seam areas 3504 in the present example are shown as being alphanumerically shaped, other designs such as logos, characters, and the like are also contemplated. Further, as shown, one or more seams or seam portions in the plurality of seams or seam areas 3502 may comprise one or more openings or perforations 3503, while other seams or seam portions in the plurality of seams or seam areas 3502 may remain closed, such as seam area 3506 of seam 3505.

FIG. 35B shows another exemplary seam configuration 3510, where the linear seams or seam areas (e.g. 3518) or linear portions of the plurality of seams or seam areas (e.g. 3512, and 3516) comprise one or more openings or perforations 3513, while the alphanumerically shaped seams or seam areas (e.g., 3514) remain closed.

Finally, FIG. 35C shows yet another configuration 3520, where both the linear seams or seam areas (e.g., 3522 and 3524) and the alphanumerically shaped seams or seam areas (e.g., 3526) comprise one or more openings or perforations 3523. As described above, the openings or perforations 3503, 3513, and 3523 are located on the seams or in other words within the perimeter defining the seam areas, and extend through all garment or article forming layers to promote a fluid exchange between and interior environment of the garment or other thermally insulating article and the exterior environment of the garment or thermally insulating article. The fluid exchange, for example, may therefore, provide for a thermally insulating garment that provides thermal insulation and at the same time, provides a user the ability to regulate the temperature and/or humidity within the garment. In other words, the garments or articles in accordance with aspects herein may provide comfortable insulation by providing a heat and moisture release mechanism to prevent overheating and the discomforts that may come with overheating.

It will be understood that certain features and subcombinations are of utility and may be employed without reference to other features and subcombinations. This is contemplated by and is within the scope of the claims.

Since many possible embodiments may be made of the technology described herein without departing from the scope thereof, it is to be understood that all matter herein set forth or shown in the accompanying drawings is to be interpreted as illustrative and not in a limiting sense.

The invention claimed is:

1. A vented garment comprising at least one vented garment panel, the at least one vented garment panel comprising:
   a first layer;
   a second layer; and
   a thermally-insulating material,
   wherein a first surface of the first layer is bonded to a second surface of the second layer by at least a first row of a first plurality of discrete and angularly oriented seams and a successive row of a second plurality of discrete and angularly oriented seams,
   wherein the successive row of the second plurality of discrete and angularly oriented seams is horizontally offset from the first row of the first plurality of discrete and angularly oriented seams,
   wherein a first seam of the first plurality of discrete and angularly oriented seams is angularly oriented in a first direction and a second seam of the second plurality of discrete and angularly oriented seams is angularly oriented in a second direction that is opposite the first direction,
   wherein a first portion of the first seam is horizontally aligned with a second portion of the second seam, wherein the first seam and the second seam define an interconnected chamber between the first layer and the second layer, and wherein the thermally-insulating material is contained within the interconnected chamber.

2. The vented garment of claim 1, wherein the thermally-insulating material comprises at least one of down and synthetic fiber.

3. The vented garment of claim 1, wherein the first seam and the second seam form a zig-zag pattern that is repeated by additional seams of the first plurality of discrete and angularly oriented seams and of the second plurality of discrete and angularly oriented seams.

4. The vented garment of claim 1, wherein the first seam comprises at least one opening located within a perimeter of the first seam.

5. The vented garment of claim 1, wherein all seams of the first plurality of discrete and angularly oriented seams and the second plurality of discrete and angularly oriented seams comprise equal lengths.

6. The vented garment of claim 1, wherein seams of the first plurality of discrete and angularly oriented seams and the second plurality of discrete and angularly oriented seams comprise different lengths.

7. The vented garment of claim 1, wherein seams of the first plurality of discrete and angularly oriented seams and the second plurality of discrete and angularly oriented seams comprise organic shapes or geometric shapes.

8. The vented garment of claim 1, wherein each of the first plurality of discrete and angularly oriented seams and the second plurality of discrete and angularly oriented seams are created with an adhesive tape adhesively bonding the first surface of the first layer to the second surface of the second layer, wherein the adhesive tape is activated by an application of energy.

9. The vented garment of claim 8, wherein one or more of the first plurality of discrete and angularly oriented seams and the second plurality of discrete and angularly oriented seams are further reinforced by stitching.

10. A method of making a vented garment comprising:
forming a first layer for a garment panel;
forming a second layer for the garment panel;
aligning the first layer with the second layer with a first surface of the first layer facing a second surface of the second layer to form at least one garment panel;
bonding the first surface of the first layer to the second surface of the second layer to form a first row of a first plurality of discrete and angularly oriented seams and a successive row of a second plurality of discrete and angularly oriented seams, wherein the successive row of the second plurality of discrete and angularly oriented seams is horizontally offset from the first row of the first plurality of discrete and angularly oriented seams, wherein a first seam of the first plurality of discrete and angularly oriented seams is angularly oriented in a first direction and a second seam of the second plurality of discrete and angularly oriented seams is angularly oriented in a second direction that is opposite to the first direction, wherein a first portion of the first seam is horizontally aligned with a second portion of the second seam, wherein the first seam and the second seam define an interconnected chamber between the first layer and the second layer, and
filling the interconnected chamber with a thermally-insulating material; and
forming the vented garment using the garment panel.

11. The method of claim 10, wherein the thermally-insulating material is at least one of down and a synthetic fiber, wherein the formation of a straight open path in a direction perpendicular to a horizontal axis extending parallel to a waist opening edge of the vented garment is prevented by the first seam angularly oriented in the first direction and the second seam angularly oriented in the second direction.

12. The method of claim 10, further comprising forming at least one opening extending within a perimeter of the first seam, through the first layer, and through the second layer; wherein the at least one opening comprises an alphanumeric shape or a geometric shape.

13. The method of claim 10, wherein each seam of the first plurality of discrete and angularly oriented seams and of the second plurality of discrete and angularly oriented seams comprises a width and a length, wherein the length is greater than the width.

14. The method of claim 13, wherein each seam of the first plurality of discrete and angularly oriented seams and of the second plurality of discrete and angularly oriented seams is further angularly oriented with respect to a horizontal axis extending parallel to a waist opening edge of the vented garment.

15. The method of claim 14, wherein each seam of the first plurality of discrete and angularly oriented seams and of the second plurality of discrete and angularly oriented seams is formed by adhesively bonding the first surface of the first layer to the second surface of the second layer.

16. A vented garment panel for an insulated garment, the vented garment panel comprising:
a first layer having a first surface and a second surface, wherein the first surface is configured to be exposed to an external environment;
a second layer having a third surface and a fourth surface, wherein the third surface is configured to be proximate to a wearer's body when the insulated garment is worn, and wherein the second surface of the first layer faces the fourth surface of the second layer; and
a thermally-insulating material,
wherein the second surface of the first layer is bonded to the fourth surface of the second layer by at least a first row of a first plurality of discrete and angularly oriented seams and a successive row of a second plurality of discrete and angularly oriented seams,
wherein the successive row of the second plurality of discrete and angularly oriented seams is horizontally offset from the first row of the first plurality of discrete and angularly oriented seams,
wherein a first seam of the first plurality of discrete and angularly oriented seams is angularly oriented in a first direction and a second seam of the second plurality of discrete and angularly oriented seams is angularly oriented in a second direction that is opposite the first direction,
wherein a first portion of the first seam is horizontally aligned with a second portion of the second seam,
wherein the first seam and the second seam define an interconnected chamber between the first layer and the second layer, and
wherein the thermally-insulating material is contained within the interconnected chamber.

17. The vented garment panel of claim 16, wherein the thermally-insulating material within the interconnected chamber comprises at least one of down and a synthetic fiber, and wherein the first direction of the first seam and the second direction of the second seam prevent formation of a straight open path in a direction perpendicular to a horizontal axis extending parallel to a waist opening edge of the insulated garment.

18. The vented garment panel of claim 16, wherein the first plurality of discrete and angularly oriented seams and the second plurality of discrete and angularly oriented seams are created by one of an adhesive applied to at least one of the second surface of the first layer or the fourth surface of the second layer, and wherein a plurality of openings extend through at least a portion of the first seam in the first plurality of discrete and angularly oriented seams, through the first layer, and through the second layer.

19. The vented garment panel of claim 18, wherein each seam of the first plurality of discrete and angularly oriented seams and the second plurality of discrete and angularly oriented seams are further reinforced by stitching.

20. The vented garment panel of claim 16, wherein each seam in the first plurality of discrete and angularly oriented seams and the second plurality of discrete and angularly oriented seams is bound by a perimeter defining a length and a width, wherein the length is greater than the width.

* * * * *